United States Patent [19]

Kinoshita et al.

[11] Patent Number: 5,715,446
[45] Date of Patent: Feb. 3, 1998

[54] INFORMATION SEARCHING APPARATUS FOR SEARCHING TEXT TO RETRIEVE CHARACTER STREAMS AGREEING WITH A KEY WORD

[75] Inventors: Tetsuya Kinoshita, Urawa; Takamasa Oyama, Kamakura; Chuichi Kikuchi, Ichikawa; Noriyuki Enomoto, Tokyo; Hirobumi Shinoki, Yokohama, all of Japan

[73] Assignee: Matsushita Electric Industrial Co., Ltd., Osaka, Japan

[21] Appl. No.: 651,014

[22] Filed: May 21, 1996

[30] Foreign Application Priority Data

May 22, 1995 [JP] Japan ................. 7-145213
Mar. 27, 1996 [JP] Japan ................. 8-072710

[51] Int. Cl.$^6$ .................................................. G06F 17/21
[52] U.S. Cl. ................. 395/605; 395/606; 395/613; 395/760; 395/778; 395/794
[58] Field of Search ........................... 395/605, 613, 395/606, 760, 778, 794

[56] References Cited

U.S. PATENT DOCUMENTS

| | | | |
|---|---|---|---|
| 4,433,392 | 2/1984 | Beaven | 364/900 |
| 4,558,302 | 12/1985 | Welch | 340/347 |
| 4,817,036 | 3/1989 | Millett et al. | 364/900 |
| 5,136,289 | 8/1992 | Yoshida et al. | 341/67 |
| 5,140,644 | 8/1992 | Kawaguchi et al. | 382/10 |
| 5,229,768 | 7/1993 | Thomas | 341/51 |
| 5,276,616 | 1/1994 | Kuga et al. | 364/419.08 |
| 5,278,981 | 1/1994 | Kawaguchi et al. | 395/600 |
| 5,371,499 | 12/1994 | Graybill et al. | 341/51 |
| 5,418,951 | 5/1995 | Damashek | 395/600 |
| 5,469,354 | 11/1995 | Hatakeyama et al. | 364/419.19 |
| 5,471,611 | 11/1995 | McGregor | 395/600 |
| 5,557,789 | 9/1996 | Mase et al. | 395/600 |
| 5,577,249 | 11/1996 | Califano | 395/611 |
| 5,610,603 | 3/1997 | Plambeck | 341/51 |

FOREIGN PATENT DOCUMENTS

| | | |
|---|---|---|
| 63-155324 | 6/1988 | Japan . |
| 1282635 | 11/1989 | Japan . |
| 2302869 | 12/1990 | Japan . |
| 3113626 | 5/1991 | Japan . |

OTHER PUBLICATIONS

Software—Practice an Experience, Apr. 1988, UK, vol. 18, No. 4, ISSN 0038–0644, pp. 387–393, XP000579816, Owolabi O et al: "Fast approximate string matching".
Byte, vol. 13, No. 5, 1 May 1988, pp. 297–312, XP000576194, Kimbrell R E: "Searching Form Text?. Sen an N–Gram".

*Primary Examiner*—Thomas G. Black
*Assistant Examiner*—Jean R. Homere
*Attorney, Agent, or Firm*—Lowe, Price, LeBlanc & Becker

[57] ABSTRACT

A plurality of characters arranged in a text are numbered in order of occurrence for each character type, and an occurrence number table in which one or more occurrence numbers are listed for each character type is prepared in an occurrence number preparing unit. Also, a set of two character types is defined as a character pattern, and a set of two occurrence numbers of two adjacent characters of which types correspond to one character pattern is defined as an occurrence number pattern. One or more occurrence number patterns respectively corresponding to one character pattern are arranged for each character pattern, and a list of occurrence number patterns is prepared as an index file in an index file preparing unit. Thereafter, a series of specified character patterns indicated by a key word is prepared, and a series of particular occurrence number patterns corresponding to the series of specified character patterns is selected on condition that a series of particular characters indicated by the series of particular occurrence number patterns agrees with the particular character stream. Therefore, because the characters of the text is converted to the occurrence number patterns and all occurrence number patterns are not searched, a searching operation can be performed at a high speed.

13 Claims, 38 Drawing Sheets

| CHARACTER PATTERN | THE NUMBER OF OCCURRENCE NUMBER PATTERNS | LIST OF OCCURRENCE NUMBER PATTERNS | | | | | | RECORD NUMBER (Ni) |
|---|---|---|---|---|---|---|---|---|
| (A, A) | 3 | (1, 2) | (3, 4) | (6, 7) | Rel (6, 7) | Rel | | Ni |
| (A, I) | 3 | (2, 1) | (4, 2) | (8, 3) | Rel (8, 3) | Rel | | Ni |
| ⋮ | | | | | | | | |
| (A, N) | 2 | (5, 1) | (7, 3) | Rel (6, 7) | Rel | | | Ni |
| (I, A) | 2 | (1, 3) | (2, 5) | Rel (2, 5) | Rel | | | Ni |
| ⋮ | | | | | | | | |
| (N, A) | 2 | (2, 6) | (3, 8) | Rel (3, 8) | Rel | | | Ni |
| (N, I) | 0 | Rel | Rel | | | | | |
| ⋮ | | | | | | | | |
| (N, N) | 1 | (1, 2) | Rel (1, 2) | Rel | | | | Ni |

| | T1 | | | |
|---|---|---|---|---|
| A | 12 | | 34 | |
| B | ab | cdefg | | |
| A | AI | | UE | |

| T2 | HEAD ADDRESS | SIZE | POINTER | CHARACTER STRING |
|---|---|---|---|---|
| A | 1 | 2 | TO P1 | 12 |
| A | 3 | 2 | TO P2 | 34 |
| B | 5 | 2 | | ab |
| B | 7 | 5 | | cdefg |
| A | 12 | 2 | P1 | AI |
| A | 14 | 2 | P2 | UE |

FIG. 4

| RETRIEVAL TEXT | | A | A | I | A | A | I | A | N | N | N | A | A | N | A | I | RECORD NUMBER (Ni) |
|---|---|---|---|---|---|---|---|---|---|---|---|---|---|---|---|---|---|
| OCCURRENCE NUMBERS FOR EACH CHARACTER TYPE | "A" | 1 | 2 | | 3 | 4 | | 5 | | | | 6 | 7 | | 8 | | N₁ |
| | "I" | | | 1 | | | 2 | | | | | | | | | 3 | N₁ |
| | ... | | | | | | | | | | | | | | | | ... |
| | "N" | | | | | | | | 1 | 2 | 3 | | | | | | N₁ |

FIG. 5

| CHARACTER PATTERN | OCCURRENCE NUMBER PATTERNS | | | RECORD NUMBER |
|---|---|---|---|---|
| (A, A) | (1, 2) | (3, 4) | (6, 7) | N₁ |
| (A, I) | (2, 1) | (4, 2) | (8, 3) | N₁ |
| ... | | | | |
| (A, N) | (5, 1) | (7, 3) | | N₁ |
| (I, A) | (1, 3) | (2, 5) | | N₁ |
| ... | | | | |
| (N, A) | (2, 6) | (3, 8) | | N₁ |
| (N, I) | | | | |
| (N, N) | (1, 2) | | | N₁ |

FIG. 8

| CHARACTER PATTERN | THE NUMBER OF OCCURRENCE NUMBER PATTERNS | LIST OF OCCURRENCE NUMBER PATTERNS | | | | RECORD NUMBER (Ni) |
|---|---|---|---|---|---|---|
| (A, A) | 3 | (1, 2) | (3, 4) | (6, 7) | Re1 | $N_1$ |
| (A, I) | 3 | (2, 1) | (4, 2) | (8, 3) | Re1 | $N_1$ |
| ... | | | | | | |
| (A, N) | 2 | (5, 1) | (7, 3) | Re1 (6, 7) | | $N_1$ |
| (I, A) | 2 | (1, 3) | (2, 5) | Re1 (2, 5) | | $N_1$ |
| ... | | | | | | |
| (N, A) | 2 | (2, 6) | (3, 8) | Re1 (3, 8) | | $N_1$ |
| (N, I) | 0 | Re1 | | | | |
| ... | | | | | | |
| (N, N) | 1 | (1, 2) | Re1 (1, 2) | Re1 | | $N_1$ |

FIG. 10

| CHARACTER PATTERN | FIRST OCCURRENCE NUMBER PATTERN | j-TH OCCURRENCE NUMBER PATTERN | FINAL OCCURRENCE NUMBER PATTERN | EXTENDED REGION |
|---|---|---|---|---|
| $\{C_1(P), C_2(P)\}$ = (A, I) | $\{N_1(P,1), N_2(P,1)\}$ = (2, 1) | $\{N_1(P,j), N_2(P,j)\}$ = (4, 2) | $\{N_1(P,n), N_2(P,n)\}$ = (8, 3) | $\{N_1(P,n), N_2(P,n)\}$ = (8, 3) |
| $\{C_1(P+1), C_2(P+1)\}$ = (I, A) | $\{N_1(P+1,1), N_2(P+1,1)\}$ = (1, 3) | $\{N_1(P+1,j), N_2(P+1,j)\}$ | $\{N_1(P+1,n), N_2(P+1,n)\}$ = (2, 5) | $\{N_1(P+1,n), N_2(P+1,n)\}$ = (2, 5) |

FIG. 12

| REVISED RETRIEVAL TEXT | A | A | I | A | I | I | A | N | A | A | I | N | A | I | RECORD NUMBER |
|---|---|---|---|---|---|---|---|---|---|---|---|---|---|---|---|
| | 1 | 2 | 3 | 4 | 5 | 6 | 7 | | | | | | | | |
| "A" | 1 | | | 2 | | | 3 | | 4 | 5 | | | 6 | 7 | NIR |
| "I" | | 1 | 2 | | 3 | | | | | | 4 | | | 5 | NIR |
| ... | | | | | | | | | | | | | | | |
| "N" | | | | | | | | 1 | | | | 2 | | | NIR |

FIG. 13

| CHARACTER PATTERN | OCCURRENCE NUMBER PATTERNS | | | | | RECORD NUMBER |
|---|---|---|---|---|---|---|
| (A, A) | (1, 2) | (5, 6) | | | | NIR |
| (A, I) | (2, 1) | (3, 2) | (6, 3) | (7, 4) | | NIR |
| ... | | | | | | |
| (A, N) | (4, 1) | | | | | NIR |
| (I, A) | (1, 3) | (3, 4) | | | | NIR |
| ... | | | | | | |
| (N, A) | (1, 5) | (2, 7) | | | | NIR |
| (N, I) | | | | | | |
| ... | | | | | | |
| (N, N) | | | | | | |

FIG. 14

| CHARACTER PATTERN | LIST OF OCCURRENCE NUMBER PATTERNS | | | | | RECORD NUMBER |
|---|---|---|---|---|---|---|
| (A, A) | (1, 2) | (5, 6) | Re2 (5, 6) | Re1 (6, 7) | Re1 | NIR |
| (A, I) | (2, 1) | (3, 2) | (6, 3) | (7, 4) | Re2 (7, 4) | NIR |
| ... | | | | | | |
| (A, N) | Re2 (4, 1) | Re1 (7, 3) | Re1 | | | NIR |
| (I, A) | (1, 3) | (3, 4) | Re2 (3, 4) | Re1 | | NIR |
| ... | | | | | | |
| (N, A) | (1, 5) | (2, 7) | Re2 (2, 7) | Re1 | | NIR |
| (N, I) | Re2 | Re1 | | | | NIR |
| ... | | | | | | |
| (N, N) | Re2 | Re1 (1, 2) | Re1 | | | NIR |

FIG. 16

| (ORIGINAL RETRIEVAL TEXT) REVISED RETRIEVAL TEXT | (A A I A A A I A N N N A A N A I) A A I A A I A N - - - | RECORD NUMBER |
|---|---|---|
| OCCURRENCE NUMBER FOR EACH CHARACTER TYPE | "A" | 1 2 3 4 5 - - | NID |
| | "I" | 1 2 - - | NID |
| | ⋮ | ⋮ | |
| | "N" | 1 - | NID |

FIG. 17

| CHARACTER PATTERN | OCCURRENCE NUMBER PATTERNS | RECORD NUMBER |
|---|---|---|
| (A, A) | (1, 2) (3, 4) | NID |
| (A, I) | (2, 1) (4, 2) | NID |
| ... | | |
| (A, N) | (5, 1) | NID |
| (I, A) | (1, 3) (2, 5) | NID |
| ... | | |
| (N, A) | | NID |
| (N, I) | | NID |
| ... | | |
| (N, N) | | NID |

FIG. 18

| CHARACTER PATTERN | LIST OF OCCURRENCE NUMBER PATTERNS | | | | | | | | RECORD NUMBER |
|---|---|---|---|---|---|---|---|---|---|
| (A, A) | (1, 2) | (3, 4) | (3, 4) | Re1 (6, 7) | Re1 | | | | NID |
| (A, I) | (2, 1) | (4, 2) | (4, 2) | Re1 (8, 3) | Re1 | | | | NID |
| ... | | | | | | | | | |
| (A, N) | (5, 1) | (5, 1) | Re1 (7, 3) | Re1 | | | | | NID |
| (I, A) | (1, 3) | (2, 5) | Re1 (2, 5) | Re1 | | | | | NID |
| ... | | | | | | | | | |
| (N, A) | Re3 | (3, 8) | Re1 (3, 8) | Re1 | | | | | NID |
| (N, I) | Re3 | Re1 | | | | | | | NID |
| ... | | | | | | | | | |
| (N, N) | Re3 | Re1 (1, 2) | Re1 | | | | | | NID |

FIG. 21

| OPERATION TYPE | DATA NUMBER | DATA |
|---|---|---|
| RENEWAL | D4 | "EOK" |

FIG. 22

| RETRIEVAL FLAG | REAL TIME PROCESSING FLAG | OPERATION TYPE | DATA NUMBER | DATA |
|---|---|---|---|---|
| F1 | F2 | RENEWAL ADDITION OR DELETION | $D_N$ | "DATA1" |

FIG. 23

| | F1 | F2 | OPERATION TYPE | DATA NUMBER | DATA |
|---|---|---|---|---|---|
| TopOld → | OFF | OFF | RENEWAL | D5 | "AIU" |
| | OFF | OFF | ADDITION | D12 | "UEO" |
| BtmOld → | OFF | OFF | RENEWAL | D11 | "AIU" |
| TopNew → | OFF | OFF | DELETION | D5 | |
| BtmNew → | | | | | |
| | | | | | |

FIG. 24

| DATA NUMBER | DATA |
|---|---|
| D4 | "EOK" |

FIG. 25

| DATA NUMBER | DATA | |
|---|---|---|
| D1 | "AIU" | |
| D2 | "IUE" | |
| D3 | "UEO" | |
| D4 | "EOK" | ← RENEWED |
|  |  | |

FIG. 27

| CHARACTER PATTERN | CHARACTER INFORMATION PATTERN |
|---|---|
| $(C_1, C_2)$ | $(PC_1, D_N)$ |
| ⋮ | ⋮ |

FIG. 28A

| CHARACTER STREAM | A | I | A | A | I | U | A | U |
|---|---|---|---|---|---|---|---|---|
| CHARACTER POSITION | 1 | 2 | 3 | 4 | 5 | 6 | 7 | 8 |

ORIGINAL RETRIEVING UNIT
(DATA NUMBER DN = 1)

| CHARACTER PATTERN | CHARACTER INFORMATION PATTERN |
|---|---|
| (A, A) | (3, 1) |
| (A, I) | (1, 1), (4, 1) |
| (A, U) | (7, 1) |
| ... | |
| (I, A) | (2, 1) |
| (I, U) | (5, 1) |
| ... | |
| (U, A) | (6, 1) |
| ... | |

FIG. 28B

| CHARACTER STREAM | A | I | U |
|---|---|---|---|
| CHARACTER POSITION | 1 | 2 | 3 |

ADDING DATA
(DATA NUMBER DN = 5)

| CHARACTER PATTERN | CHARACTER INFORMATION PATTERN |
|---|---|
| (A, A) | (3, 1) |
| (A, I) | (1, 1), (4, 1), (1, 5) |
| (A, U) | (7, 1) |
| ... | |
| (I, A) | (2, 1) |
| (I, U) | (5, 1), (2, 5) |
| ... | |
| (U, A) | (6, 1) |
| ... | |

| CHARACTER TYPE | CHARACTER EXISTENCE JUDGING FLAG |
|---|---|
| A | F(A) = OFF |
| B | F(B) = OFF |
| ⋮ | ⋮ |

| CHARACTER TYPE | FLAG |
|---|---|
| A | OFF |
| ⋮ | |
| E | ON |
| F | OFF |
| ⋮ | |
| K | ON |
| L | OFF |
| ⋮ | |
| O | ON |
| ⋮ | |

| OPERATION TYPE | DATA NUMBER | DATA |
|---|---|---|
| RENEWAL, ADDITION OR DELETION | $D_N$ | "DATA1" |

| OPERATION TYPE | DATA NUMBER | DATA |
|---|---|---|
| ADDITION | D12 | "UEO" |
| RENEWAL | D11 | "AIU" |
| DELETION | D5 | |

FIG. 47

```
START
  ↓
A SET OF A DATA NUMBER AND     ⟵ S721
A RETRIEVAL TIME IS RECORDED
  ↓
END
```

FIG. 48

| DATA NUMBER | RETRIEVAL TIME |
|---|---|
| D1 | $T_{r(1)}$ |
| D2 | $T_{r(2)}$ |
| ⋮ | ⋮ |
| $D_N$ | $T_{r(N)}$ |

FIG. 49

| DATA NUMBER | RETRIEVAL TIME |
|---|---|
| D1 | 10:00 |
| D2 | |
| D3 | |
| D4 | |
| D5 | |
| ⋮ | |

| DATA NUMBER | RENEWING TIME |
|---|---|
| D1 | $T_{s(1)}$ |
| D2 | $T_{s(2)}$ |
| ⋮ | ⋮ |
| $D_N$ | $T_{s(N)}$ |

| DATA NUMBER | RENEWING TIME |
|---|---|
| D1 | 10:10 |
| D2 | 9:00 |
| D3 | 9:10 |
| D4 | 9:30 |
| D5 | 9:40 |
| ⋮ | |

FIG. 54
RETRIEVAL REQUEST
RETRIEVAL CHARACTER STREAM "AIU"
AT 10:00
ONE OR MORE CHARACTER STREAMS ARE RETRIEVED FROM EACH OF RETRIEVAL TEXTS D1, D2 AND D5
← RENEWAL OF THE RETRIEVAL TEXT D1 AT 10:10
RETRIEVING RESULT OUTPUTTING REQUEST
| DATA NUMBER | DATA | INFORMATION |
|---|---|---|
| D1 | "IUE" | RENEWING INFORMATION |
| D2 | "AIU" | NON-RENEWING INFORMATION |
| D5 | "AIU" | NON-RENEWING INFORMATION |

INFORMATION SEARCHING APPARATUS FOR SEARCHING TEXT TO RETRIEVE CHARACTER STREAMS AGREEING WITH A KEY WORD

BACKGROUND OF THE INVENTION

1. Field of the Invention

The present invention relates generally to an information searching apparatus in which a data base is searched for one or more pieces of character streams respectively agreeing with a specified character stream (or a key word) to retrieve the character stream, and more particularly to an information searching apparatus in which a piece of character stream agreeing with a specified character stream is retrieved, added, renewed, or deleted at a high speed by searching a data base.

2. Description of the Related Art

In a recent information searching system, when a user specifies a character stream and the specified character stream is input to a conventional information searching apparatus as a key word, a data base provided for the conventional information searching apparatus is searched for one or more pieces of character data respectively agreeing with the specified character stream, and the character data are automatically retrieved. In particular, a relational data base management system has been manufactured and widely used.

2.1. First Previously Proposed Art

A first conventional information searching apparatus is, for example, disclosed in each of Published Unexamined Japanese Patent Applications No. S63-155324 (1988), H1-282635 (1989), H2-302869 (1990) and H3-113626 (1991). In the application No. S63-155324 (Information Retrieving Device), a registered key word is compared with a retrieving key word designated by an operator while the registered key word shifts word by word in each cycle, and an information retrieving operation is performed. In the application No. H1-282635 (Index Maintaining System), a main index and a comparatively small sub-index are held as indexes used to retrieve a piece of registered data, an index of the registered data added is added to the sub-index, and the renewal, addition and deletion of the registered data is performed at high speed. In the application No. H2-302869 (File Edition System), to remove a useless area of a memory and to rapidly specify data stored in the memory to be processed, a table for holding idle area pointers of the memory is formed, and the data of character string stored in the memory to be processed is specified while referring the table. In the application No. H3-113626 (System and Device for Controlling Buffer), to improve the throughput of a task, the retrieval of data in a buffer and the transmission of data from an auxiliary storage device to the buffer are performed in parallel.

In the above four first conventional information searching apparatus, a data region and a data renewing region are arranged in a memory area in a record number unit, pieces of data are stored in the data renewing region in case of a data renewing operation, and the data region and the data renewing region are replaced with each other (the Applications No. S63-155324, H1-282635 and H3-113626). Also, the addition, renewal and deletion of data are performed by using a correspondence table of character string data stored in a retrieving file and a record of the character string data (the Applications No. H2-302869).

A data registering operation, a data changing operation and a data deleting operation performed in a first conventional information searching apparatus are described.

FIG. 1 is a flow chart showing a procedure performed in a first conventional information searching apparatus base on the Applications No. H2-302869. FIG. 2 shows an original data table T1 and a changed data table T2 used for the first conventional information searching apparatus to show a flow of data recorded in the table T1. In the table T1, three records are set as a file to be processed. In an A type record, a character string composed of two characters "12" or "AI" and another character string composed of two characters "34" or "UE" are recorded to form a data structure of the A type record. In a B type record, a character string composed of two characters and another character string composed of five characters are recorded to form a data structure of the B type record. In this case, an area for the character string "12" of the A type record corresponds to that for the character string "AI" of the A type record, and the character strings "12" and "AI" are the same item. Also, an area for the character string "34" of the A type record corresponds to that for the character string "UE" of the A type record, and the character strings "34" and "UE" are the same item.

As shown in FIG. 1, a plurality of character strings to be processed are read from a retrieval file shown in the table T1 one after another as records to be processed (step S101). Thereafter, a position of each character string, a size of each character string and a pointer for each character string are set. The position of a character string indicates a head address of a record corresponding to the character string. The size of a character string indicates the number of characters in the character string. The pointer for a plurality of character strings indicates that the character strings are the same item. Thereafter, a configuration of the character strings in the table T1 is changed to that in the table T2 in a memory (step S102). For example, because an item of the character string "12" of a first record A is the same as that of the character string "AI" of a third record A, a pointer p1 is set for the character strings "12" and "AI". Also, because an item of the character string "34" of the first record A is the same as that of the character string "UE" of the third record A, a pointer p2 is set for the character strings "34" and "UE". Thereafter, the steps S101 and S102 are repeated until all character strings of the table 1 are read and stored in the memory in the configuration of the table T2 (step S103). Thereafter, the table T2 is set in a space area of the memory, so that the table T2 is prepared (step S104).

Thereafter, a case that a character string (or data) of the table T1 is planned to be renewed is considered (a renewal operation in a step S105). For example, when a character string '34" of the first record A of the Table 1 is planned to be renewed to "56", a plurality of records A of the table T2 are examined, the character string "34" registered in a third line of the table T2 is detected, and the character string "34" is changed to a character string "56". In this case, because the number of characters is not changed, it is not required to change the pointer p2.

Also, in a deleting operation in the step S105, when a character string "UE" of the third record A of the table T1 is, for example, planned to be deleted, a plurality of records A of the table T2 are examined, the character string "UE" registered in a seventh line of the table T2 is detected while tracing the pointer p2 registered in the third line, and a line of record corresponding to the character string "UE" is deleted. In addition, the pointer P2 of the third line is also deleted.

As is described above, in the first conventional information searching apparatus, a registering operation, a renewing operation and a deleting operation are performed by using the table 2 while tracing an head address, a size and a pointer of a character string in each line.

2.2. Problems to be Solved in the First Previously Proposed Art by the Invention However, in cases where a large number of character strings (or a large volume of data) are registered in a data base, there is a drawback that it takes a long time to search all pieces of data of the data base for one or more pieces of data respectively agreeing with a specified character string (or a key word). Therefore, it is required to search a data base at a higher speed.

Also, when a renewing or deleting operation for data is performed in the first conventional information searching apparatus, it is required to secure an extended area equivalent to an area of a renewed record or a deleted record in the memory. Therefore, there is another drawback that a memory having a large capacity is required.

Also, a sorting operation is required to rearrange the order of records after a renewing or deleting operation for data is performed. Therefore, there is another drawback that it takes a long time to renew or delete the data.

Also, a record of a piece of renewing information is inserted into an inserting line of the table T2 in which a plurality of records of data are densely arranged without any space, and a record of a piece of deleting information placed in a deleting line of the table T2 is removed from the table T2. Therefore, a plurality of records of data placed after a position of the inserting or deleting line are required to be shifted in the renewing or deleting operation, so that there is another drawback that it takes a long time to perform the renewing or deleting operation.

Also, even though the deleting information is not deleted from the table T2 but a deleting flag for the deleting information is set to a "on" condition, there is another drawback that the number of the records (or a volume of data) is increased in the table T2.

2.3. Second Previously Proposed Art

FIG. 3 is a block diagram of a second conventional information searching apparatus.

As shown in FIG. 3, a second conventional information searching apparatus 11 is composed of an inputting unit 12 for receiving a document prepared by a user in a document registering (or renewing) operation and receiving a specified retrieval character stream in a retrieving operation, a processing request receiving unit 13 for receiving a registering (or renewing) request of the document from the inputting means 12 and receiving a retrieval request of the specified retrieval character stream from the inputting means 12, a real time processing unit 14 for processing the document at a real time according to a processing request sent from the processing request receiving unit 13 to prepare an index file used for the retrieving operation, an index file storing unit 15 for storing the index file, an outputting unit 16 for outputting a piece of information which indicates the finish of the preparation of the index file when the finish of the preparation of the index file is informed by the processing request receiving unit 13, and a retrieving operation performing unit 17 for performing the retrieving operation to retrieve one or more pieces of character data respectively agreeing with the specified retrieval character stream from the index file stored in the index file storing unit 15 when a retrieving instruction is received from the processing request receiving unit 13.

In the above configuration, when a user prepares a document and the document is input to the inputting unit 12 to register or renew the document at a real time, a document registering (or renewing) operation is started in the apparatus 11. That is, the document and a registering (or renewing) request of the document sent from the inputting unit 12 are received by the processing request receiving unit 13, and the document and a processing request of the document is sent from the processing request receiving unit 13 to the real time processing unit 14. In the processing unit 14, the document is processed at a real time and an index file of the document is prepared, and the index file is stored in the index file storing unit 15. Also, when the preparation of the index file is finished, the processing unit 14 informs the processing request receiving unit 13 of the finish of the preparation of the index file. Thereafter, a piece of real time operation finishing information indicating that the preparation of the index file at a real time is finished is sent to the outputting unit 16, and the real time operation finishing information is output from the outputting unit 16. Therefore, the document registering (or renewing) operation is finished, and the second conventional information searching apparatus 11 is set in a request waiting condition.

Thereafter, when a specified retrieval character stream is input to the inputting unit 12 to request a retrieving operation, the retrieving request is received by the processing request receiving unit 13, a retrieving instruction is sent from the receiving unit 13 to the retrieving operation performing unit 17, and the retrieving operation is performed in the performing unit 17. That is, one or more pieces of character data respectively agreeing with the specified retrieval character stream are retrieved from the index file stored in the index file storing unit 15. When the retrieval of the character data is finished, the performing unit 17 informs the receiving unit 13 of the finish of the retrieval of the character data, and the character data is output from the outputting unit 16 as a retrieval result. That is, the retrieval operation is finished.

2.4. Problems to be Solved in the Second Previously Proposed Art by the Invention However, the retrieving operation cannot be performed until the preparation of the data file is finished, and it takes a long time to prepare the index file. That is, the operator have to wait to input the specified retrieval character stream to the inputting unit 12 until the document is registered or renewed at a real time and the data file is stored in the storing unit 15. Therefore, there is a drawback that it takes a long time until the second conventional information searching apparatus 11 is set in a request waiting condition.

SUMMARY OF THE INVENTION

A first object of the present invention is to provide, with due consideration to the drawbacks of such a conventional information searching apparatus, an information searching apparatus in which a data base is searched for one or more character streams respectively agreeing with a specified character stream (or a key word) to retrieve the character streams at a high speed and a character stream agreeing with the specified character stream is renewed or deleted at a high speed.

A second object of the present invention is to provide an information searching apparatus in which a searching operation of an index file equivalent to a data base for one or more character streams respectively agreeing with a specified character stream (or a key word) is immediately performed on condition that the character streams are correctly retrieved without waiting the finish of a registration, addition, renewal or deletion operation performed for the index file even though a retrieval operation is requested in the middle of the registration, addition, renewal or deletion operation for the index file.

The first object is achieved by the provision of an information searching apparatus, comprising:

occurrence number table preparing means for preparing an occurrence number table in which one or more occurrence numbers obtained by numbering one or more characters belonging to a character type in a retrieval text in order of occurrence are listed for each character type;

index file preparing means for reconstituting the occurrence numbers listed in the occurrence number table prepared by the occurrence number table preparing means to a plurality of occurrence number patterns which each indicate a set of two occurrence numbers of two adjacent characters in the retrieval text, classifying the occurrence number patterns into a plurality of groups of occurrence number patterns which each corresponds to a character pattern indicating a set of two character types, and preparing an index file in which the groups of occurrence number patterns respectively corresponding to one character pattern are listed, particular types of two adjacent characters indicated by each of the occurrence number patterns agreeing with two character types indicated by a corresponding character pattern; and index file searching means for searching the index file and retrieving a particular character stream agreeing with a key word by producing a series of specified character patterns from a specified character stream indicated by the key word, and selecting a series of particular occurrence number patterns corresponding to the series of specified character patterns on condition that a series of particular characters indicated by the series of particular occurrence number patterns agrees with the particular character stream.

In the above configuration, one or more numerals obtained by numbering one or more characters belonging to a character type in a retrieval text in order of occurrence are called one or more occurrence numbers. Also, a set of two character types is defined as a character pattern, and a set of two occurrence numbers of two adjacent characters in a retrieval text is defined as an occurrence number pattern. An occurrence number table in which one or more occurrence numbers of one or more characters arranged in the retrieval text are listed for each character type is prepared by the occurrence number table preparing means. Thereafter, the occurrence numbers listed in the occurrence number table are reconstituted to a plurality of occurrence number patterns, the occurrence number patterns are classified into a plurality of groups of occurrence number patterns which each corresponds to a character pattern, and an index file in which each group of occurrence number patterns corresponding to one character pattern is listed is prepared by the index file preparing means. Thereafter, the index file is searched by the index file searching means and a particular character stream agreeing with a key word is retrieved. That is, a series of specified character patterns is produced from a specified character stream indicated by the key word, and a series of particular occurrence number patterns corresponding to the series of specified character patterns is selected on condition that a series of particular characters indicated by the series of particular occurrence number patterns agrees with the particular character stream. Therefore, the series of particular characters is retrieved as the particular character stream agreeing with the key word.

Accordingly, because a registering operation performed in the first conventional information searching apparatus while tracing an head address, a size and a pointer of a character string in each line is not adopted but all characters in the retrieval index are replaced with the groups of occurrence number patterns, the index file can be downsized. Therefore, a capacity of a memory for recording the index file can be made small.

Also, all groups of occurrence number patterns corresponding to all character patterns are not searched to retrieve the particular character stream agreeing with the key word, but a particular groups of occurrence number patterns corresponding to the series of specified character patterns obtained from the key word are selected, and a series of particular occurrence number patterns selected from the particular groups of occurrence number patterns is retrieved on condition that a series of particular characters indicated by the series of particular occurrence number patterns agrees with the particular character stream. Therefore, a volume of occurrence number patterns searched can be reduced, and the retrieval of the particular character stream agreeing with the key word can be performed at a high speed.

The second object is achieved by the provision of an information searching apparatus, comprising:

retrieval object storing means for storing one or more retrieval objects;

real time processing data receiving means for receiving one or more pieces of real time processing data respectively corresponding to one of the retrieval objects stored in the retrieval object storing means;

retrieval information receiving means for receiving a piece of retrieval information and a searching request;

real time processing data storing means for storing the pieces of real time processing data received by the real time processing data receiving means;

real time processing means for performing a real time processing for each of the pieces of real time processing data stored in the real time processing data storing means to renew the retrieval objects stored in the retrieval object storing means;

retrieval object searching means for searching each of the retrieval objects stored in the retrieval object storing means to retrieve one or more pieces of first information agreeing with the retrieval information received by the retrieval information receiving means from each of the retrieval objects and outputting a retrieval result indicating the first information;

real time processing data searching means for searching each of one or more pieces of particular real time processing data, which each are not processed by the real time processing means and are stored in the real time processing data storing means, to retrieve one or more pieces of second information agreeing with the retrieval information received by the retrieval information receiving means from each of the pieces of particular real time processing data;

retrieval result revising means for revising the retrieval result output from the retrieval object searching means according to the second information retrieved by the real time processing data searching means to reflect the pieces of particular real time processing data in the retrieval result; and retrieval result outputting means for outputting the retrieval result revised by the retrieval result revising means.

In the above configuration, when one or more pieces of real time processing data are received by the real time processing data receiving means, the pieces of real time processing data are stored in the real time processing data storing means. Thereafter, a real time processing for each of the pieces of real time processing data is performed by the real time processing means, and the retrieval objects stored in the retrieval object storing means are renewed one by one. In this case, when a searching request and a piece of retrieval information are received by the retrieval information receiving means in the middle of the real time processing, one or more pieces of particular real time processing data not processed by the real time processing means remain in the real time processing data storing means. In this case, the real time processing for a piece of particular real time processing data is not performed during a searching operation for the piece of particular real time processing data.

Thereafter, each of the retrieval objects stored in the retrieval object storing means is searched by the retrieval object searching means to retrieve one or more pieces of first information agreeing with the retrieval information, and a retrieval result is obtained. Also, each of the pieces of particular real time processing data is searched by the real time processing data searching means to retrieve one or more pieces of second information agreeing with the retrieval information from each of the pieces of particular real time processing data. Thereafter, the retrieval result is revised by the retrieval result revising means according to the second information and is output by the retrieval result outputting means. Therefore, the pieces of particular real time processing data can be reflected in the retrieval result even though each of particular retrieval objects corresponding to the pieces of particular real time processing data is not renewed by the real time processing means.

Accordingly, because a searching operation is performed when a searching request is received regardless of whether a real time processing for each of the real time data is finished, a searching operation can be immediately performed without waiting the finish of the real time processing such as a registration, addition, renewal or deletion operation.

Also, even though one or more pieces of particular real time processing data respectively not processed by the real time processing means remain in the real time processing data storing means because the searching operation is started in the middle of the real time processing, because each of the pieces of particular real time processing data is searched by the real time processing data searching means and the retrieval result is revised by the retrieval result revising means according to the second information retrieved from the pieces of particular real time processing data, the searching operation can be correctly performed.

It is preferred that the information searching apparatus further comprise:

duplicate real time processing avoiding means for changing a piece of real time processing data, which corresponds to a particular retrieval object and is stored in the real time processing data storing means, to a piece of revised real time processing data corresponding to the same particular retrieval object in cases where a piece of duplicate real time processing data corresponding to the same particular retrieval object is received by the real time processing data receiving means and abandoning the duplicate real time processing data.

In the above configuration, because a duplicate real time processing for the duplicate processing data is avoided, a real time processing can be efficiently performed at a high speed.

It is preferred that the information searching apparatus further comprise:

existence judging table preparing means for preparing an existence judging table in which all components of a piece of specified real time processing data stored in the real time processing data storing means exist; and retrieving operation control means for judging whether or not all components of the retrieval information exist in the existence judging table prepared by the existence judging table preparing means and controlling the real time processing data searching means to stop searching the specified real time processing data in cases where all components of the retrieval information do not exist in the existence judging table.

In the above configuration, because the existence judging table is prepared, when the specified real time processing data is searched to retrieve one or more pieces of second information agreeing with the retrieval information, the judgement whether or not all components of the retrieval information exist in the existence judging table can be performed, and a searching operation performed by the real time processing data searching means can be stopped when it is judged that all components of the retrieval information do not exist in the existence judging table. Therefore, the searching operation can be performed at a high speed.

It is preferred that the information searching apparatus further comprise:

duplicate retrieving operation avoiding means for selecting a piece of latest real time processing data corresponding to a particular retrieval object from a plurality of pieces of real time processing data corresponding to the same particular retrieval object stored in the real time processing data storing means, controlling the real time processing data searching means to retrieve the second information agreeing with the retrieval information from the latest real time processing data, and controlling the real time processing data searching means not to perform a searching operation for the other pieces of real time processing data corresponding to the same particular retrieval information.

In the above configuration, because a searching operation is performed for the latest real time processing data corresponding to a particular retrieval object in cases where a plurality of real time processing data corresponding to the same particular retrieval object are stored in the real time processing data storing means and because any searching operation is not performed for the other pieces of real time processing data corresponding to the same particular retrieval object, a searching operation can be performed at a high speed.

It is preferred that the information searching apparatus further comprise:

finishing request receiving means for receiving a finishing request;

forced finishing operation requesting means for requesting the real time processing means to forcibly finish a real time processing in cases where the finishing request is received by the finishing request receiving means to remain one or more pieces of specified real time processing data not processed by the real time processing means in the real time processing data storing means; and finishing condition storing means for storing the pieces of specified real time processing data remained by the forced finishing operation requesting means.

In the above configuration, even though a large volume of real time processing data are stored in the real time processing data storing means, because a real time processing for a piece of current real time processing data is forcibly finished when a finishing request is received, there is no case that a user waits for the finish of the real time processing for all real time processing data for a long time. Therefore, the user can immediately perform another type of operation by using the information searching apparatus.

It is preferred that the information searching apparatus further comprise:

starting request receiving means for receiving a starting request; and starting operation requesting means for requesting the real time processing means to restart the real time processing forcibly finished by the forced finishing operation requesting means in cases where the starting request is received by the starting request receiving means.

In the above configuration, even though the real time processing for all real time processing data is not finished, because one or more pieces of specified real time processing data not processed are stored in the finishing condition storing means, the pieces of specified real time processing data not processed can be processed when a starting request is received. Therefore, the real time processing for all real time processing data can be correctly performed regardless of a volume of the real time processing data.

It is preferred that the information searching apparatus further comprise:

retrieval time measuring means for measuring a retrieval time at which a particular retrieval object stored in the retrieval object storing means is searched by the retrieval object searching means or a pieces of particular real time processing data for a particular retrieval object stored in the real time processing data storing means is searched by the real time processing data searching means;

renewing time measuring means for measuring a renewing time at which the particular retrieval object stored in the retrieval object storing means is renewed by the real time processing means;

renewing operation informing means for judging whether or not the retrieval time measured by the retrieval time measuring means is later than the renewing time measured by the renewing time measuring means and preparing a piece of renewing information indicating that a renewing operation for the particular retrieval object is performed after the particular retrieval object is searched by the retrieval object searching means or the real time processing data searching means in cases where the renewing time is later than the retrieval time; and renewing information outputting means for outputting an identifying number of the particular retrieval object and the renewing information obtained by the renewing operation informing means in cases where the renewing time is later than the retrieval time.

In the above configuration, because it is judged whether or not a retrieving time is later than a renewing time, even though a particular retrieval object is renewed after a searching operation is performed for the particular retrieval object, a piece of renewing information can be informed a user.

BRIEF DESCRIPTION OF THE DRAWINGS

The objects, features and advantages of the present invention will be apparent from the following description taken in conjunction with the accompanying drawings, in which:

FIG. 4 shows an occurrence number table in which a plurality of occurrence numbers are listed for each type of character;

FIG. 5 shows an index file in which one or more occurrence number patterns are listed for each character pattern;

FIG. 8 shows an index file in which one or more occurrence number patterns are listed for each character pattern;

FIG. 10 shows a pair of specific character patterns adjacent to each other in a key word and a plurality of occurrent number patterns corresponding to each of the specific character patterns;

FIG. 12 shows an occurrence number table prepared from a revised retrieval text according to the second embodiment;

FIG. 13 shows a list of occurrence number patterns in which one or more occurrence number patterns correspond to each character pattern according to the second embodiment;

FIG. 14 shows an index file in which one Or more occurrence number patterns are listed for each character pattern according to the second embodiment;

FIG. 16 shows an occurrence number table prepared from a revised retrieval text according to a third embodiment;

FIG. 17 shows a list of occurrence number patterns in which one or more occurrence number patterns correspond to each character pattern according to the third embodiment;

FIG. 18 shows an index file in which one or more occurrence number patterns are listed for each character pattern according to the third embodiment;

FIG. 21 shows an example of a processing data set;

FIG. 22 shows an example of a processing data set with a pair of flags;

FIG. 23 shows a list of a plurality of processing data sets no processed and a plurality of processed data sets already processed stored in a real time processing data storing unit;

FIG. 24 shows a configuration of a piece of display data;

FIG. 25 shows an example of pieces of display data;

FIG. 27 shows a configuration of an index file stored in the index file storing unit;

FIG. 28A shows an original index file in which one or more character information patterns (PC1, DN) correspond to each of a plurality of character patterns (C1, C2);

FIG. 28B shows a revised index file in which one or more character information patterns (PC1, DN) correspond to each of a plurality of character patterns (C1, C2);

FIG. 47 is a flow chart showing the recording of a retrieval time;

FIG. 48 shows a configuration of a set of a data number and a retrieval time;

FIG. 49 shows an example of a set of a data number and a retrieval time;

FIG. 54 is an example of the renewing and non-renewing information output from a renewing information outputting unit.

DETAIL DESCRIPTION OF THE EMBODIMENTS

Figure 1:
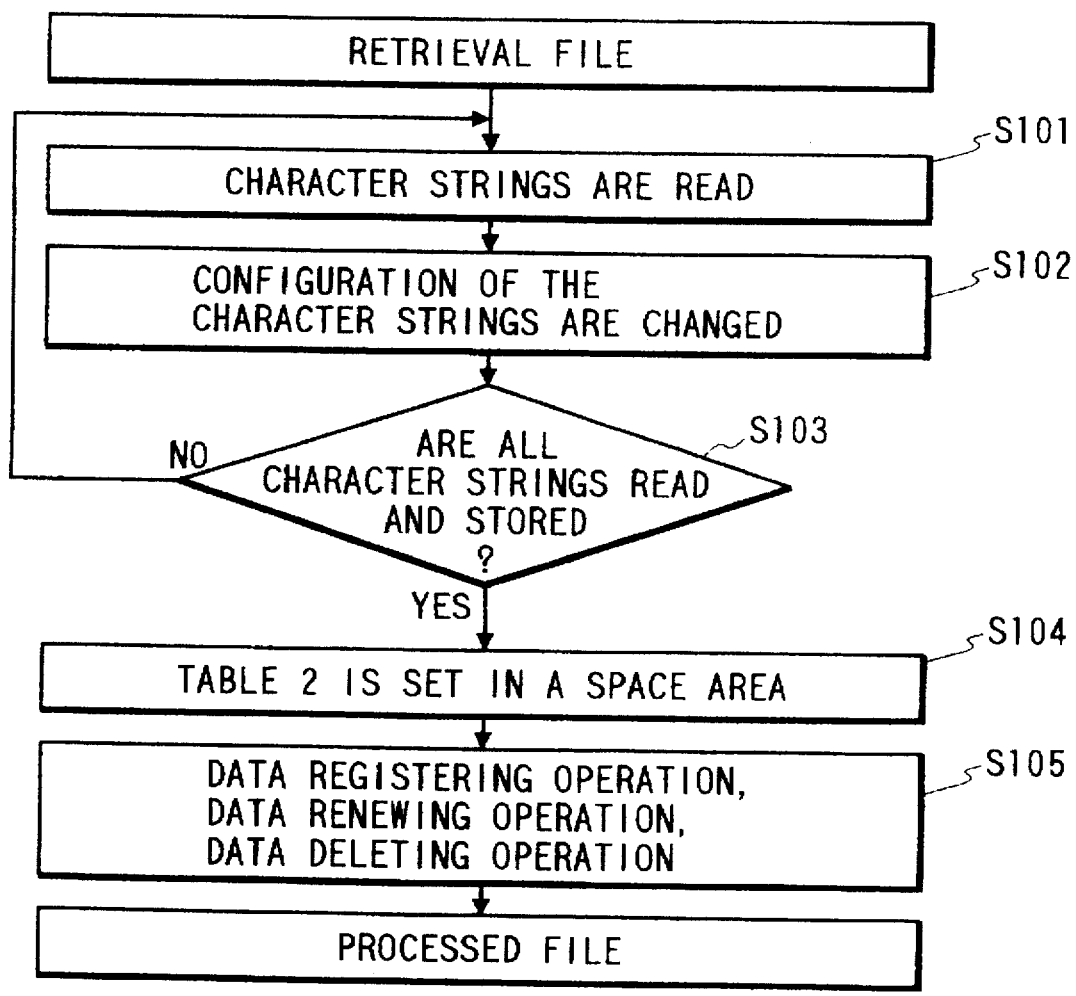
FIG. 1 is a flow chart showing a procedure performed in a first conventional information searching apparatus.
Figures 2, 3:
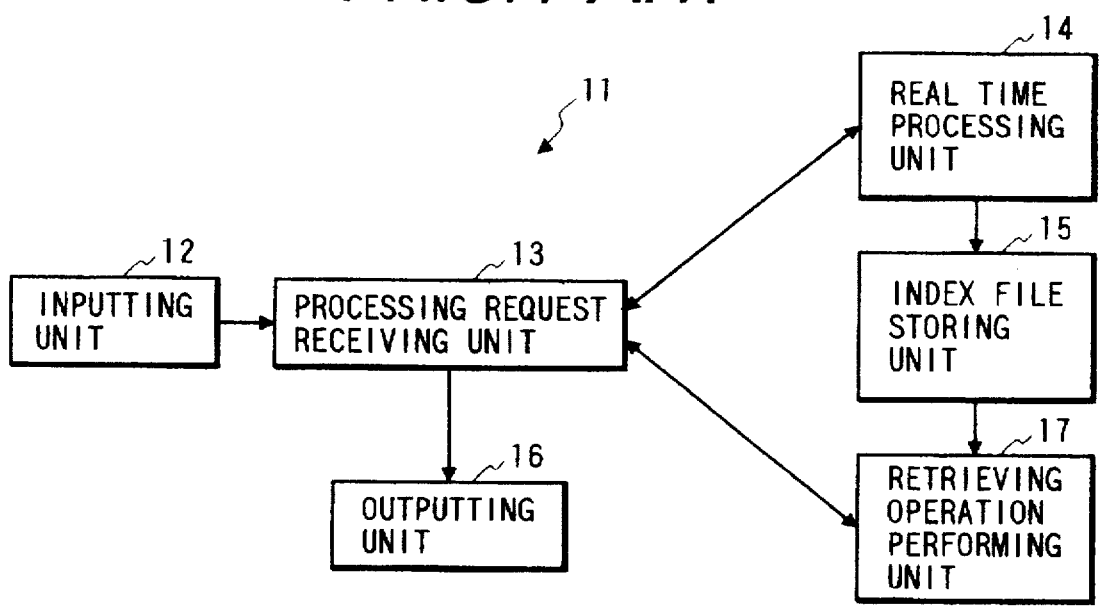
FIG. 2 shows an original data table and a changed data table used for the first conventional information searching apparatus to show a flow of data recorded in the original data table.
FIG. 3 is a block diagram of a second conventional information searching apparatus.

Preferred embodiments of an information searching apparatus according to the present invention are described with reference to drawings.

A searching method for searching an index file for one or more character streams agreeing with a key word (or a specified character stream) is initially described according to a first embodiment of the present invention.

FIG. 4 shows an occurrence number table in which a plurality of occurrence numbers are listed for each type of character, and FIG. 5 shows an index file in which one or more occurrence number patterns are listed for each character pattern.

As shown in FIG. 4, a plurality of characters arranged in a retrieval text are classified according to a plurality of character types, and one or more characters belonging to the same character type are numbered from 1 in order of occurrence to prepare an occurrence number table in which occurrence numbers for each character type are listed in the increasing order. For example, in cases where a character stream "AAIAAIANNAANAI" composed of three character types "A", "I" and "N" is recorded in a retrieval text, the configuration of an occurrence number table is as follows. The characters "A" of the character stream are numbered from 1 to 8 in order of occurrence, the characters "I" of the character stream are numbered from 1 to 3 in order of occurrence, the characters "N" of the character stream are numbered from 1 to 3 in order of occurrence, the character "I" numbered 1 is placed between the characters "A" numbered 2 and 3, the character "I" numbered 2 is placed between the characters "A" numbered 4 and 5, the characters "N" numbered 1 and 2 are placed between the characters "A" numbered 5 and 6, the character "N" numbered 3 is placed between the characters "A" numbered 7 and 8, and the character "I" numbered 3 follows the character "A" numbered 8.

Also, a pattern for a set of two character types is defined as a character pattern, and a pattern for two occurrence numbers of two adjacent characters of which types correspond to one character pattern is defined as an occurrence number pattern. For example, three character patterns (A,A), (A,I) and (I,A) are obtained from a partial character stream "AAIA", and three occurrence number patterns (1,2), (2,1) and (1,3) are obtained from the partial character string "AAIA".

Thereafter, as shown in FIG. 5, one or more occurrence number patterns respectively corresponding to one character pattern are gathered in the order of increasing the occurrence numbers for each character pattern, and a list of occurrence number patterns is prepared as an index file for each retrieval text.

Thereafter, when a specified character stream "AIA" is, for example, prepared as a key word, a first specified character pattern (A,I) and a second specified character pattern (I,A) are obtained from the key word. To retrieve one or more character stream agreeing with the key word from the retrieval text by collating the specified character patterns of the key word with a series of character patterns of the retrieval text, one or more occurrence number patterns corresponding to each of the character patterns agreeing with the specified character patterns (A,I) and (I,A) of the key word are picked up from the list of occurrence number patterns shown in FIG. 5. Therefore, the occurrence number patterns (2,1), (4,2) and (8,3) corresponding to the first character pattern (A,I) and the occurrence number patterns (1,3) and (2,5) corresponding to the second character pattern (I,A). In this case, when a second element of one particular occurrence number pattern corresponding to the first character pattern (A,I) agrees with a first element of another particular occurrence number pattern corresponding to the second character pattern (I,A), a character stream of the retrieval text corresponding to the particular occurrence number patterns agrees with the key word. In this example, the second element (1) of the occurrence number pattern (2,1) agrees with the first element (1) of the occurrence number pattern (1,3), and the second element (2) of the occurrence number pattern (4,2) agrees with the first element (2) of the occurrence number pattern (2,5). Therefore, two character streams agreeing with the key word exist in the retrieval text. Thereafter, two character streams corresponding to the particular occurrence number patterns are retrieved from the retrieval text by referring the occurrence number table shown in FIG. 4.

Figure 6:
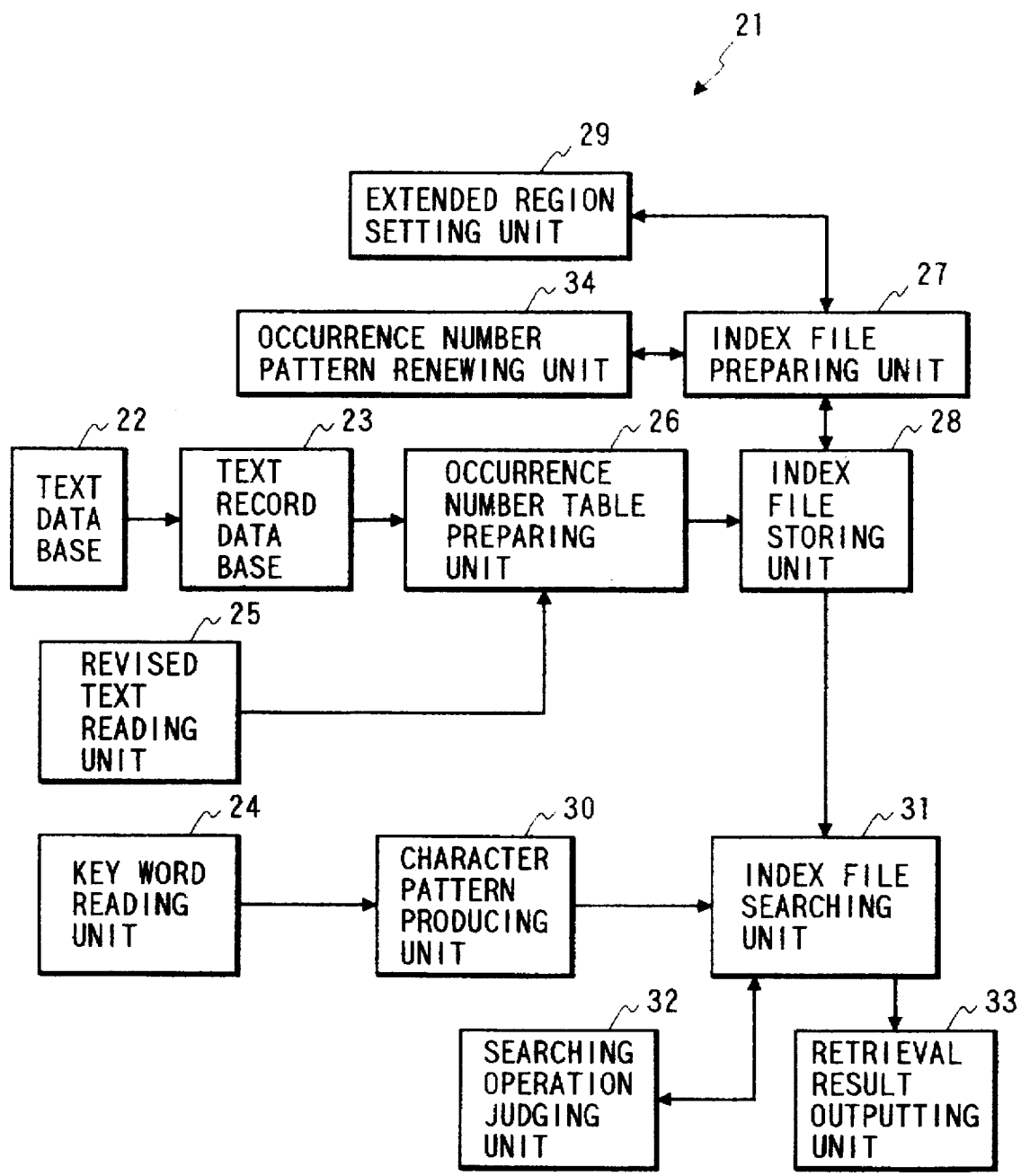
FIG. 6 is a block diagram of an information searching apparatus according to first, second and third embodiments of the present invention.

FIG. 6 is a block diagram of an information searching apparatus according to first, second and third embodiments of the present invention.

As shown in FIG. 6, an information searching apparatus 21 comprises a text data base 22 for storing a plurality of retrieval texts prepared by an operator as a data base, a text record producing unit 23 for reading the retrieval texts stored in the text data base 22 one by one and producing a text record corresponding to each of the retrieval texts, a key word reading unit 24 for reading a key word prepared by the operator, a revised text reading unit 25 for reading a revised text prepared by the operator and producing a revised text record, an occurrence number table preparing unit 26 for preparing an occurrence number table, in which a plurality of occurrence numbers are listed for each type of character, from the text records produced by the text record producing unit 23 or the revised text record produced by the revised text reading unit 25, an index file preparing unit 27 for preparing a list of occurrence number patterns, in which one or more occurrence number patterns are listed for each character pattern, as an index file from the occurrence number table produced in the preparing unit 26, an index file storing unit 28 for storing the occurrence number table produced in the preparing unit 26 and the index file (or the list of occurrence number patterns) prepared in the index file preparing unit 27, an extended region setting unit 29 for additionally setting one or more extended regions Re1 following recording regions of one or more occurrence number patterns corresponding to each character pattern in the index file, a character pattern producing unit 30 for producing a plurality of specified character patterns from the key word read by the key word reading unit 24, an index file searching unit 31 for searching the index file stored in the index file storing unit 28 for one or more retrieval character streams respectively agreeing with the key word by collating a series of three characters of the index file with a pair of specified character patterns of the key word, a searching operation judging unit 32 for judging whether or not a text record is searched by the index file searching unit for all characters which relate to all occurrence number patterns corresponding to one character pattern produced in the character pattern producing unit 30, a retrieval result outputting unit 33 for temporarily storing a series of three characters corresponding to the pair of character patterns selected in the searching unit 31 and outputting the retrieval character streams obtained in the index file searching unit 31 as a retrieval result, and an occurrence number pattern renewing unit 34 for renewing an occurrence number pattern of the index file in a text revising operation according to the revised text read by the revised text reading unit 25.

In the above configuration, an index file registering operation for registering one or more retrieval texts as one or more index files and a searching operation for searching one index file for one or more retrieval character streams respectively agreeing with a key word according to the searching method are described. Therefore, the revised text reading unit 25 or the occurrence number pattern renewing unit 34 is not used in the first embodiment but used in the second and third embodiments.

Figure 7:
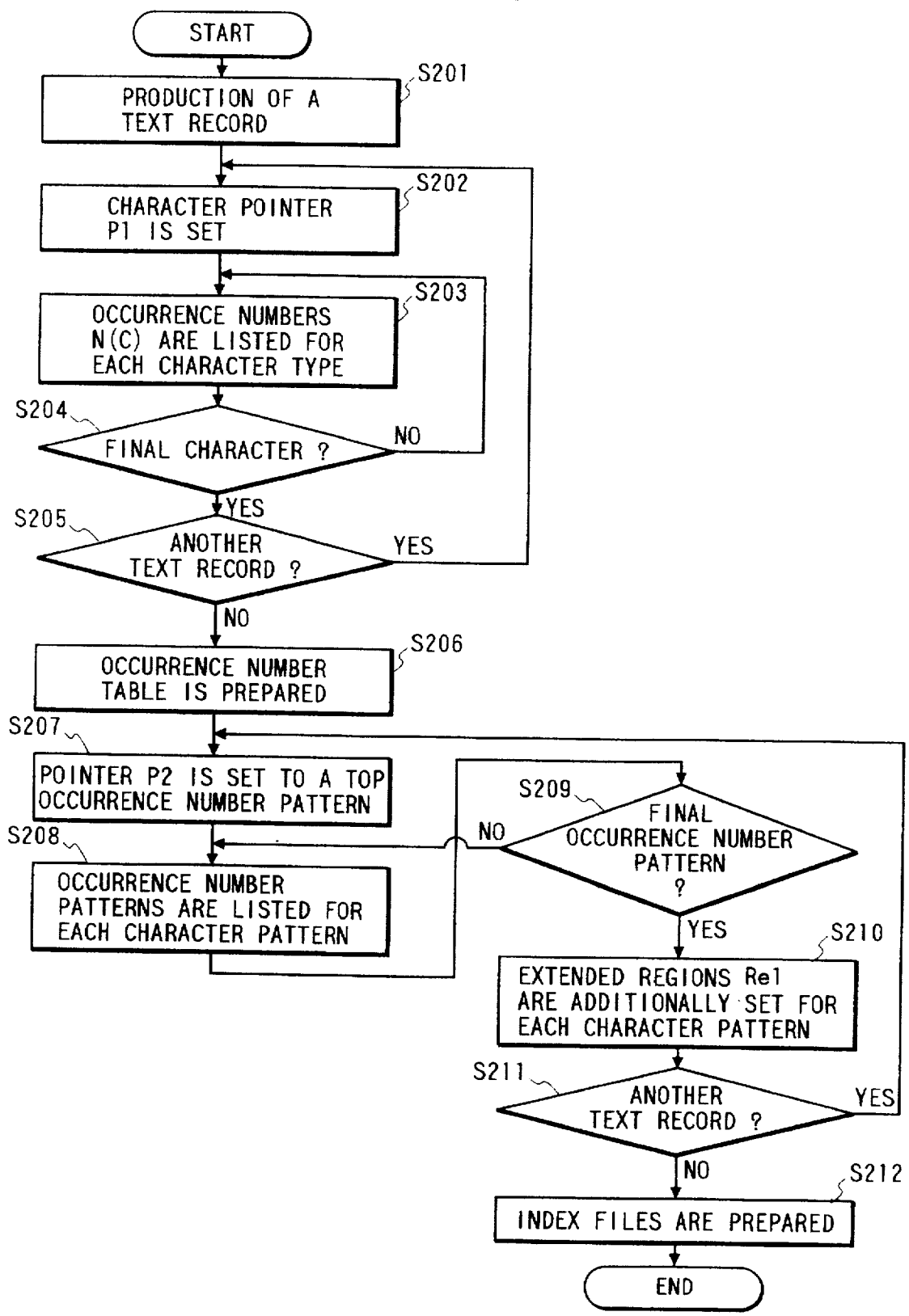
FIG. 7 is a flow chart showing an index file registering operation performed according to the searching method.

FIG. 7 is a flow chart showing the index file registering operation performed according to the searching method.

As shown in FIG. 7, a plurality of retrieval texts are read from the text data base 22 to the text record producing unit 23 one by one, and a record number Ni is attached to each of the retrieval texts to produce a text record corresponding to each of the retrieval texts (step S201). Thereafter, a current text record "AAIAAIANNAANAI" is, for example, transmitted to the preparing unit 26. In the preparing unit 26, an occurrence number N(C) for each type of character is initially set to zero. Here, a symbol C of N(C) indicates a type of character (C=A for a type of character A, C=I for a type of character I, and C=N for a type of character N). Thereafter, a character pointer P1 is initially set to a head character of the current text record (step S202). Thereafter, one or more characters belonging to the same character type are numbered from 1 in order of occurrence for each character type while shifting the character pointer P1 character by character (step S203). Therefore, a plurality of occurrence numbers N(C) are listed for each character type. Thereafter, it is judged whether or not the character pointer P1 is set to a final character of the current text record (step S204). In cases where the character pointer P1 is not set to the final character of the current text record, the step S203 is continued. In contrast, in cases where an occurrence number N(C) for the final character of the current text record has been counted, a partial occurrence number table for the current text record is prepared as shown in FIG. 4 and is stored in the storing unit 28. Thereafter, it is judged whether or not a text record not processed in the steps S202 and S203 remains in the text record producing unit 23 (step S205). In cases where a following text record not processed remains, the following text record is processed in the steps S202 and S203 in the same manner, and another partial occurrence number table for the following text record is prepared and stored in the storing unit 28. When all text records are processed in the steps S202 and S203, the preparation of an occurrence number table for all text records is finished in the occurrence number table preparing unit 26 (step S206), and the occurrence number table for all text records is stored in the storing unit 28.

Thereafter, a list of occurrence number patterns is prepared by the index file preparing unit 27. In detail, an occurrence number pattern pointer P2 is initially set to a top occurrence number pattern of a current text record N1 of the occurrence number table stored in the storing unit 28 (step S207), one or more occurrence number patterns indicated by the pattern pointer P2 one by one are listed in an index file for each character pattern while shifting the pattern pointer P2 pattern by pattern (step S208). Thereafter, it is judged whether or not the pattern pointer P2 is set to a final occurrence number pattern of the current text record N1 of the occurrence number table (step S209). In cases where the pattern pointer P2 is not set to the final occurrence number pattern of the current text record N1, the step S208 is continued. In contrast, in cases where the final occurrence number pattern of the current text record N1 has been listed, two extended regions Re1 following recording regions of one or more occurrence number patterns are additionally set for each character pattern of the current text record Hi (step S210). The addition of the extended regions Re1 is performed by the extended region setting unit 29, the final occurrence number pattern corresponding to each character pattern is again recorded in a first extended region Re1, and nothing is recorded in a second extended region Re1 following the first extended region. The second extended region Re1 is arranged to record an additional occurrence number pattern obtained in an index file revising operation. Therefore, a list of occurrence number patterns for the current text record N1 is prepared by the index file preparing unit 27 as shown in FIG. 8 and is registered as an index file N1 in the storing unit 28. Thereafter, it is judged whether or not a text record not processed in the steps S207 and S208 remains in the text record producing unit 23 (step S211). In cases where a following text record not processed remains, the following text record is processed in the steps S207 to S210 in the same manner, and another list of occurrence number patterns for the following text record is prepared and stored as another index file in the storing unit 28. When all text records are processed in the steps S207 and S208, the preparation of one or more index files for all text records is finished in the index file preparing unit 27 (step S212), and the index files are stored in the storing unit 28. That is, the index file registering operation for all text records is finished.

In this case, first and second elements (or occurrence numbers) Ai and Bi of the occurrent number patterns (Ai, Bi) corresponding to each character pattern are arranged in the order of increasing the occurrence number. That is, the relationship Al<A2<---<Am and Bi<B2<---<Bm is satisfied.

Next, a searching operation for searching the index file for one or more retrieval character streams respectively agreeing with a key word is described according to the searching method.

Figure 9:
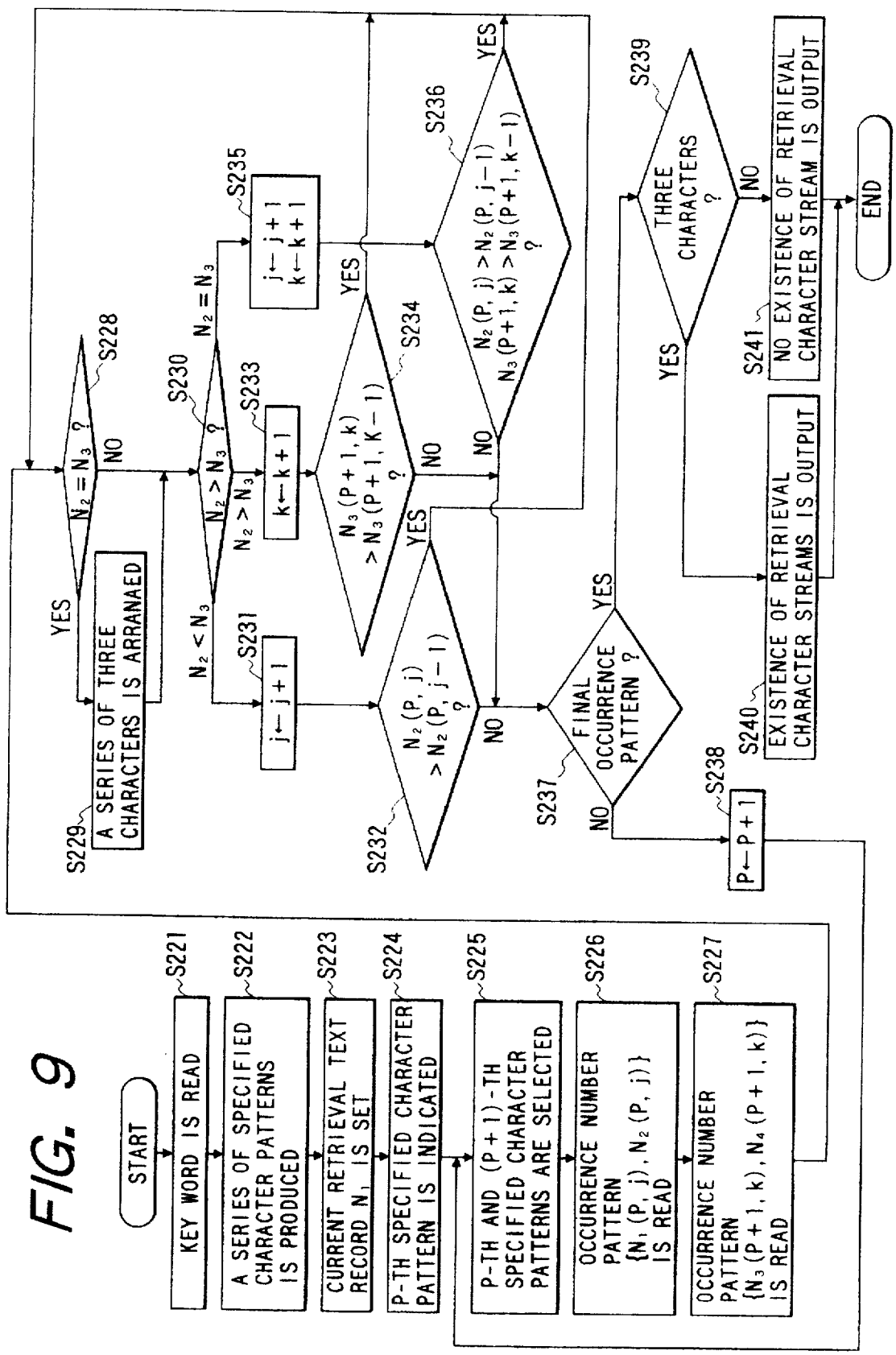
FIG. 9 is a flow chart showing the searching operation performed according to a searching method.

FIG. 9 is a flow chart showing the searching operation performed according to the searching method.

As shown in FIG. 9, a key word prepared by the operator is read (step S221), and a series of specified character patterns {C1(p), C2(p)}, {C1(p+1), C2(p+1)}, - - - is produced from the key word by the producing unit 30 (step S222). Here, a symbol C1(p) denotes a first character in a p-th specified character pattern of the key word, and a symbol C2(p) denotes a second character in the p-th specified character pattern of the key word. For example, a first specified character pattern "AI" and a second specified character pattern "IA" are extracted from the key word "AIA". Thereafter, a record number N1 is set for a current retrieval text record by the searching unit 31 (step S223), and a p-th specified character pattern of the key word is indicated by a key word pointer P3 (step S224). A first character of the key word is initially indicated by the pointer P3 (p=1). Thereafter, the p-th specified character pattern {C1(p), C2(p)} and a (p+1)-th specified character pattern {C1(p+1), C2(p+1)} of the key word are selected as two specified character patterns relating to a retrieval operation (step S225). The two top specified character patterns {C1(1), C2(1)}=(A,I) and {C1(2), C2(2)}=(I,A) of the key word are, for example, initially set. The steps S221 to S225 are performed by the key word reading unit 24.

Thereafter, as shown in FIG. 10, an occurrence number pattern {N1(p,j), N2(p,j)} corresponding to the p-th specified character pattern {C1(p), C2(p)} is read from the index file stored in the storing unit 28 (step S226) to the index file searching unit 31. Here, a symbol N1(p,j) denotes an occurrence number N1 of a first element of a j-th occurrence number pattern among a plurality of occurrence number patterns corresponding to the p-th specified character pattern {C1(p), C2(p)}, and a symbol N2(p,j) denotes an occurrence number N2 of a second element of the j-th occurrence number pattern. An occurrence number pattern {N1(p, 1), N2(p,1)}=(2,1) is initially read from the index file. Also, as shown in FIG. 10, an occurrence number pattern {N3(p+1, k), N4(p+1,k)} corresponding to the (p+1)-th specified character pattern {C1(p+1), C2(p+1)} is read from the index file stored in the storing unit 28 to the index file searching unit 31 (step S227). Here, a symbol N3(p+1,k) denotes an occurrence number N3 of a first element of a k-th occurrence number pattern among a plurality of occurrence number patterns corresponding to the (p+1)-th specified character pattern {C1(p+1), C2(p+1)}, and a symbol N4(p,k) denotes an occurrence number N4 of a second element of the k-th occurrence number pattern. An occurrence number pattern {N3(p,1), N4(p,1)}=(1,3) is initially read from the index file.

Thereafter, it is judged by the index file searching unit 31 whether or not the occurrence number N2 of the second element of the occurrence number pattern {N1(p,j), N2(p,j)} agrees with the occurrence number N3 of the first element of the occurrence number pattern {N3(p+1,k), N4(p+1,k)} (step S228). In cases where the occurrence number N2 agrees with the occurrence number N3, a series of three characters which corresponds to the occurrence number patterns {N1(p,j), N2(p,j)} and {N3(p+1,k), N4(p+1,k)} is arranged in the current retrieval text record N1 and is temporarily stored with the record number N1 of the current retrieval text in the retrieval result outputting unit 33 (step S229), and the procedure proceeds to a step S230 to retrieve another series of three characters corresponding to the specified character patterns {C1(p), C2(p)} and {C1(p+1), C2(p+1)} from the current retrieval text N1. In contrast, in cases where the occurrence number N2 differs from the occurrence number N3 in the step S228, the procedure proceeds to the step S230 without outputting any series of three characters.

In the step S230, it is judged in the searching unit 31 whether or not the occurrence number N2 of the second element of the occurrence number pattern {N1(p,j), N2(p,j)} is higher than the occurrence number N3 of the first element of the occurrence number pattern {N3(p+1,k), N4(p+1,k)}. In cases where the occurrence number N3 is higher than the occurrence number N2, the value j is incremented (j←j+1) to check a following occurrence number pattern {N1(p,j), N2(p,j)} (step S231), and it is judged whether or not the occurrence number N2(p,j) of the first element of the occurrence number pattern {N1(p,j), N2(p,j)} is higher than the occurrence number N2 (p,j-1) (step S232). That is, it is judged whether or not the occurrence number pattern {N1(p,j), N2(p,j)} is recorded in the first extended region Re1. In cases where the occurrence number N2(p,j) is higher than the occurrence number N2(p,j-1), because the occurrence number pattern {N1(p,j), N2(p,j)} is not recorded in the extended region Re1, the procedure returns to the step S228. In contrast, in cases where the occurrence number N2(p,j) is equal to or lower than the occurrence number N2(p,j-1), because the occurrence number pattern {N1(p,j), N2(p,j)} is recorded in the first extended region Re1, the procedure proceeds to a step S237. Also, in cases where the occurrence number N3 is lower than the occurrence number N2 in the step S230, the value k is incremented (k←k+1) (step S233), and it is judged whether or not the occurrence number N3(p+1,k) of the first element of the occurrence number pattern {N3(p+1,k), N4(p+1,k)} is higher than the occurrence number N3(p+1,k−1) (step S234). That is, it is judged whether or not the occurrence number pattern {N3(p+1,k), N4(p+1,k)} is recorded in the first extended region Re1. In cases where the occurrence number N3(p+1,k) is higher than the occurrence number N3(p+1,k−1), the procedure returns to the step S228. In contrast, in cases where the occurrence number N3(p+1,k) is equal to or lower than the occurrence number N3(p+1,k−1), the procedure proceeds to the step S237. Also, in cases where the occurrence number N3 is equal to the occurrence number N2 in the step S230, the values j and k are incremented (k←k+1, j←j+1) (step S235), and it is judged whether or not the occurrence number N2(p,j) of the second element of the occurrence number pattern {N1(p,j), N2(p,j)} is higher than the occurrence number N2(p,j−1) and it is judged whether or not the occurrence number N3(p+1,k) of the first element of the occurrence number pattern {N3(p+1,k), N4(p+1,k)} is higher than the occurrence number N3(p+1,k−1) (step S236). That is, it is judged whether or not the occurrence number pattern {N1(p,j), N2(p,j)} is recorded in the first extended region Re1 and it is judged whether or not the occurrence number pattern {N3(p+1,k), N4(p+1,k)} is recorded in the extended region Re1. In cases where the occurrence number N2(p,j) is higher than the occurrence number N2(p,j−1) and the occurrence number N3(p+1,k) is higher than the occurrence number N3 (p+1,k−1), the procedure returns to the step S228. In contrast, in cases where the occurrence number N2(p,j) is equal to or lower than the occurrence number N2(p,j−1) or the occurrence number N3(p+1,k) is equal to or lower than the occurrence number N3(p+1,k−1), the procedure proceeds to the step S237.

For example, in cases where the key word "AIA" is read by the key word reading unit 24, the occurrence number patterns (2,1), (4,2) and (8,3) and the occurrence number pattern (8,3) recorded in the first extended region Re1 correspond to the first (p=1) specified character pattern (A,I), and the occurrence number patterns (1,3) and (2,5) and the occurrence number pattern (2,5) recorded in the extended region correspond to the second (p=2) specified character pattern (I,A). Therefore, it is judged in the step S228 whether or not the occurrence number of the second element of the first (j=1) occurrence number pattern (2,1) agrees with the occurrence number of the first element of the first (k=1) occurrence number pattern (1,3). Because the occurrence number "1" of the second element of the first (j=1) occurrence number pattern (2,1) agrees with the occurrence number "1" of the first element of the first (k=1) occurrence number pattern (1,3), a series of three characters "AIA" which corresponds to the occurrence number patterns (2,1) and (1,3) is temporarily stored in the outputting unit 33 in the step S229. Thereafter, the values j and k are incremented in the step 235, and it is judged in the step S228 that the occurrence number "2" of the second element of the second (j=2) occurrence number pattern (4,2) agrees with the occurrence number "2" of the first element of the second (k=2) occurrence number pattern (2,5). Therefore, a series of three characters "AIA" which corresponds to the occurrence number patterns (4,2) and (2,5) is temporarily stored in the outputting unit 33 in the step S229. Thereafter, the values j and k are incremented in the step 235, and it is judged in the step S236 that the occurrence number "2" of the first element of the second (k=2) occurrence number pattern (2, 5) is equal to the occurrence number "2" of the first element of the third (k=3) occurrence number pattern (2,5). Therefore, the procedure proceeds to the step S237.

In the step S237, because all characters of the current retrieval text which relate to all occurrence number patterns corresponding to the p-th specified character pattern of the key word and all occurrence number patterns corresponding to the (p+1)-th specified character pattern are searched, it is judged whether or not the (p+1)-th specified character pattern is a final specified character pattern in the key word. In other words, it is judged by the searching unit 31 whether or not the occurrence number patterns corresponding to all specified character patterns obtained from the key word are examined. In cases where the (p+1)-th specified character pattern is not a final specified character pattern in the key word, the value p is incremented (p←p+1) in a step S238, and the procedure returns to the step S225 to retrieve one or more pairs of characters of the current retrieval text agreeing with another pair of specified character patterns. In contrast, in cases where the (p+1)-th specified character pattern is a final specified character pattern in the key word, because the occurrence number patterns corresponding to all specified character patterns obtained from the key word are examined, it is judged whether or not the storage of a series of three characters for each pair of specified character patterns exists in the step S229 (step S239). In cases where a series of three characters for each pair of specified character patterns is stored in the step S229, one or more retrieval character streams are produced by connecting the series of three characters for each pair of specified character patterns, and a piece of information indicating the existence of the retrieval character streams and the record number N1 of the current retrieval text are output as a retrieval result from the retrieval result outputting unit 33 (step S240). In contrast, in cases where a series of three characters for each pair of specified character patterns is not stored in the step S229, a piece of information indicating no existence of a retrieval character stream and the record number N1 of the current retrieval text are output as a retrieval result from the retrieval result outputting unit 33 (step S241).

As is described above, in the first embodiment, an occurrence number table is prepared for each retrieval text record Ni in the occurrence number table preparing unit 26 and is stored in the index file storing unit 28, a list of occurrence number patterns is prepared for each retrieval text record Ni in the index file preparing unit 27 according to the occurrence number table stored in the storing unit 28 while additionally setting two extended regions Re1 for each specified character pattern by the function of the extended region setting unit 29 and is stored in the storing unit 28 as an index file for each of the retrieval text records, a pair of occurrent number patterns corresponding to a pair of specified character patterns adjacent to each other in a key word read by the key word reading unit 24 are found out in the index file searching unit 31, it is judged in the index file searching unit 31 whether or not the pair of occurrent number patterns exist for each pair of specified character patterns adjacent to each other in the key word, and a piece of information indicating the existence or no-existence of the retrieval character stream in the current retrieval text are output as a retrieval result from the retrieval result outputting unit 33. Therefore, each retrieval text stored in the text data base 22 can be substantially searched and one or more retrieval character streams respectively agreeing with the key word can be retrieved.

Also, because the occurrent number patterns for each character pattern in the list of occurrence number patterns are arranged in the order of increasing the occurrence number, each of the occurrence number patterns can be checked in the order of increasing the occurrence number. Therefore, all occurrence number patterns corresponding to the pair of specified character patterns of the key word can be searched at a high speed.

In the first embodiment, as shown in FIG. 5, the occurrent number patterns for each character pattern in the list of occurrence number patterns are arranged in the order of increasing the occurrence number. However, it is applicable that the occurrent number patterns in the list be arranged in the order of decreasing the occurrence number.

Also, the second extended region Re1 is additionally set for each character pattern in the index file. However, it is applicable that a plurality of second extended regions be additionally set for each character pattern in the index file.

Also, one or more character streams agreeing with the key word are retrieved by searching the retrieval text in the information searching apparatus 21. However, the first embodiment is not limited to the retrieval of the character streams. That is, it is applicable that one or more patterned data streams agreeing with a key word be retrieved.

Next, a renewing operation for the index file stored in the storing unit 28 is described according to a second embodiment of the present invention.

As shown in FIG. 6, when a revised text prepared by the operator is read and a revised text record is produced in the revised text reading unit 25, a revised occurrence number table is produced according to the revised text record in the occurrence number table preparing unit 26 and is stored in the storing unit 28. Thereafter, a list of revised occurrence number patterns for the revised text is prepared for each of character patterns as a revised index file N1R in the index file preparing unit 27, and the revised index file N1R is replaced with an original index file N1 stored in the storing unit 28. In this case, when the number of revised occurrence number patterns for a particular character pattern of the revised index file N1R is higher than the number of occurrence number patterns of the original index file N1, a revised extended region Re2 is added to again record a final revised occurrence number pattern corresponding to each particular character pattern of the revised index file N1R.

The renewing operation is described in detail with reference to FIG. 11.

Figure 11:
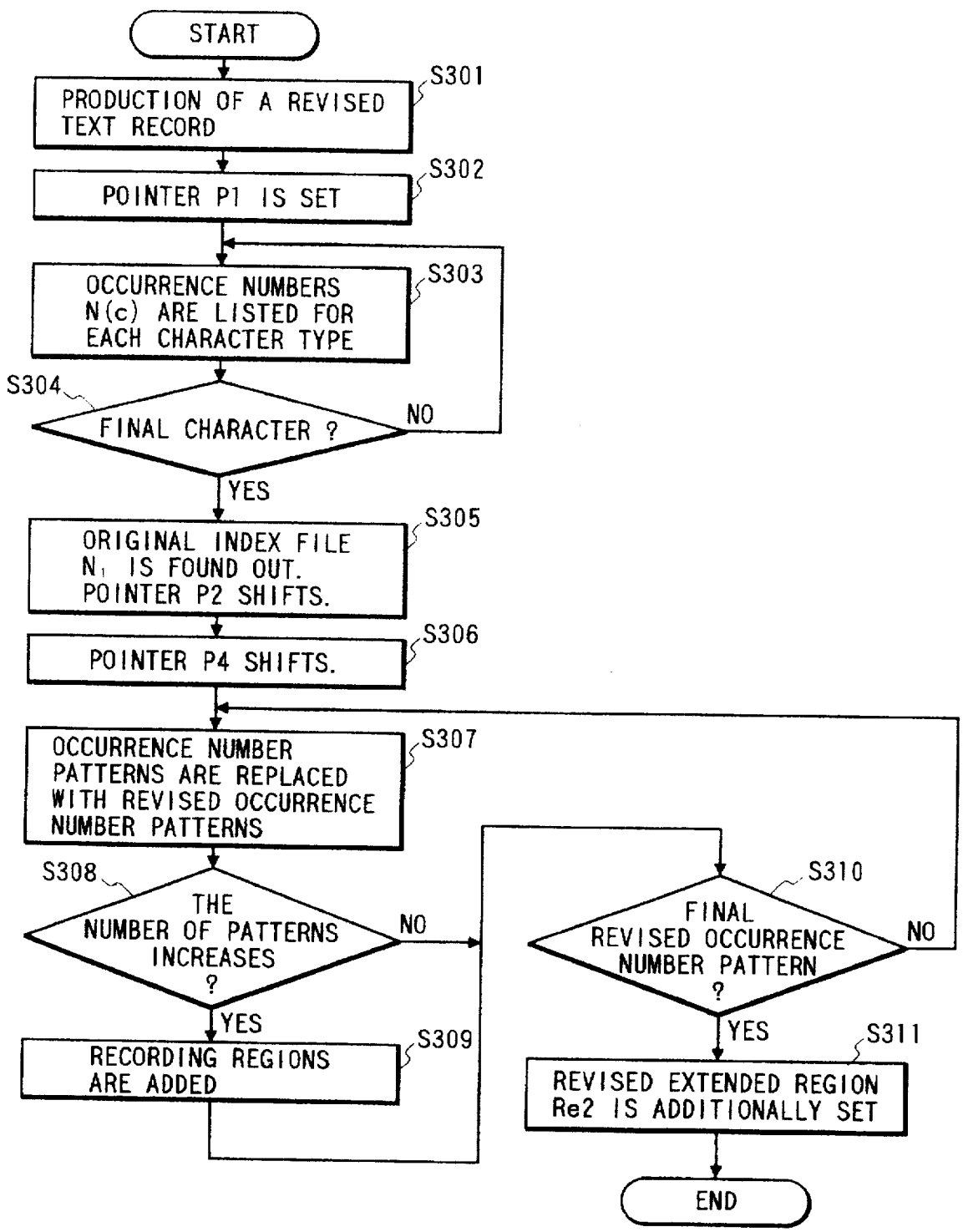
FIG. 11 is a flow chart showing a renewing operation for an original index file registered in a storing unit according to a second embodiment.

FIG. 11 is a flow chart showing the renewing operation for the index file stored in the storing unit 28 according to the second embodiment.

As shown in FIG. 11, a revised retrieval text "AAIAII-ANAAINAI" obtained by revising the original retrieval text "AAIAAIANNAANAI" filed as an original index file N1 is read by the revised text reading unit 25, and a record number N1R is attached to the revised retrieval text to produce a revised text record (step S301). Thereafter, in the preparing unit 26, an occurrence number N(C) for each type of character is initially set to zero, and the character pointer P1 is initially set to a head character of the revised text record N1R (step S302). Thereafter, one or more characters belonging to the same character type are numbered from 1 in order of occurrence for each character type while shifting the character pointer P1 character by character (step S303). Therefore, a plurality of occurrence numbers N(C) are listed for each character type. Thereafter, it is judged whether or not the character pointer P1 is set to a final character of the revised text record N1R (step S304). In cases where the character pointer P1 is not set to the final character of the revised text record N1R, the step S303 is continued. In contrast, in cases where an occurrence number N(C) for the final character of the revised text record N1R has been counted, a revised occurrence number table for the revised text record N1R is prepared as shown in FIG. 12 and is stored in the storing unit 28.

Thereafter, an original index file corresponding to the text record number N1 is found out from the index file storing unit 28 by the index file preparing unit 35, the occurrence number pattern pointer P2 is initially set to a top occurrence number pattern of a top character pattern in the original index file N1, and the occurrence number pattern pointer P2 shifts to indicate the occurrence number patterns of the original index file N1 one by one (step S305). Also, a renewing pattern pointer P4 is initially set to a top revised occurrence number pattern in the revised occurrence number table, and the renewing pattern pointer P4 shifts to indicate the revised occurrence number patterns of the revised occurrence number table one by one(step S306). Thereafter, the occurrence number patterns indicated by the occurrence number pattern pointer P2 one by one in the original index file N1 are replaced with the revised occurrence number patterns indicated by the renewing pattern pointer P4 one by one in the revised occurrence number table by the function of the occurrence number pattern renewing unit 34 (step S307).

Thereafter, it is judged whether or not the number of revised occurrence number patterns for each character pattern becomes higher than the number of occurrence number patterns in the original index file N1 (step S308). In cases where the number of revised occurrence number patterns for a particular character pattern becomes higher than the number of occurrence number patterns for the particular character pattern in the original index file N1 (refer to FIG. 13), one or more recording regions are added by the extended region setting unit 29 to record all revised occurrence number patterns for the particular character pattern in a revised index file N1R (step S309). Thereafter, it is judged whether or not the pattern pointer P4 is set to a final revised occurrence number pattern of the revised occurrence number table (step S310). In cases where the pattern pointer P2 is not set to the final revised occurrence number pattern of the revised occurrence number table, the step S307 is continued. In contrast, in cases where the final revised occurrence number pattern of the revised occurrence number table has been listed in the revised index file N1R, a revised extended region Re2 following one or more revised occurrence number patterns is additionally set for each character pattern in the revised index file N1R (step S311). The addition of the revised extended region Re2 is performed by the extended region setting unit 29, and the final revised occurrence number pattern is again recorded in the revised extended region Re2. In this case, it is applicable that a plurality of extended regions Re2 following one or more revised occurrence number patterns be additionally set for each character pattern. Therefore, a list of revised occurrence number patterns for the revised text record N1R is prepared by the occurrence number pattern renewing unit 34 as shown in FIG. 14 and is stored in the storing unit 28.

In FIG. 14, a final occurrence number pattern is listed twice for each character pattern, and the revised extended region Re2 is set for the character patterns (A,I). Also, in cases where the number of revised occurrence number patterns for a particular character pattern becomes lower than the number of occurrence number patterns for the particular character pattern in the original index file N1, one or more recording regions in the original index file N1 are changed to one or more extended regions Re2. For example, one recording region for each of the character patterns (A,A) and (A,N) is changed to one revised extended region Re2. Also, in cases where no revised occurrence number patterns for a particular character pattern exists though one or more occurrence number patterns for the particular character pattern exist in the original index file N1, one or more recording regions for the particular character pattern in the original index file N1 are changed to one or more extended regions Re2. For example, one recording region for each of the character patterns (N,I) and (N,N) is changed to one revised extended region Re2.

Thereafter, a searching operation in which the revised index file N1R is searched for one or more character streams agreeing with a key word is performed in the same manner as that in the first embodiment (FIG. 9).

Accordingly, even though the number of revised occurrence number patterns for a particular character pattern in a revised index file N1R becomes higher than the number of occurrence number patterns for the particular character pattern in an original index file, the revised occurrence number patterns can be immediately listed in one or more recording regions and one extended region Re1. Therefore, the renewing operation for the index file can be performed at a high speed.

Also, even though the number of recording regions and extended regions Re1 for a particular character pattern is lower than the number of revised occurrence number patterns for the particular character pattern, because one revised extended region Re2 is additionally set each time one revised occurrence number pattern is listed in the revised index file N1R, all revised occurrence number patterns for the particular character pattern can be easily listed in the revised index file N1R.

Next, a partially deleting operation for deleting a part of text record stored as an original index file in the storing unit 28 is described according to a third embodiment of the present invention.

As shown in FIG. 6, when a revised text obtained by partially deleting an original text N1 is read and a revised text record is produced in the revised text reading unit 25, a revised occurrence number table is produced according to the revised text record in the occurrence number table preparing unit 26 and is stored in the storing unit 28. Thereafter, a list of revised occurrence number patterns for the revised text is prepared for each of character patterns as a revised index file N1D in the index file preparing unit 27, and the revised index file N1D is replaced with the original index file N1 stored in the storing unit 28. In this case, because the number of revised occurrence number patterns for a particular character pattern of the revised index file N1D is necessarily equal to or lower than the number of occurrence number patterns of the original index file N1, any extended region is not additionally set.

The partially deleting operation is described in detail with reference to FIG. 15.

Figure 15:
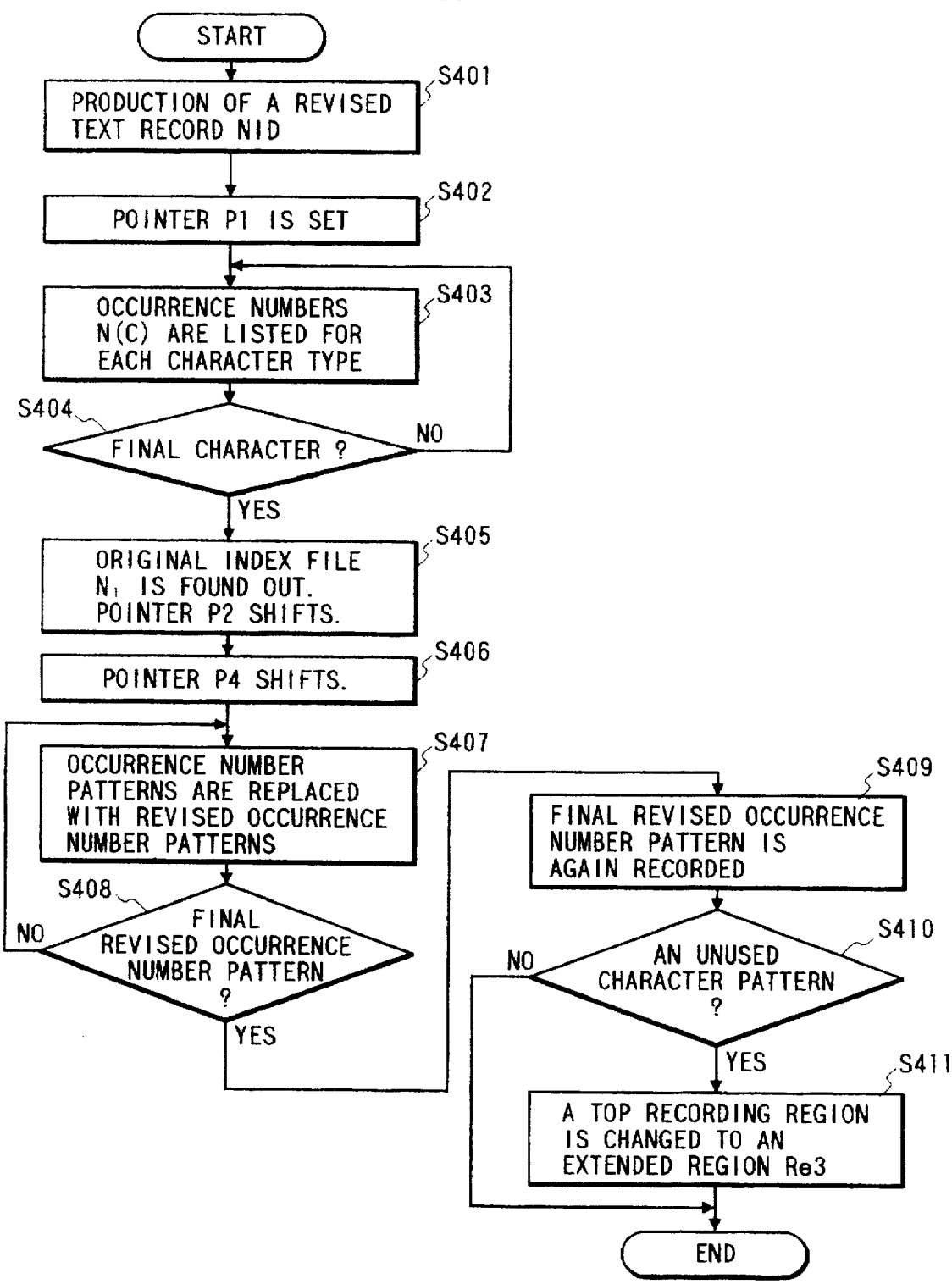
FIG. 15 is a flow chart showing the partially deleting operation for the index file stored in the storing unit 28 according to the third embodiment.

FIG. 15 is a flow chart showing the partially deleting operation for the index file stored in the storing unit 28 according to the third embodiment.

As shown in FIG. 15, a revised retrieval text "AAIAAIAN" obtained by partially deleting the original retrieval text "AAIAAIANNAANAI" filed as the index file N1 in the storing unit 28 is read by the revised text reading unit 25, and a record number N1D is attached to the revised retrieval text to produce a revised text record N1D (step S401).

Thereafter, a revised occurrence number table for the revised text record N1D is prepared as shown in FIG. 16 and is stored in the storing unit 28 (steps S402 to S404) in the same manner as in the steps S302 to S304 of the second embodiment.

Thereafter, the occurrence number patterns indicated by the occurrence number pattern pointer P2 in the original index file N1 are replaced one by one with the revised occurrence number patterns indicated by the renewing pattern pointer P4 in the revised occurrence number table by the function of the occurrence number pattern renewing unit 34 (step S407) while shifting the pattern pointers P2 and P4 (steps S405 and S406), in the same manner as in the steps S305 and S306 of the second embodiment. In this case, any occurrence number pattern recorded in the extended region Re1 is not replaced with a revised occurrence number pattern because the revised retrieval text is obtained by partially deleting the original retrieval text.

Thereafter, it is judged whether or not the pattern pointer P4 is set to a final revised occurrence number pattern of the revised occurrence number table (step S408). In cases where the pattern pointer P2 is not set to the final revised occurrence number pattern of the revised occurrence number table, the step S407 is continued. In contrast, in cases where the final revised occurrence number pattern of the revised occurrence number table has been listed in the revised index file N1D, a list of revised occurrence number patterns shown in FIG. 17 is obtained. Thereafter, a final revised occurrence number pattern recorded in a recording region corresponding to each character pattern is again recorded in a following recording region or the extended region Re1 (step S409). Thereafter, it is judged by the index file searching unit 31 whether or not an unused character pattern not occurring in the revised retrieval text exists in the list of the revised occurrence number patterns (step S410). In cases where an unused character pattern not occurring in the revised retrieval text exists, a top recording region corresponding to the unused character pattern is changed to an extended region Re3 to delete an occurrence number pattern recorded in the top recording region, and a piece of invalid pattern indicating information is stored in the extended region Re3 (step S411). That is, one or more recording regions and the extended region Re1 following the extended region Re3 are treated as invalid regions. For example, as shown in FIG. 18, because the character pattern (N,A) does not exist in the revised retrieval text, the character pattern (N,A) is treated as an unused character pattern, and a top recording region is changed to an extended region Re3. Also, the character pattern (N,N) is treated as an unused character pattern, and a top recording region corresponding to the unused character pattern is changed to an extended region Re3.

Thereafter, a searching operation in which the revised index file N1D is searched for one or more character streams agreeing with a key word is performed in the same manner as that in the first embodiment (FIG. 9). In this case, even though a particular occurrence number pattern listed in the index file producing operation (FIG. 7) remains in a recording region or extended region Re1 following a pair of recording regions in which the same final occurrence number pattern are recorded, because the searching operation is performed on condition that the occurrent number patterns for each character pattern in the list of revised occurrence number patterns are arranged in the order of increasing the occurrence number, the searching operation for the particular occurrence number pattern is not performed. For example, though the occurrence number pattern (6,7) is recorded in the extending region Re1 after the occurrence number pattern (3.4) recorded in the second and third recording regions corresponding to the character pattern (A,A), the searching operation for the occurrence number patterns (3,4) and (6,7) recorded in the third recording region and the extended region Re1 is not performed. Also, the searching operation for any occurrence number pattern recorded in an invalid region is not performed in the same reason.

Accordingly, because all unnecessary occurrence number patterns are not deleted in the partially deleting operation, the partially deleting operation can be performed at a high speed.

Next, an information searching apparatus according to a fourth embodiment is described to achieve the second object.

Figure 19:
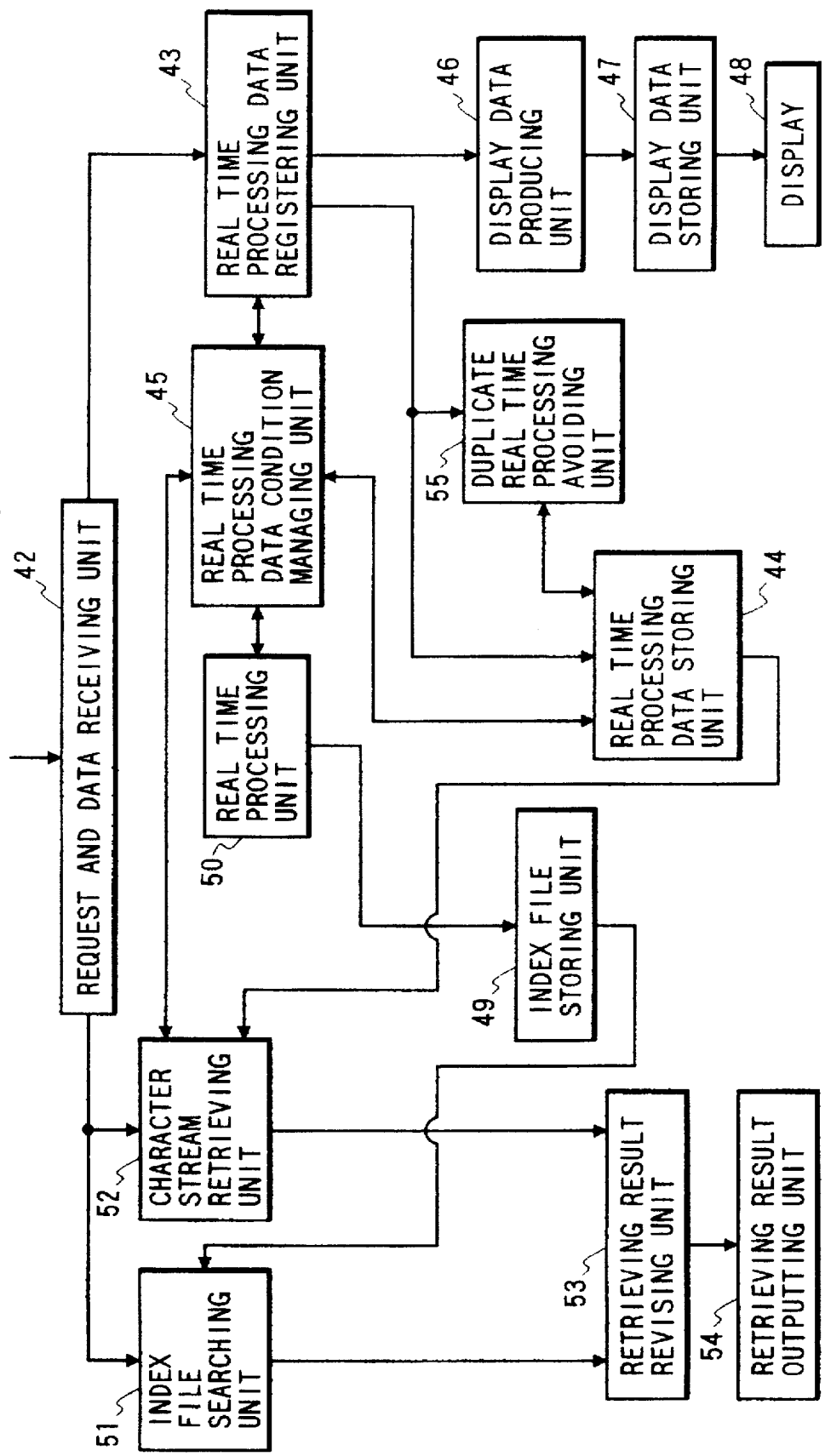
FIG. 19 is a block diagram of an information searching apparatus according to fourth and fifth embodiments of the present invention.

FIG. 19 is a block diagram of an information searching apparatus according to fourth and fifth embodiments of the present invention.

As shown in FIG. 19, an information searching apparatus 41 comprises a request and data receiving unit 42 for receiving a processing data set of a piece of real time processing data and a real time processing request for requesting a real time renewing operation, a real time adding operation or a real time deleting operation according to the real time processing data, and receiving a retrieval set of a retrieval character stream and a retrieval request for requesting a retrieval operation, a real time processing data registering unit 43 for registering the processing data set of the real time processing data and the real time processing request according to the real time processing request, a real time processing data storing unit 44 for storing a plurality of processing data sets registered one by one by the registering unit 43 at a data registering position (BtmNew), a real time processing data condition managing unit 45 for managing utilizing conditions of the processing data sets stored in the storing unit 44 and controlling the storing unit 44 to store each of the processing data sets registered by the registering unit 43 at the data registering position (BtmNew), a display data producing unit 46 for producing a piece of display data from each of the real time processing data registered by the registering unit 43 according to a corresponding real time processing request, a display data storing unit 47 for storing the display data, a display 48 for displaying the display data, an index file storing unit 49 for storing an index file in which one or more original retrieval texts respectively composed of characters arranged in series are substantially filed and each of the original retrieval texts is identified by a data number, a real time processing unit 50 for performing a real time processing for each of the processing data sets stored in the storing unit 44 one by one at a real time under the control of the managing unit 45 and filing the processing data sets in the index file stored in the index file storing unit 49 to revise the index file, an index file searching unit 51 for searching the index file stored in the index file storing unit 50 to retrieve one or more character streams agreeing with the retrieval character stream received by the request and data receiving unit 42 regardless of whether the real time processing for all processing data sets stored in the storing unit 44 is finished in the real time processing unit 50 when the retrieval set of the retrieval request and the retrieval character stream are received by the request and data receiving unit 42 and outputting a retrieving result of the character streams agreeing with the retrieval character stream, a character stream retrieving unit 52 for searching all processing data sets, which each are stored in the storing unit 44 and are not processed by the real time processing unit 50 when the retrieval set of the retrieval request and the retrieval character stream are received by the request and data receiving unit 42, to retrieve one or more character streams respectively agreeing with the retrieval character stream received by the request and data receiving unit 42 from the processing data sets and outputting a processing data searching result, a retrieving result revising unit 53 for revising the retrieving result obtained in the index file searching unit 51 according to the processing data searching result obtained in the character stream retrieving unit 52 to reflect all processing data sets received by the request and data receiving unit 42 in the retrieving result regardless of whether the real time processing for the processing data sets performed by the real time processing unit 50 is finished, and a retrieving result outputting unit 54 for outputting a revised retrieving result obtained by the retrieving result revising unit 53.

Figure 20:
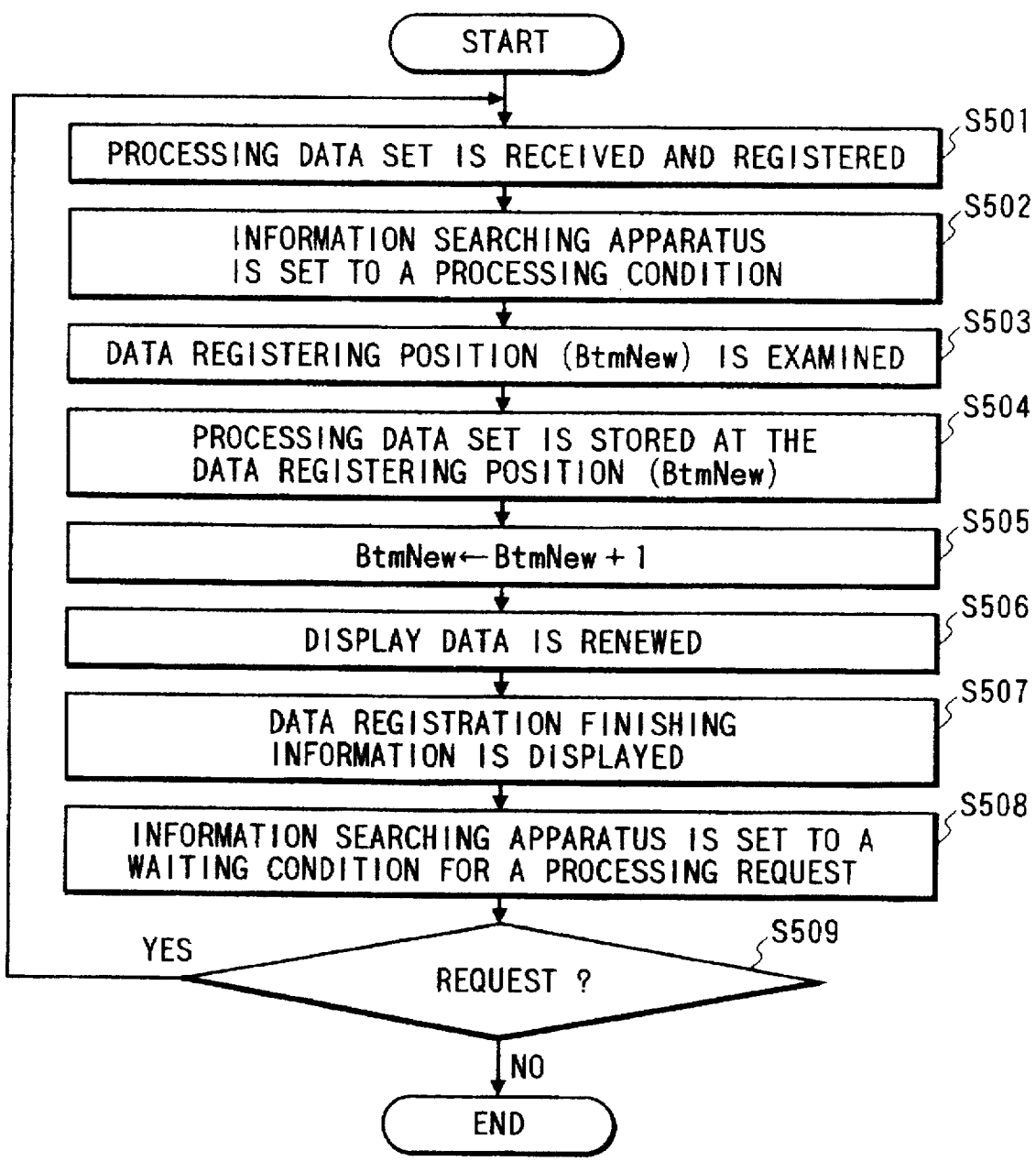
FIG. 20 is a flow chart showing the registration of a processing data set of a piece of real time processing data and a real time processing request.

In the above configuration, the registration of a processing data set of a piece of real time processing data and a real time processing request is described with reference to FIG. 20. As shown in FIG. 20, when a user requests a real time processing for a piece of real time processing data by inputting a processing data set of the real time processing data and a real time processing request, the processing data set of the real time processing data and the real time processing request is received by the request and data receiving unit 42 and is registered by the real time processing data registering unit 43 (step S501), and the information searching apparatus 41 is set to a processing condition by the real time processing data condition managing unit 45 (step S502). For example, as shown in FIG. 21, the processing data set of the real time processing data and the real time processing request indicates a renewing operation for renewing a piece of data of a data number D4 to a character stream "EOK". Thereafter, a data registering position (BtmNew) in the real time processing data storing unit 44 set by the real time processing data condition managing unit 45 is examined by the real time processing data registering unit 43 (step S503), and the processing data set of the real time processing data and the real time processing request is stored at the data registering position (BtmNew) of the real time processing data storing unit 44 (step S504). In this case, as shown in FIG. 22, a pair of flags F1 and F2 are added to the processing data set of the real time processing data and the real time processing request by the managing unit 45. One flag F1 is a retrieval flag indicating a retrieval condition, and another flag F2 is a real time processing flag indicating a renewing, adding or deleting condition. Therefore, as shown in FIG. 23, a plurality of processing data sets of the real time processing data and the real time processing request received one by one by the receiving unit 42 are stored with the flags in the storing unit 44. Thereafter, the data registering position shifts to a lower position (BtmNew←BtmNew+1) (step S505).

Thereafter, a piece of display data is produced from the real time processing data registered by the registering unit 43 in the display data producing unit 46 in cases where the real time processing request indicates a renewing or adding operation. Thereafter, a piece of old display data stored in the storing unit 47 is replaced with the display data in case of the renewing operation, and the display data is added to the storing unit 47 in case of the adding operation (step S506). Also, in cases where the real time processing request indicates a deleting operation, a piece of data of a data number indicated by the real time processing data is deleted in the storing unit 47. For example, a piece of display data shown in FIG. 24 is produced by the display data producing unit 46, and a piece of data of a data number D4 is changed to "EOK" as shown in FIG. 25. Thereafter, a piece of data registration finishing information indicating that the registration of the processing data set of the real time processing data and the real time processing request is finished is transmitted from the registering unit 43 to the display 48 (step S507), so that the finish of the registering operation is informed the user. Thereafter, the information searching apparatus 41 is set to a waiting condition for a processing request (step S508).

Therefore, when the user requests another real time processing (step S509), the steps S501 to S508 are repeated.

Next, the revision of an index file performed by processing the processing data sets of the real time processing data and the real time processing request stored in the storing unit 44 is described with reference to FIG. 26.

Figure 26:
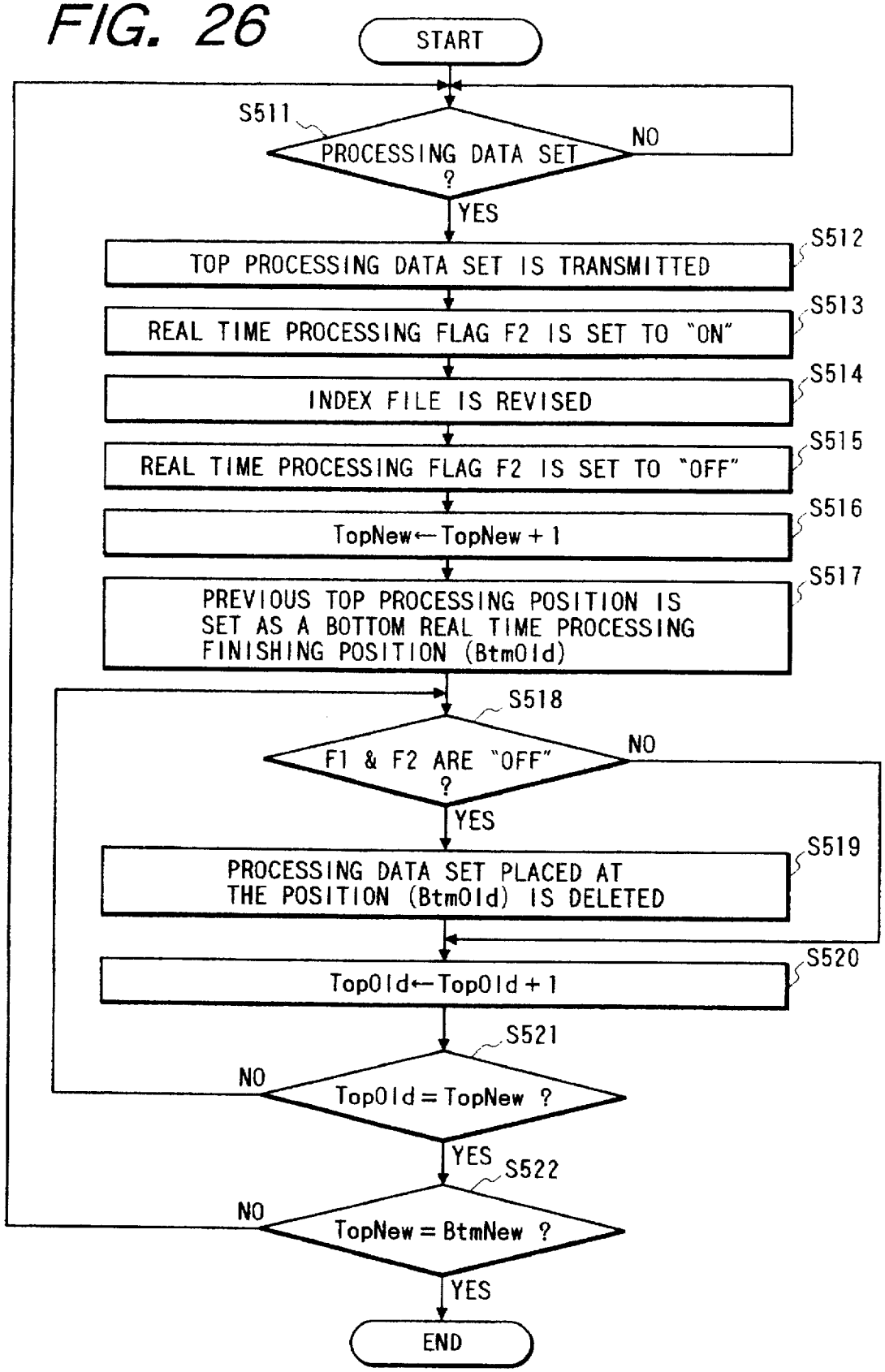
FIG. 26 is a flow chart showing a revising operation for an index file stored in an index file storing unit.

FIG. 26 is a flow chart showing a revising operation for an index file stored in the storing unit 49.

As shown in FIG. 26, it is judged by the real time processing unit 50 through the managing unit 45 whether or not a processing data set of a piece of real time processing data and a real time processing request is stored in the storing unit 44 (step S511). In cases where any processing data set is not stored in the storing unit 44, the step S511 is repeated after a waiting time. In contrast, in cases where one or more processing data sets are stored in the storing unit 44, the processing data sets are placed at processing positions from a top processing position (TopNew) to a bottom processing position (BtmNew) in the storing unit 44, the top processing position is indicated by a processing pointer P5, and a top processing data set stored at the top processing position (TopNew) is transmitted to the processing unit 50 under the control of the managing unit 45 (step S512), and a real time processing flag F2 of the top processing data set is set to an "on" condition (step S513). For example, as shown in FIG. 23, a top processing data set of a piece of real time processing data "AIU" and a real time renewing request is transmitted to the processing unit 50. Thereafter, a real time processing is performed for the top processing data set to revise an index file stored in the storing unit 49 according to the top processing data set (step S514). For example, a piece of data stored at the data number D5 in the index file is replaced with the real time processing data "AIU".

A configuration of the index file is shown in FIG. 27. As shown in FIG. 27, a plurality of character patterns (C1, C2) which each indicate a first character C1 and a second character C2 adjacent to each other in a retrieval text are listed in the index file. Also, one or more character information patterns (PC1, DN) respectively indicating a position PC1 of the first character C1 in the retrieval text and a data number DN identifying the retrieval text are listed for each character pattern in the index file. For example, as shown in FIG. 28A, in cases where an original retrieval text of a data number DN=1 is expressed by a character stream "AIAAIUAU", a character position for each character is determined by numbering the characters of the original retrieval text from 1 in order of occurrence, and a character information pattern (3,1) corresponding to a character pattern (A,A), two character information patterns (1,1) and (4,1) corresponding to a character pattern (A,I), a character information pattern (7,1) corresponding to a character pattern (A,U), a character information pattern (2,1) corresponding to a character pattern (I,A), a character information pattern (5,1) corresponding to a character pattern (I,U) and a character information pattern (6,1) corresponding to a character pattern (U,A) are listed in an original index file. Thereafter, in cases where a character stream "AIU" of the data number DN=5 is added to the original retrieval text in the step S514, because the character stream "AIU" is divided into two character patterns (A,I) and (I,U), a character information pattern (1,5) corresponding to the character pattern (A,I) and a character information pattern (2,5) corresponding to the character pattern (I,U) are added to the original index file. Therefore, as shown in FIG. 28B, the original index file is revised.

Also, in cases where a deleting operation is performed for the original index file, all character information patterns relating to a deleting data number are deleted. Also, in cases where a renewing operation is performed for the original index file, all character information patterns relating to a renewing data number are deleted, and one or more renewing character information patterns are added to the original index file.

Thereafter, when the real time processing for the top processing data set is finished, the real time processing flag F2 of the top processing data set is set to an "off" condition (step S515), and a position of the storing unit 44 indicated by the processing pointer P5 shifts to a lower position (TopNew←TopNew+1) to perform a real time processing for a next processing data set (step S516). Therefore, a next processing data set placed at a second position from the top processing position is indicated by the processing pointer P5. Also, a previous top processing position at which the top processing data set already processed in the step S514 is placed is indicated by a deleting pointer P6, and the previous top processing position is set as a bottom real time processing finishing position (BtmOld) by the managing unit 45 (step S517). Therefore, a plurality of processing data sets already processed (or a plurality of processed data sets) are placed at positions from a top real time processing finishing position (TopOld) to the bottom real time processing finishing position (BtmOld).

Thereafter, it is judged by the managing unit 45 whether either the retrieval flag F1 and the real time processing flag F2 of the processed data set placed at the top real time processing finishing position (TopOld) are set to the "off" condition together (step S518). In cases where the retrieval flag F1 and the real time processing flag F2 of the processed data set are set to the "off" condition together, because the real time processing for the processed data set is finished and the processed data set is not set to a searching condition in which a processing data set is searched by the character stream retrieving unit 52, the processed data set placed at the top real time processing finishing position (TopOld) is deleted from the storing unit 44 (step S519), and a position of the storing unit 44 indicated by the deleting pointer P6 shifts to a lower position (TopOld←TopOld+1) (step S520). In contrast, in cases where the retrieval flag F1 or the real time processing flag F2 of the processed data set placed at the top real time processing finishing position (TopOld) is set to the "on" condition, the procedure jumps to the step S520 because the processed data set is still required. Thereafter, the steps S518 to S520 are repeated until all processed data sets are deleted and the top real time processing finishing position (TopOld) reaches the top processing position (TopNew) for the processing data sets (step S521). Thereafter, the steps S511 to S522 are repeated until the real time processing for all processing data sets is finished and the top position (TopNew) for the processing data sets reaches the data registering position (BtmNew) (step S522).

Accordingly, a plurality of processing data sets received by the request and data receiving unit 42 are stored at the data registering position (BtmNew) one by one as a plurality of processing data sets while shifting the data registering position (BtmNew) to place the processing data sets at positions from the top processing position (TopNew) to the data registering position (BtmNew), a real time processing is performed for one processing data set placed at the top processing position (TopNew) while shifting the top processing position (TopNew), a plurality of processed data sets obtained by finishing the real time processing for the processing data sets are placed at positions from the top real time processing finishing position (TopOld) to the bottom real time processing finishing position (BtmOld), and all processed data are deleted one by one while all processing data are processed. Therefore, the index file stored in the index file storing unit 49 can be revised at the real time.

Next, a retrieving operation performed on condition that the real time processing is not performed for all processing data sets stored in the real time processing data storing unit 44 is described according to the first embodiment.

Figure 29:
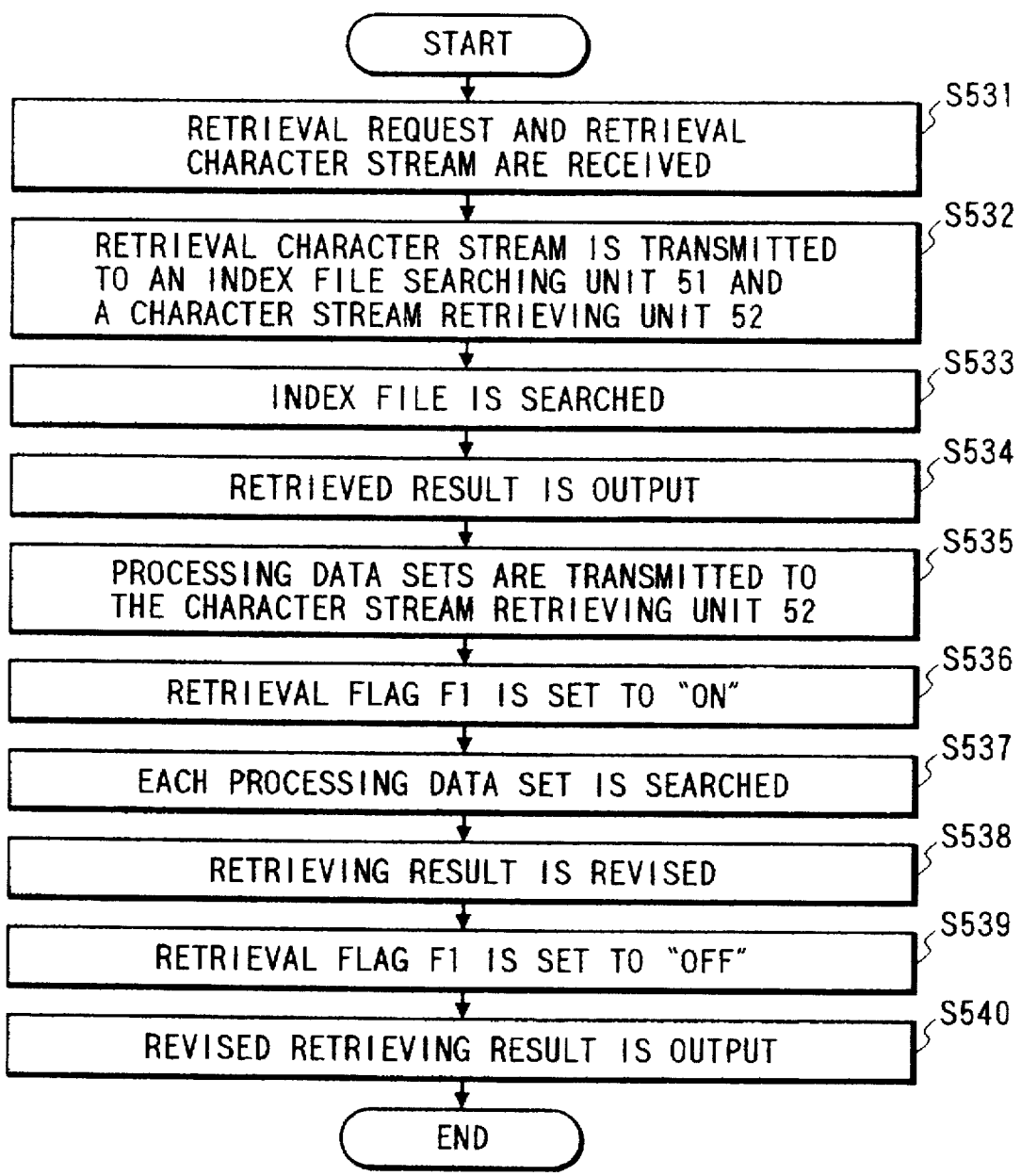
FIG. 29 is a flow chart showing a retrieving operation performed on condition that the real time processing is not performed for all processing data sets.

FIG. 29 is a flow chart showing a retrieving operation performed on condition that the real time processing is not performed for all processing data sets.

As shown in FIG. 29, when a retrieval set of a retrieval character stream and a retrieval request prepared by the user is received by the request and data receiving unit 42 regardless of whether the real time processing for all processing data sets stored in the storing unit 44 is finished in the real time processing unit 50 (step S531), the retrieval character stream equivalent to a key word is transmitted to the index file searching unit 51 and the character stream retrieving unit 52 because the retrieval request is received (step S532). In the searching unit 51, the index file stored in the index file storing unit 50 is searched to retrieve one or more character streams agreeing with the retrieval character stream (step S533), and a retrieving result indicating the retrieval of the character streams agreeing with the retrieval character stream is output to the retrieving result revising unit 53 (step S534).

In detail, the retrieval character stream is divided into a series of specified character patterns {C1(i), C2(i)} (i=1,2, -,p,p+1,--), one or more character information patterns corresponding to each of the specified character patterns are selected from the index file, and one or more pairs of particular character information patterns corresponding to each pair of a first specified character pattern {C1(p), C2(p)} and a second specified character pattern {C1(p+1), C2(p+1)} adjacent to each other are selected from the character information patterns on condition that the data numbers DN of each pair of particular character information patterns agree with each other and the character position PC1 of one particular character information pattern corresponding to the first specified character pattern is lower than that of the other particular character information pattern corresponding to the second specified character pattern by one. That is, each pair of particular character information patterns are selected in cases where two characters C1(p) and C1(p+1) of the first and second specified character patterns are adjacent to each other in that order in the same retrieval text. Therefore, in cases where one or more pairs of particular character information patterns for each of all pairs of specified character patterns produced from all specified character patterns exist, it is judged that one or more character streams agreeing with the retrieval character stream exist in the index file. For example, in cases where a retrieval character stream "AIU" is received in the step S531 and an index file shown in FIG. 28B is stored in the storing unit 49, the retrieval character stream "AIU" is divided, two specified character patterns (A,I) and (I,U) are produced in the searching unit 51, the character information patterns (1,1), (4,1) and (1,5) corresponding to the specified character pattern (A,I) and the character information patterns (5,1) and (2,5) corresponding to the specified character pattern (I,U) are selected from the index file, a pair of particular character information patterns (4,1) and (5,1) are selected because the data numbers DN of the pair of particular character information patterns agree with each other and the character position PC1=4 of one particular character information pattern (4,1) is lower than that PC1=5 of the other particular character information pattern (5,1) by one, and another pair of particular character information patterns (1,5) and (2,5) are selected because the data numbers DN of the pair of particular character information patterns agree with each other and the character position PC1=1 of one particular character information pattern (1,5) is lower than that PC1=2 of the other particular character information pattern (2,5) by one. Therefore, two character streams agreeing with the retrieval character stream "AIU" exist in the index file.

Thereafter, one or more processing data sets placed at positions from the top processing position (TopNew) to the data registering position (BtmNew) in the real time processing data storing unit 44 are read out and transmitted to the character stream retrieving unit 52 under the control of the managing unit 45 (step S535), and the retrieval flags F1 for the processing data sets are set to the "on" condition by the managing unit 45 one by one (step S536). Each processing data set of the "on" condition is not processed by the real time processing unit 50. Thereafter, each of the real time processing data in the processing data sets is searched to retrieve one or more character streams respectively agreeing with the retrieval character stream (step S537), and a processing data searching result is output to the retrieving result revising unit 53. Thereafter, the retrieving result obtained in the index file searching unit 51 is revised according to the processing data searching result to reflect all processing data sets received by the request and data receiving unit 42 in the retrieving result (step S538), the retrieval flag F1 for each of the processing data sets stored in the storing unit 44 is set to the "off" condition by the managing unit 45 (step S539), and a revised retrieving result is output from the retrieving result outputting unit 54 (step S540). Also, when the user instructs the information searching apparatus 41 to display the revised retrieving result, the revised retrieving result is displayed by the display 48 through the display data storing unit 47. In the revised retrieving result, one or more data numbers of one or more retrieval texts in which one or more character streams agreeing with the specified character stream exist are listed, and the number of character streams agreeing with the specified character stream is listed for each data number.

A revising operation performed in the revising unit 53 is described in detail with reference to FIG. 30.

Figure 30:
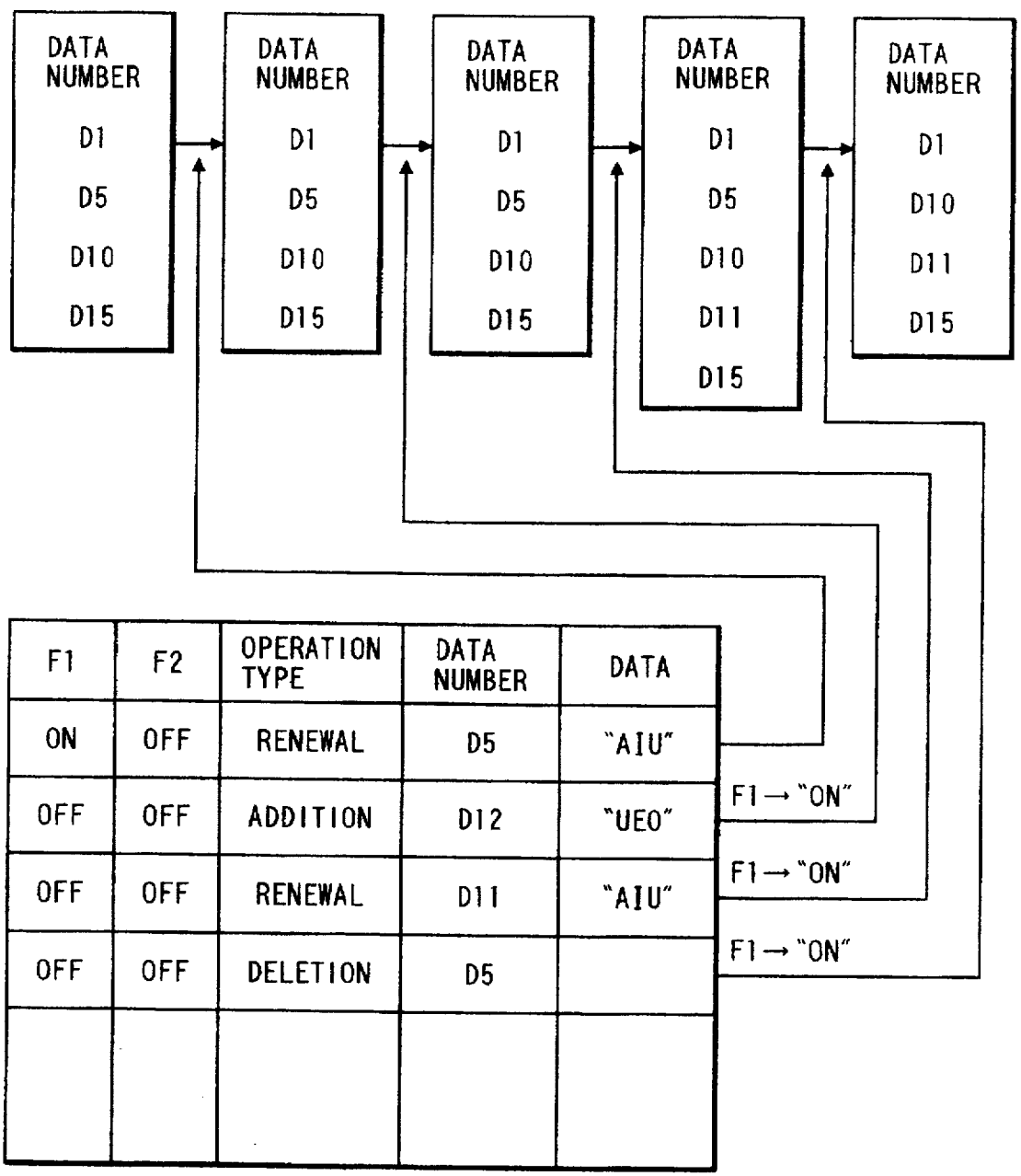
FIG. 30 shows an example of a revising operation performed by a retrieving result revising unit shown in FIG. 19.

As shown in FIG. 30, the index file stored in the storing unit 49 is searched by the searching unit 51 to retrieve a plurality of character streams which agree with the retrieval character stream "AIU" and are listed in a plurality of retrieval texts of the data numbers D1, D5, D10 and D15, and four processing data sets shown in FIG. 30 exist in the storing unit 44. In this case, a character stream "AIU" of the retrieval text D5 is added to the retrieving result because of the first processing data set, the second processing data set is disregarded because a character stream "UEO" differing from the retrieval character stream is added to the retrieval text D12 according to the second processing data set, a character stream "AIU" of the retrieval text D11 is added to the retrieving result because the replacement of a character stream of the retrieval text D11 with a character stream "AIU" agreeing with the retrieval character stream is instructed by the third processing data set, and the retrieval text D5 is deleted from the retrieving result because of the fourth processing data set.

Accordingly, even though a retrieving request is input to the information searching apparatus 41 in the middle of the real time processing performed by the performing unit 50, because one or more processing data sets which each are not processed by the performing unit 50 are searched by the character stream retrieving unit 52 and the retrieving result obtained by the index file searching unit 51 is revised, all processing data sets input to the information searching apparatus 41 can be reflected in the revised retrieval result. That is, a searching operation of the index file for one or more character streams respectively agreeing with the retrieval character stream can be immediately performed to correctly retrieve the character streams without waiting the finish of a registration, addition, renewal or deletion operation performed for the index file even though a retrieval operation is requested in the middle of the registration, addition, renewal or deletion operation for the index file.

In the fourth embodiment, absolute positions of the characters in each retrieval text are managed by the managing unit 45. However, it is applicable that relative positions of the characters in each retrieval text be managed by the managing unit 45.

Also, two flags F1 and F2 are used in the fourth embodiment. However, because there is no case that both the flags F1 and F2 are set to the "on" condition, it is applicable that a flag be used in place of the flags F1 and F2.

Next, a fifth embodiment in which a real time processing for two processing data sets corresponding to the same particular retrieval text is performed on condition that one of the processing data set is received in the request and data receiving unit 42 when the other processing data set is stored in the real time processing data storing unit 44 is described.

As shown in FIG. 19, the information searching apparatus 41 further comprising:

a duplicate real time processing avoiding unit 55 for changing an original processing data set, which corresponds to a particular retrieval text and is stored in the real time processing data storing unit 44, to a revised processing data set corresponding to the same particular retrieval text in cases where a duplicate processing data set corresponding to the same particular retrieval text is received by the request and data receiving unit 42 and abandoning the duplicate processing data set.

In the above configuration of the information searching apparatus 41, a real time processing for two processing data sets corresponding to the same particular retrieval text is described with reference to FIG. 31.

Figure 31:
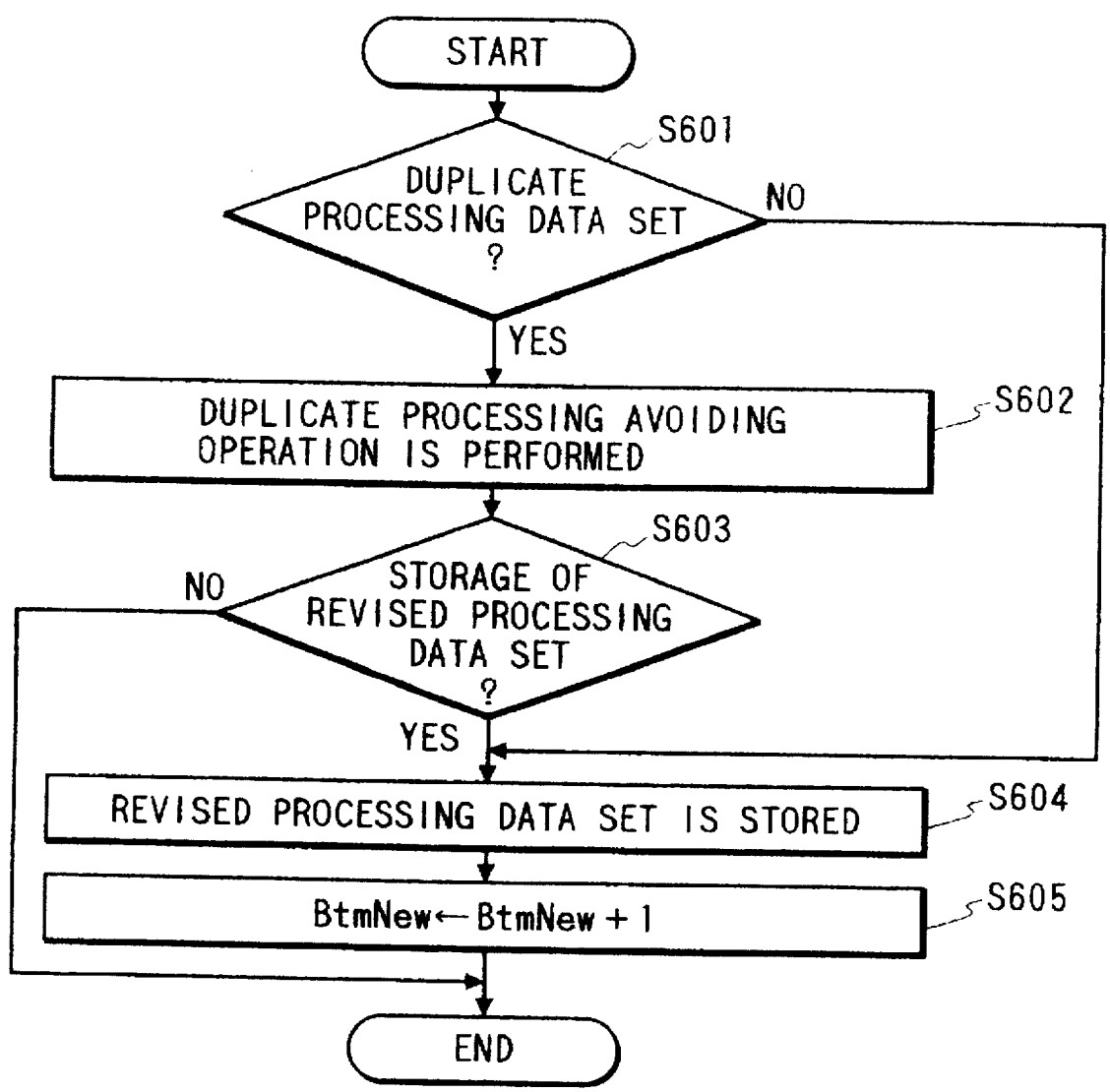
FIG. 31 is a flow chart showing a real time processing for two processing data sets corresponding to the same particular retrieval text according to a fifth embodiment of the present invention.

FIG. 31 is a flow chart showing a real time processing for two processing data sets corresponding to the same particular retrieval text according to a fifth embodiment of the present invention.

As shown in FIG. 31, after a particular processing data set corresponding to a particular retrieval text is received and registered in the steps S501 to S503 shown in FIG. 20, it is judged by the duplicate real time processing avoiding unit 55 whether or not the particular processing data is equivalent to a duplicate processing data set because an original processing data set corresponding to the same particular retrieval text is stored in the real time processing data storing unit 44 (step S601). In cases where an original processing data set corresponding to the same particular retrieval text is stored in the real time processing data storing unit 44, it is judged that the particular processing data is equivalent to a duplicate processing data set, and a duplicate processing avoiding operation is performed by the duplicate real time processing avoiding unit 55 by changing the original processing data set to a revised processing data set corresponding to the same particular retrieval text and abandoning the duplicate processing data set (step S602).

Figure 32A:
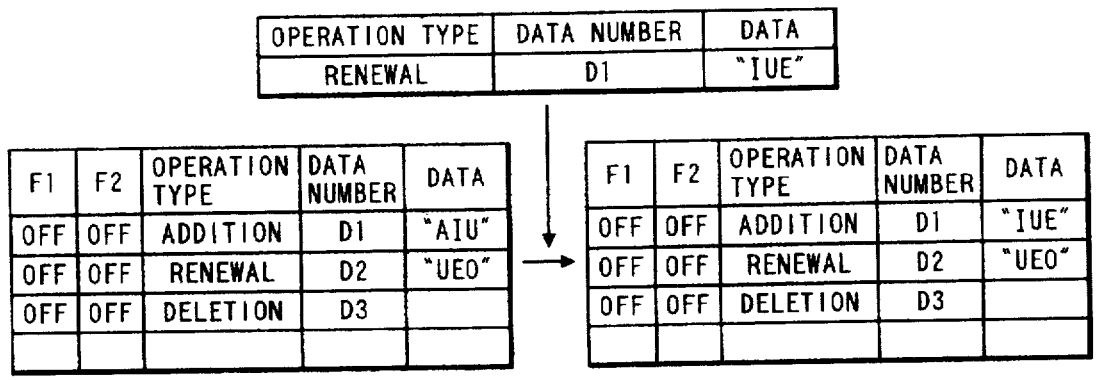
FIG. 32A is an example of a real time renewing operation according to the fifth embodiment.

For example, as shown in FIG. 32A, in cases where an original processing data set which corresponds to a particular retrieval text D1 and requests an adding operation to add a character stream "AIU" is stored in the storing unit 44 and a duplicate processing data set requesting a renewing operation to replace a piece of data of the particular retrieval text D1 with a character stream "IUE" is received and registered, because the character stream "AIU" added to the particular retrieval text D1 is replaced with the character stream "IUE", the original processing data set is changed to a revised processing data set requesting an adding operation to add the character stream "IUE" to the particular retrieval text D1, and the duplicate processing data set is abandoned.

Figure 32B:
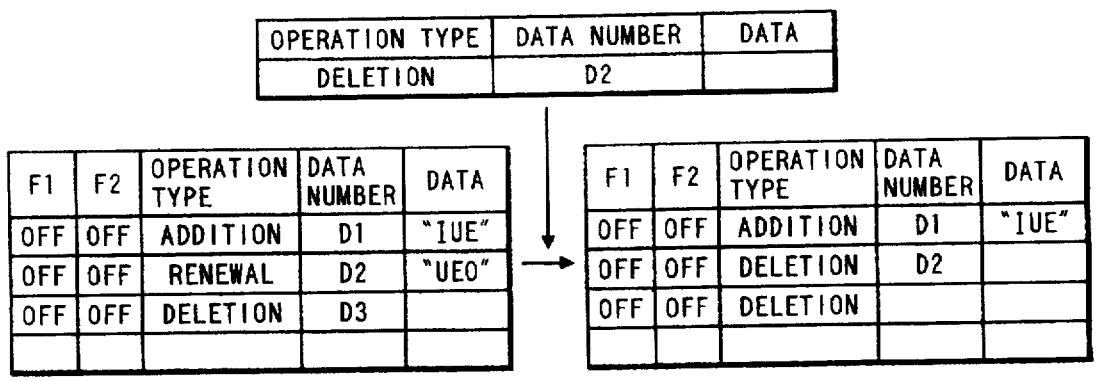
FIG. 32B is an example of a real time deleting operation according to the fifth embodiment.

Also, as shown in FIG. 32B, in cases where an original processing data set which corresponds to a particular retrieval text D1 and requests a renewing operation to replace a piece of data of a particular retrieval text D2 to a character stream "UEO" is stored in the storing unit 44 and a duplicate processing data set requesting a deleting operation to delete the particular retrieval text D2 is received and registered, because the particular retrieval text D2 is finally deleted, the original processing data set is changed to a revised processing data set requesting a deleting operation to delete the particular retrieval text D2, and the duplicate processing data set is abandoned.

Figure 32C:
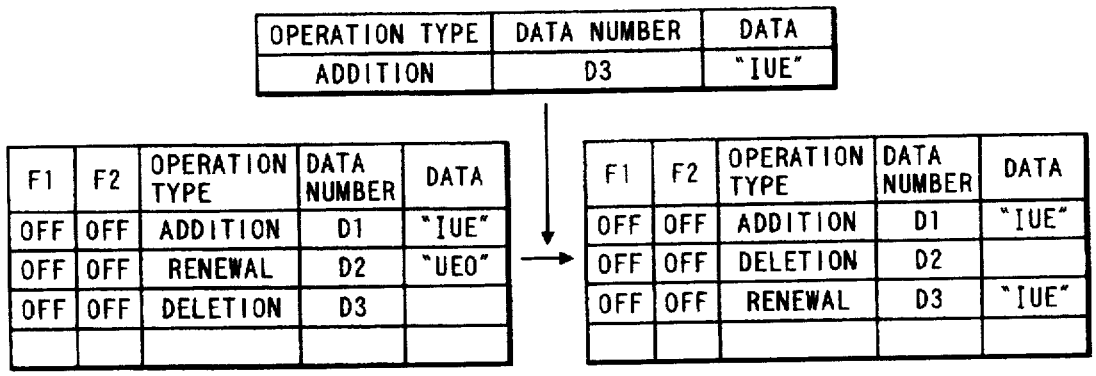
FIG. 32C is an example of a real time adding operation according to the fifth embodiment.

Also, as shown in FIG. 32C, in cases where an original processing data set which corresponds to a particular retrieval text D3 and requests a deleting operation to delete the particular retrieval text D3 is stored in the storing unit 44 and a duplicate processing data set requesting an adding operation to add a character stream "IUE" to the particular retrieval text D3 is received and registered, because data of the particular retrieval text D3 is deleted and the character stream "IUE" is added, the original processing data set is changed to a revised processing data set requesting a renewing operation to replace data of the particular retrieval text D3 with the character stream "IUE".

Thereafter, it is judged by the duplicate real time processing avoiding unit 55 whether or not it is required to store the revised processing data set in the storing unit 44 (step S603). In cases where the storage of the revised processing data set is required, the revised processing data set is stored in the storing unit 44 (S604) by the duplicate real time processing avoiding unit 55, and the data registering position shifts to a lower position (BtmNew←BtmNew+1) (step S605). Thereafter, the steps S506 to S509 shown in FIG. 20 are performed.

Accordingly, because a duplicate real time processing for a duplicate processing data set can be avoided, a real time processing can be efficiently performed at a high speed.

Next, a sixth embodiment, in which a character existence judging table utilized to judge the existence of characters used in real time processing data of all processing data sets stored in the real time processing data storing unit 44 is prepared in a processing data set registering operation to perform a retrieving operation in the character stream retrieving unit 52 while utilizing the character existence judging table, is described.

Figure 33:
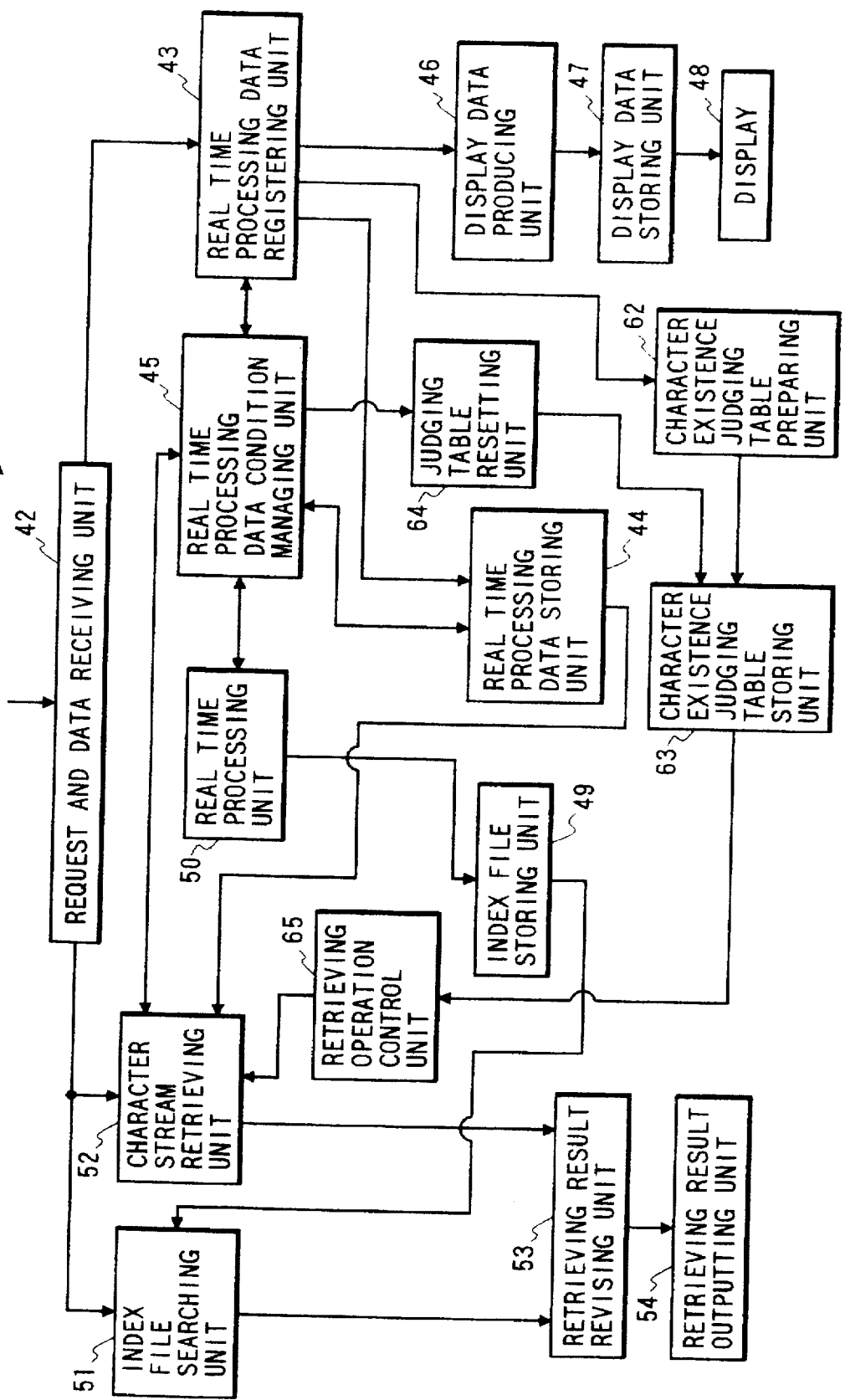
FIG. 33 is a block diagram of an information searching apparatus according to a sixth embodiment of the present invention.

FIG. 33 is a block diagram of an information searching apparatus according to a sixth embodiment of the present invention.

As shown in FIG. 33, an information searching apparatus 61 comprises the request and data receiving unit 42, the real time processing data registering unit 43, the real time processing data storing unit 44, the real time processing data condition managing unit 45, the index file storing unit 49, the real time processing unit 50, the index file searching unit 51, the character stream retrieving unit 52, a character existence judging table preparing unit 62 for preparing a character existence judging table in which the existence of characters used in a piece of real time processing data of a particular processing data set stored in the real time processing data storing unit 44 is indicated, a character existence judging table storing unit 63 for storing the character existence judging table prepared by the character existence judging table preparing unit 62, a judging table resetting unit 64 for resetting the character existence judging table stored in the storing unit 44 when the real time processing for the particular processing data set is finished and the particular processing data set stored in the storing unit 44 is deleted, a retrieving operation control unit 65 for controlling the character stream retrieving unit 52 to search all processing data sets which each are stored in the storing unit 44 and are not processed by the real time processing unit 50 when the retrieval set of the retrieval request and the retrieval character stream are received by the request and data receiving unit 42 and controlling the character stream retrieving unit 52 to retrieve one or more character streams respectively agreeing with the retrieval character stream received by the request and data receiving unit 42 from the processing data sets while referring the character existence judging table stored in the character existence judging table storing unit 63 and outputting a processing data searching result, the retrieving result revising unit 53, and the retrieving result outputting unit 54.

In the above configuration, a processing data set registering operation according to the sixth embodiment is described with reference to FIG. 34.

Figures 34, 35:
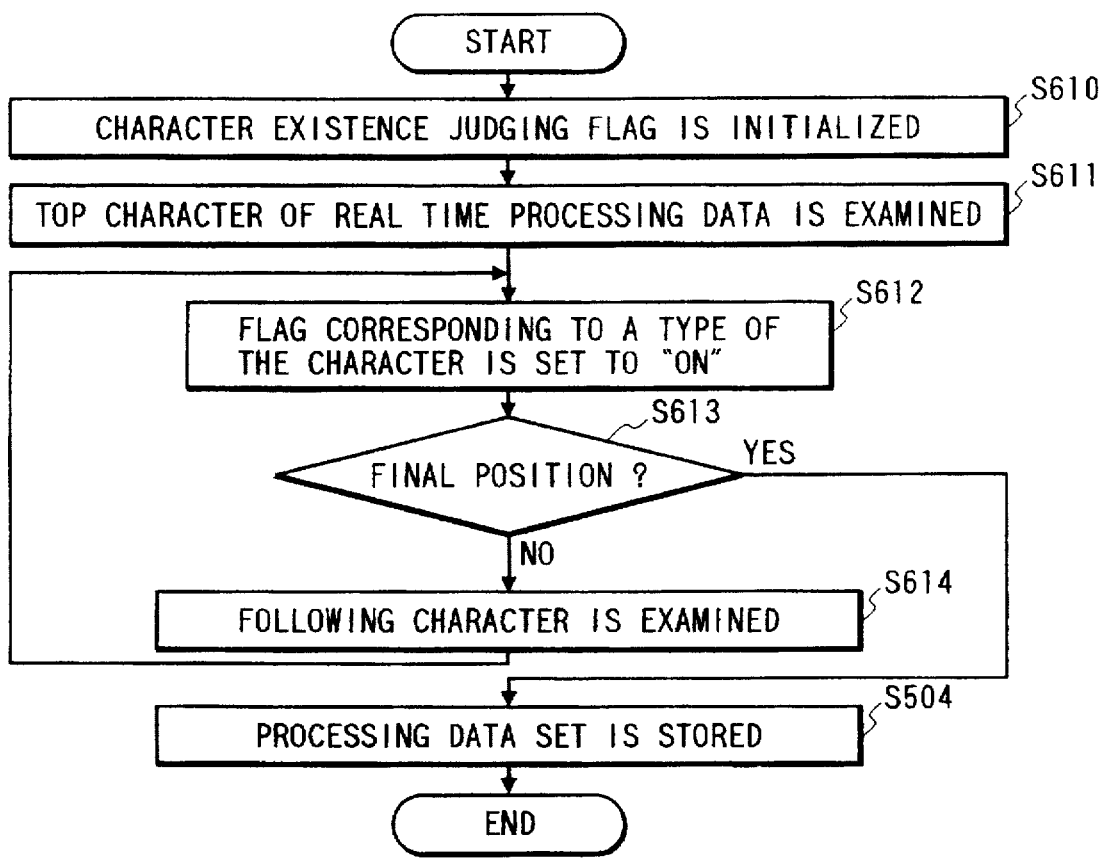
FIG. 34 is a flow chart of a processing data set registering operation according to the sixth embodiment.
FIG. 35 is a configuration of a character existence judging table.

FIG. 34 is a flow chart of a processing data set registering operation according to the sixth embodiment.

As shown in FIG. 34, after the steps S501 to S503 are performed in the same manner as those shown in FIG. 20, a character existence judging table in which each of all types of characters corresponds to a character existence judging flag is initialized as shown in FIG. 35 (step S610). That is, each of all character existence judging flags is set to an "off" condition indicating no existence of a corresponding character type. Thereafter, a type of a top character of a piece of real time processing data of a processing data set registered by the registering unit 43 is examined by a character existence judging table preparing unit 62 (step S611), and a character existence judging flag corresponding to the type of character examined is set to an "on" condition in the character existence judging table (step S612). For example, a processing data set shown in FIG. 21 is registered, a character flag F(E) corresponding to a type of character "E" is set to an "on" condition. Thereafter, it is judged whether or not a character corresponding to the character existence judging flag set in the step S612 is arranged at a final position of the real time processing data (step S613). In cases where the character corresponding to the character existence judging flag set in the step S612 is not placed at the final position, a type of a following character in the real time processing data is examined by the preparing unit 63 (step S614), and the steps S612 and S613 are repeated. In contrast, in cases where the character corresponding to the character existence judging flag set in the step S612 is placed at the final position, because character existence judging flags corresponding to types of all characters existing in the real time processing data are set to the "on" condition indicating the existence of a corresponding character, the character existence judging table is stored in the character existence judging table storing unit 63, the processing data set is stored in the storing unit 44 (step S504), and the steps S505 to S509 are performed. In this example, because the real time processing data "EOK" is registered by the registering unit 43, as shown in FIG. 36, the character existence judging table in which character existence judging flags corresponding to the types of characters "E", "O" and "K" are set to the "on" condition is prepared by the character existence judging table preparing unit 62.

Thereafter, when a real time processing for the processing data set is finished by the real time processing unit 50 and the processing data set stored in the storing unit 44 is deleted by the managing unit 45, character existence judging flags corresponding to types of all characters in the real time processing data of the processing data set are reset to the "off" condition by a judging table resetting unit 64.

Figures 36, 37:
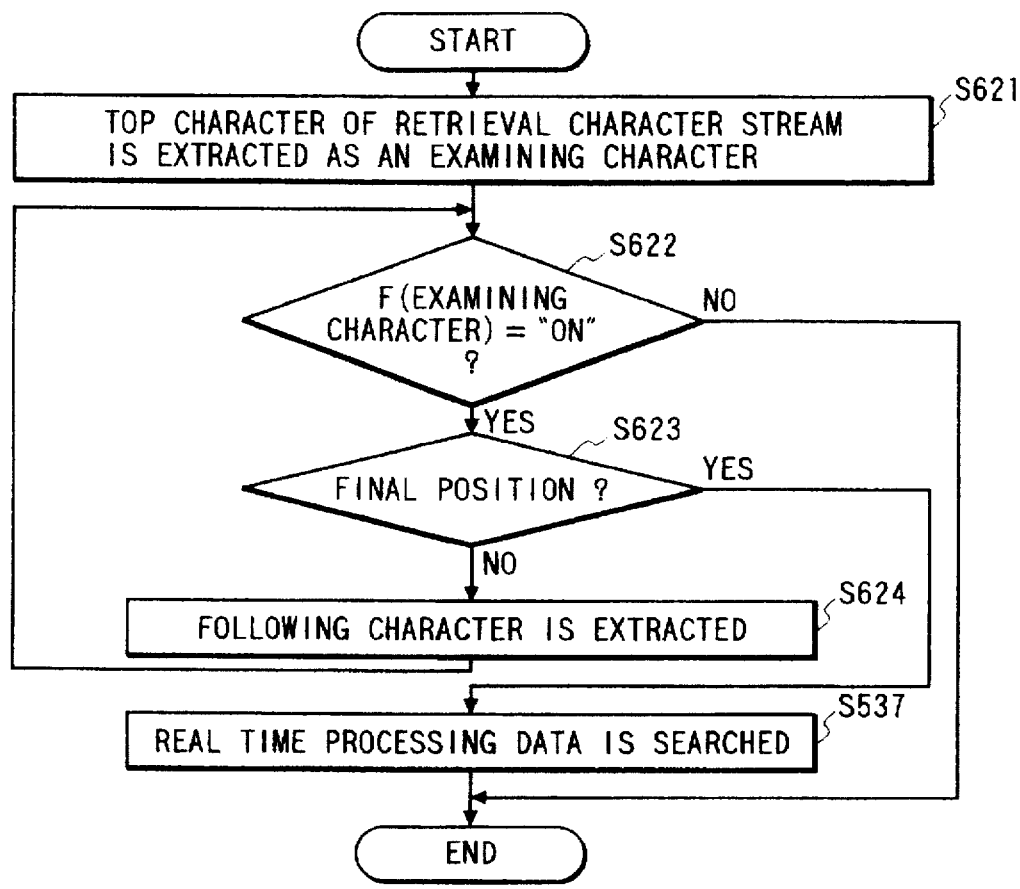
FIG. 36 is an example of the character existence judging table.
FIG. 37 is a flow chart of a character stream retrieving operation performed while utilizing the character existence judging table.

Next, a character stream retrieving operation performed by the character stream retrieving unit 52 under the control of retrieving operation control unit 65 while utilizing the character existence judging table is described according to the sixth embodiment with reference to FIG. 37.

FIG. 37 is a flow chart of a character stream retrieving operation performed while utilizing the character existence judging table.

After the steps S531 to S536 are performed by the character stream retrieving unit 52, a character stream retrieving operation is performed for a particular processing data set representing the processing data sets stored in the storing unit 44. That is, as shown in FIG. 37, a top character of the retrieval character stream received by the receiving unit 42 is extracted as an examining character (step S621), and it is judged whether or not a character existence judging flag corresponding to the examined character is set to the "on" condition in a particular character existence judging table in which the existence of characters used in the particular processing data set is indicated (step S622).

In cases where a character existence judging flag corresponding to the examined character is set to the "on" condition, it is judged whether or not the examined character is set to a final position of the retrieval character stream (step S623). In cases where the examined character is not set to a final position of the retrieval character stream, another character following the examined character is extracted from the retrieval character stream as an examining character (step S624), and the step S622 is repeated.

In contrast, in cases where a character existence judging flag corresponding to the examined character is not set to the "on" condition, because one or more character existence judging flags corresponding to all characters of the retrieval character stream are not set to the "on" condition in the particular character existence judging table, no existence of a character stream agreeing with the retrieval character stream is judged. Therefore, the character stream retrieving operation for the particular processing data set is finished.

Also, in cases where the examined character is set to a final position of the retrieval character stream in the step S623, because one or more character existence judging flags corresponding to all characters of the retrieval character stream are set to the "on" condition in the particular character existence judging table, the existence of one or more character streams respectively agreeing with the retrieval character stream is judged. Therefore, one or more character streams respectively agreeing with the retrieval character stream are retrieved from a piece of real time processing data of the particular processing data set (step S537), and the steps S538 to S540 are performed in the same manner.

Accordingly, because a character existence judging table in which the existence of characters used in a particular processing data set is indicated is prepared, when the particular processing data set is searched to retrieve one or more character streams agreeing with the retrieval character stream, the judgement whether or not one or more character streams agreeing with the retrieval character stream exist in the particular processing data set can be performed at a high speed, and a character stream retrieving operation performed by the character stream retrieving unit 52 can be stopped when no existence of a character stream agreeing with the retrieval character stream is judged. Therefore, a character stream retrieving operation can be performed at a high speed.

Next, a seventh embodiment in which a character stream retrieving operation is performed for the latest processing data set corresponding to a particular retrieval text in cases where a plurality of processing data sets corresponding to the same particular retrieval text are stored in the real time processing data storing unit 44 is described.

Figure 38:
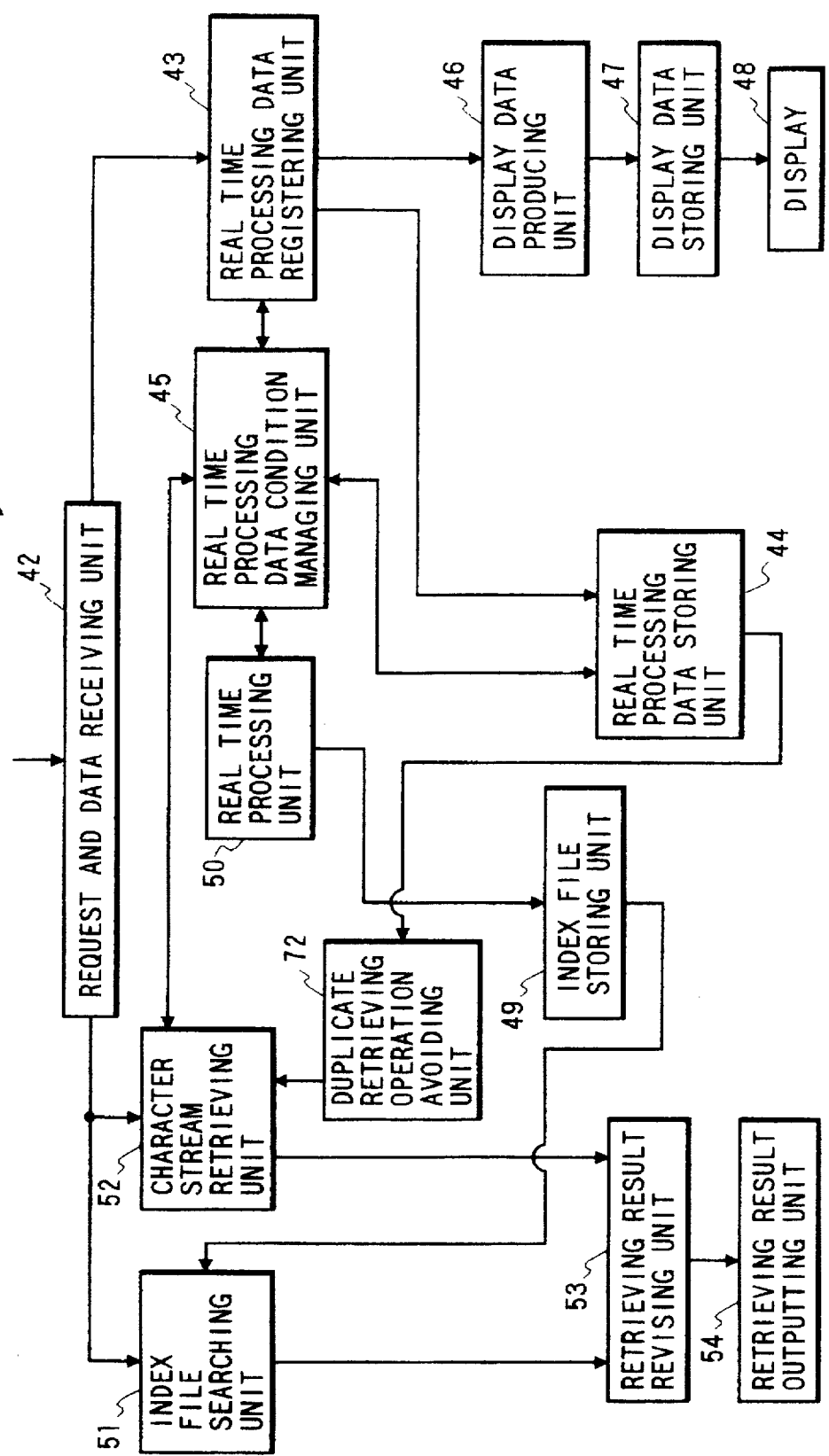
FIG. 38 is a block diagram of an information searching apparatus according to a seventh embodiment of the present invention.

FIG. 38 is a block diagram of an information searching apparatus according to a seventh embodiment of the present invention.

As shown in FIG. 38, an information searching apparatus 71 comprises the request and data receiving unit 42, the real time processing data registering unit 43, the real time processing data storing unit 44, the real time processing data condition managing unit 45, the display data producing unit 46, the display data storing unit 47, the display 48, the index file storing unit 49, the real time processing unit 50, the index file searching unit 51, the character stream retrieving unit 52, a duplicate retrieving operation avoiding unit 72 for selecting the latest processing data set corresponding to a particular retrieval text from a plurality of processing data sets corresponding to the same particular retrieval text stored in the real time processing data storing unit 44, controlling the character stream retrieving unit 52 to retrieve one or more character streams respectively agreeing with the retrieval character stream received by the request and data receiving unit 42 from the latest processing data set, and controlling the character stream retrieving unit 52 not to perform a character stream retrieving operation for the other processing data sets corresponding to the same particular retrieval text, the retrieving result revising unit 53, and the retrieving result outputting unit 54.

In the above configuration of the information searching apparatus 71, a character stream retrieving operation performed by the character stream retrieving unit 52 under the control of the duplicate retrieving operation avoiding unit 72 while avoiding a duplicate retrieving operation is described with reference to FIG. 39.

Figure 39:
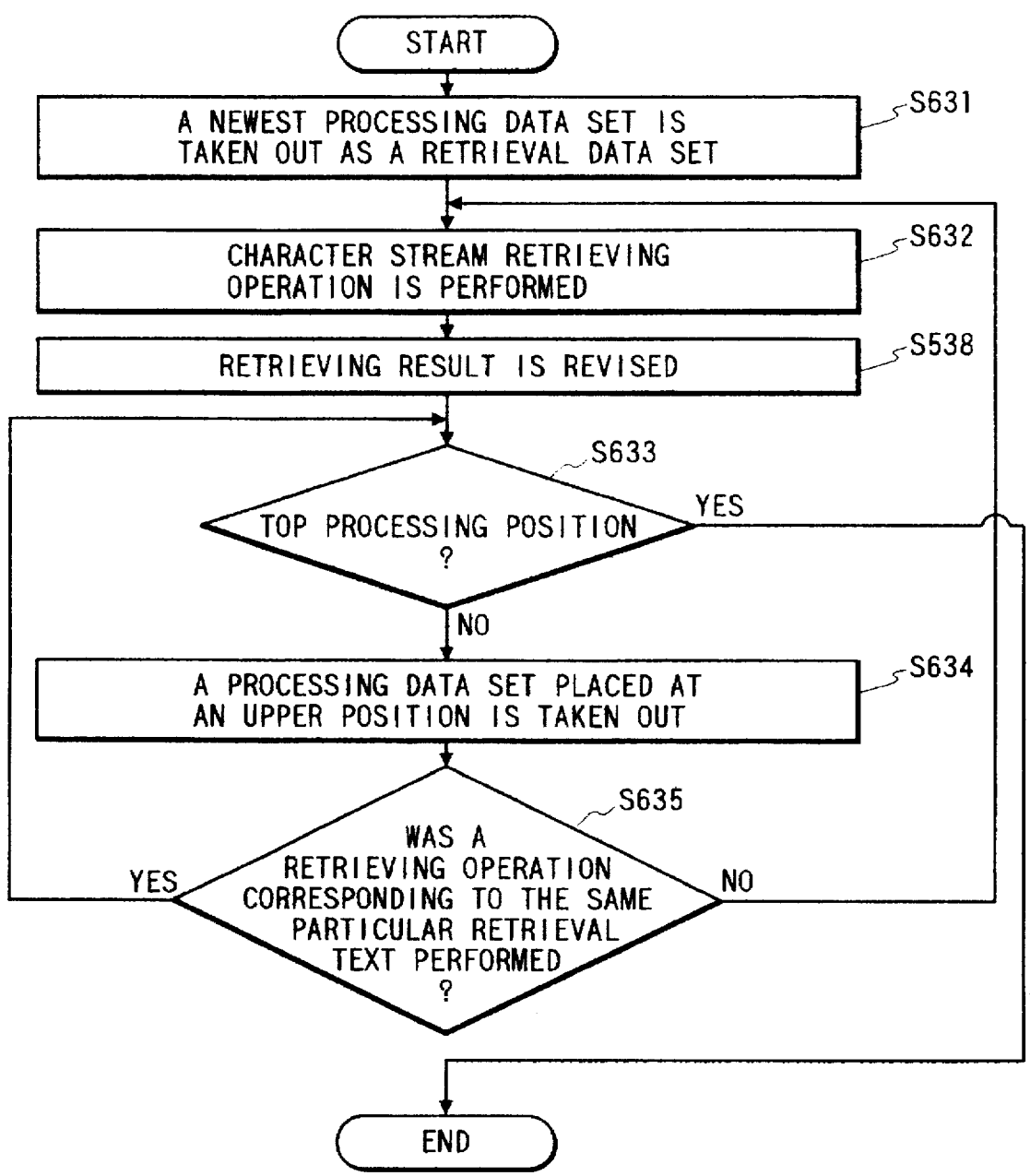
FIG. 39 is a flow chart showing a character stream retrieving operation performed by a duplicate retrieving operation avoiding unit while avoiding a duplicate retrieving operation according to the seventh embodiment.

After the steps S531 to S536 shown in FIG. 29 are performed in the same manner as in the information searching apparatus 41 to obtain a plurality of processing data sets stored in the storing unit 44, as shown in FIG. 39, because a specified processing data set arranged at the data registering position (BtmNew) of the storing unit 44 is newest among a plurality of processing data sets stored in the storing unit 44, the specified processing data set is taken out as a retrieval data set (step S631), and a character stream retrieving operation is performed for the retrieval data set to retrieve one or more character streams agreeing with the retrieval character stream from the retrieval data set (step S632). Thereafter, the retrieving result obtained in the index file searching unit 51 is revised by the retrieving result revising unit 53 according to a processing data searching result of the character stream retrieving unit 52 (step S538). Thereafter, it is judged whether or not the retrieval data set is arranged at the top processing position (TopNew) (step S633).

In cases where the retrieval data set is arranged at the top processing position (TopNew), because a character stream retrieving operation for each of all processing data sets stored in the storing unit 44 has been performed in the step S632, the operation of the avoiding unit 52 is finished. In contrast, in cases where the retrieval data set is not arranged at the top processing position (TopNew), a processing data set placed at an upper position of the retrieval data set is taken out as a retrieval data set corresponding to a particular retrieval text identified by a data number (step S634), and it is judged whether or not a character stream retrieving operation for a particular processing data set corresponding to the same particular retrieval text was previously performed in the step S632 (step S635).

In cases where a character stream retrieving operation for the particular processing data set corresponding to the same particular retrieval text has been never performed, the steps S632, S538, S633 and S634 are repeated. That is, the retrieving operation performed by the character stream retrieving unit 52 and the revising operation performed by the revising unit 53 are performed in the inverse order listed. In contrast, in cases where a character stream retrieving operation for the particular processing data set corresponding to the same particular retrieval text was previously performed, any character stream retrieving operation for the retrieval processing data set is not performed, and the procedure returns to the step S633. That is, a duplicate retrieving operation is avoided.

A retrieving and revising operation performed in the character stream retrieving unit 52 and the revising unit 53 under the control of the avoiding unit 72 is described in detail with reference to FIG. 40.

Figure 40:
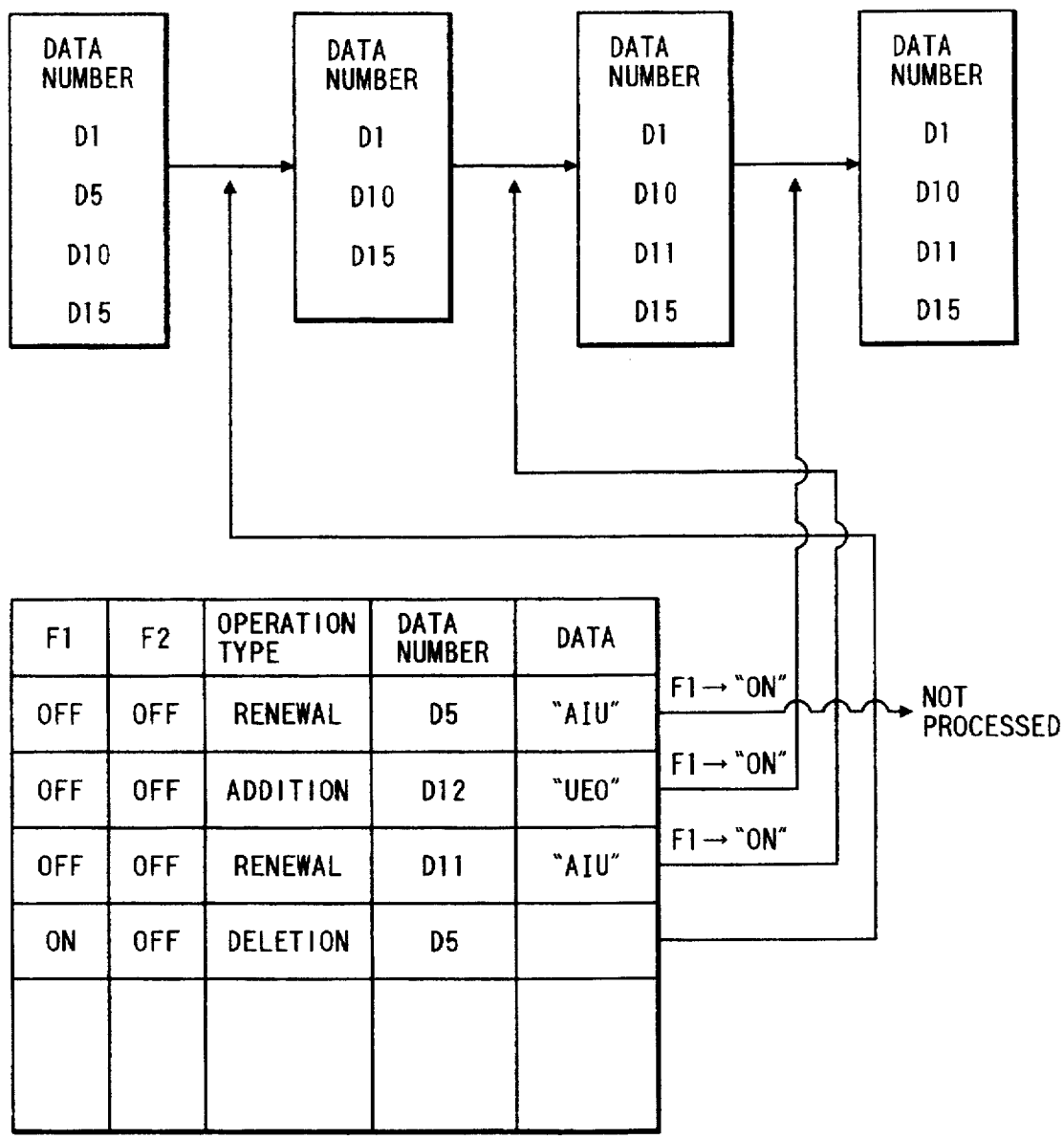
FIG. 40 shows an example of a retrieving and revising operation performed in the duplicate retrieving operation avoiding unit and the retrieving result revising unit according to the seventh embodiment.

As shown in FIG. 40, the index file stored in the storing unit 49 is searched by the searching unit 51 to retrieve a plurality of character streams which agree with the retrieval character stream "AIU" and are listed in a plurality of retrieval texts of the data numbers D1, D5, D10 and D15, and four processing data sets shown in FIG. 40 exist in the storing unit 44. In this case, the retrieval text D5 is deleted from the retrieving result because the first processing data set arranged at the data registering position (BtmNew) of the storing unit 44 indicates a deleting operation for the retrieval text D5, a character stream "AIU" of the retrieval text D11 is added to the retrieving result because the replacement of a character stream of the retrieval text D11 with a character stream "AIU" agreeing with the retrieval character stream is indicated by the second processing data set arranged at an upper position of the first processing data set, the third processing data set arranged at an upper position of the second processing data set is disregarded because a character stream "UEO" differing from the retrieval character stream is added to the retrieval text D12 according to the third processing data set, and the fourth processing data set arranged at an upper position of the third processing data set is disregarded because the retrieval text D5 indicated by the fourth processing data set has been processed by the character stream retrieving unit 52 under the control of the avoiding unit 72.

Accordingly, because a character stream retrieving operation is performed for the latest processing data set corresponding to a particular retrieval text in cases where a plurality of processing data sets corresponding to the same particular retrieval text are stored in the real time processing data storing unit 44 and because any character stream retrieving operation is not performed for the other processing data sets corresponding to the same particular retrieval text, a character stream retrieving operation can be performed at a high speed.

Next, both a forced finishing operation performed during a real time processing performed by the real time processing unit 50 and a starting operation performed after the forced finishing operation are described according to an eighth embodiment.

Figure 41:
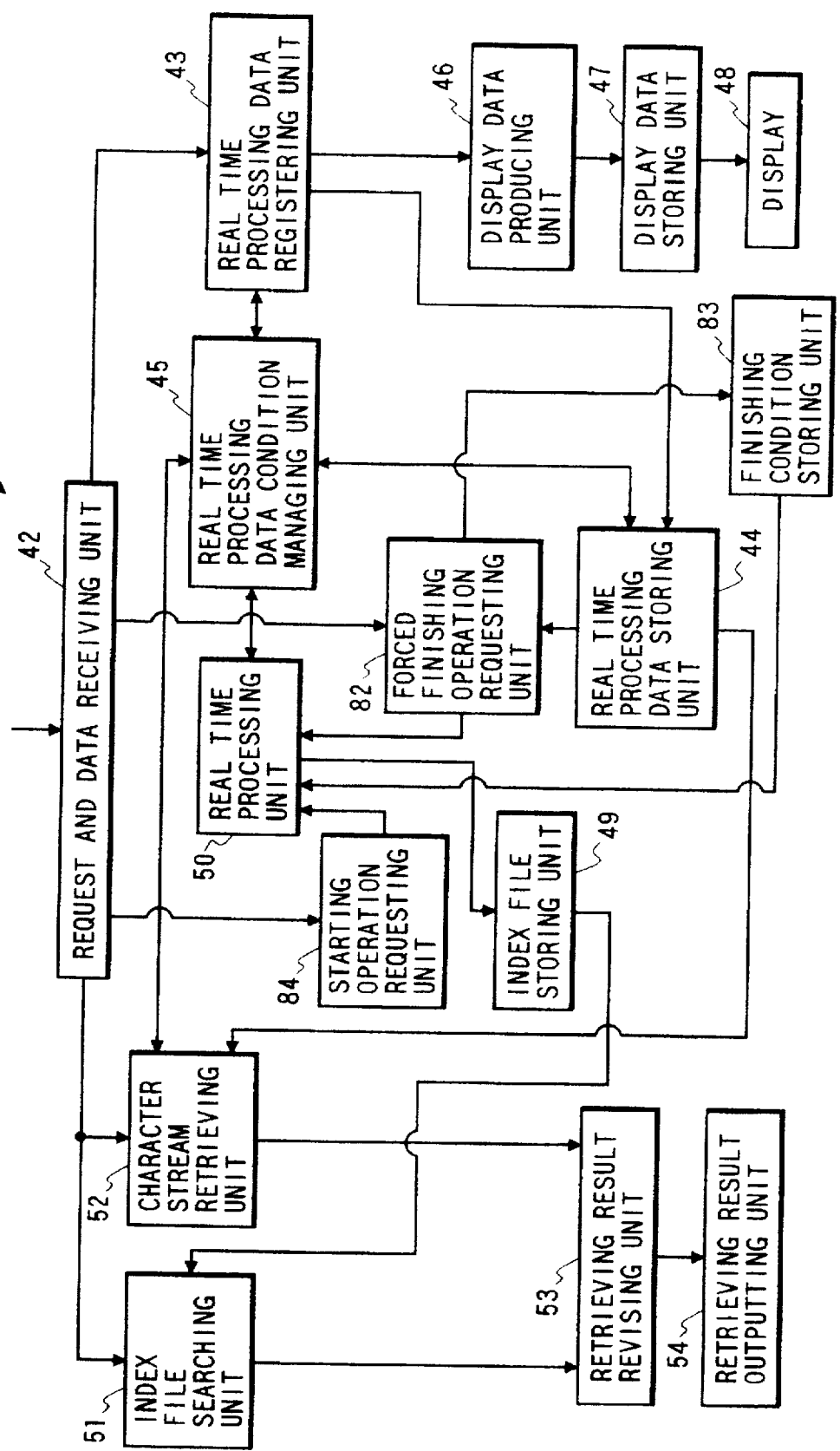
FIG. 41 is a block diagram of an information searching apparatus according to an eighth embodiment of the present invention.

FIG. 41 is a block diagram of an information searching apparatus according to an eighth embodiment of the present invention.

As shown in FIG. 41, an information searching apparatus 81 comprises the request and data receiving unit 42, the real time processing data registering unit 43, the real time processing data storing unit 44, the real time processing data condition managing unit 45, the display data producing unit 46, the display data storing unit 47, the display 48, the index file storing unit 49, the real time processing unit 50, a forced finishing operation requesting unit 82 for requesting the real time processing unit 50 to forcibly finish a real time processing when a finishing request is received by the request and data receiving unit 42, a finishing condition storing unit 83 for storing one or more processing data sets not processed by the real time processing because of a forced finishing operation requested by the forced finishing operation requesting unit 82, a starting operation requesting unit 84 for requesting the real time processing unit 50 to restart the real time processing forcibly finished by the finishing request when a starting request is received by the request and data receiving unit 42, the index file searching unit 51, the character stream retrieving unit 52, the retrieving result revising unit 53, and the retrieving result outputting unit 54.

In the above configuration, a forced finishing operation performed in the information searching apparatus 81 is described with reference to FIG. 42.

Figures 42, 43:
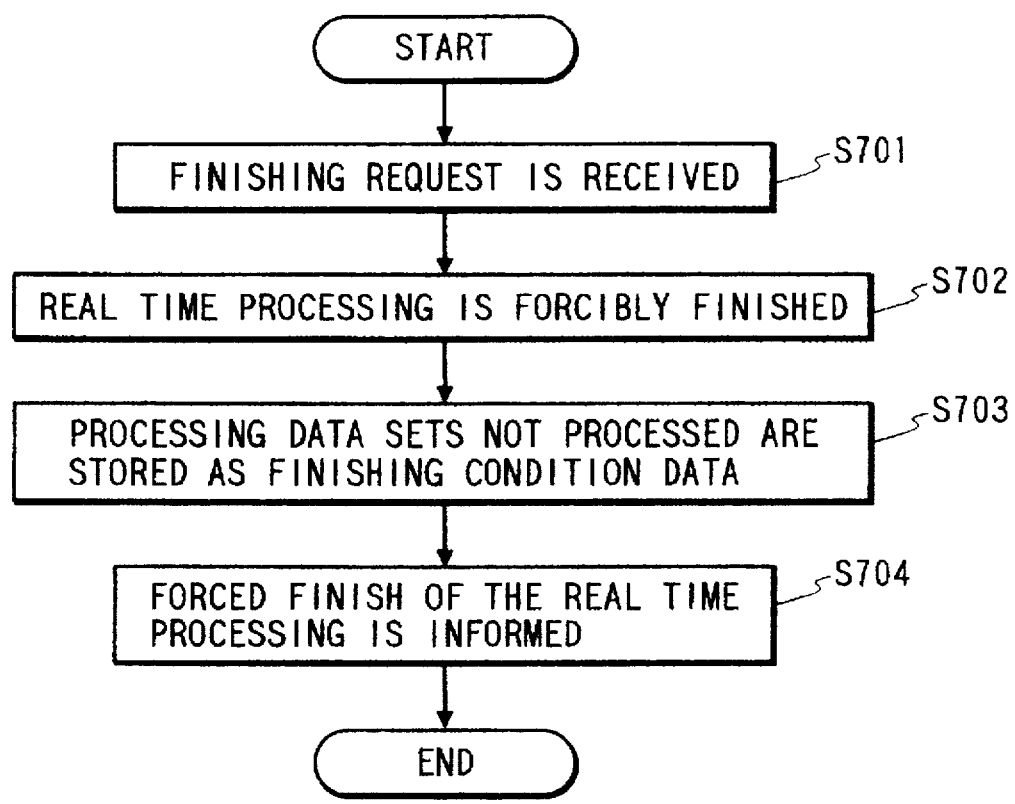
FIG. 42 is a flow chart showing a forced finishing operation according to the eighth embodiment of the present invention.
FIG. 43 shows a configuration of a piece of finishing condition data.

FIG. 42 is a flow chart showing a forced finishing operation according to an eighth embodiment of the present invention.

As shown in FIG. 42, when a finishing request is received by the receiving unit 42 in the middle of a real time processing performed by the real time processing unit 50 (step S701), the forced finishing operation requesting unit 82 requests the real time processing unit 50 to forcibly finish a real time processing after a current processing data set is processed (step S702). For example, in cases where a real time processing is currently performed for a top processing data set of four processing data sets shown in FIG. 23 when a finishing request is received, the real time processing is forcibly finished after a renewing operation of the retrieval text D5 to a character stream "AIU" is finished.

Figures 44, 45:
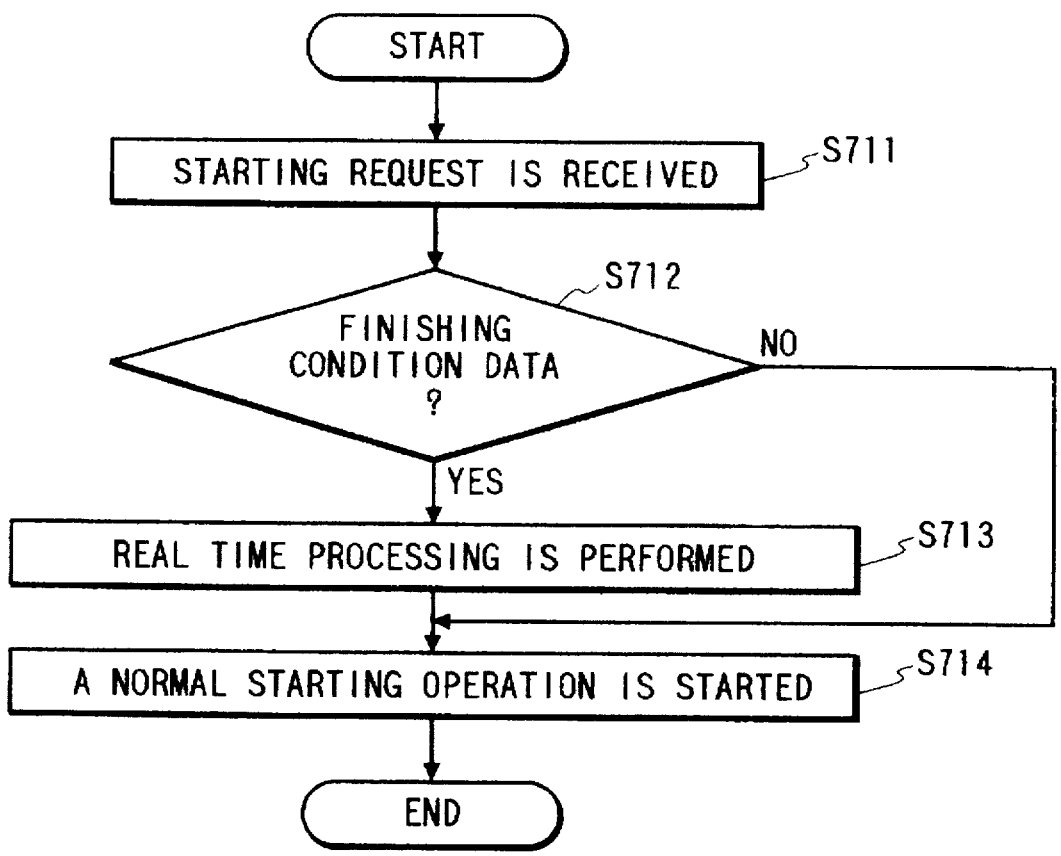
FIG. 44 shows an example of three pieces of finishing condition data.
FIG. 45 is a flow chart showing a starting operation according to the eighth embodiment of the present invention.

Thereafter, one or more processing data sets which each are stored in the storing unit 44 and each are not processed by the real time processing unit 50 are transmitted to the finishing condition storing unit 83 through the requesting unit 82 as pieces of finishing condition data (step S703). As shown in FIG. 43, each of the finishing condition data is composed of a processing type such as a renewing operation, an adding operation or a deleting operation, a data number identifying a corresponding retrieval text and a piece of data. Because the renewing operation for the retrieval text D5 is finished, as shown in FIG. 44, three pieces of finishing condition data are stored in the finishing condition storing unit 83. Thereafter, the forced finish of the real time processing is informed the user (step S704).

A starting operation performed after the forced finishing operation is described with reference to. FIG. 45.

FIG. 45 is a flow chart showing a starting operation according to the eighth embodiment of the present invention.

As shown in FIG. 45, when a starting request is received by the request and data receiving unit 42 (step S711), it is judged by the starting operation requesting unit 84 whether or not one or more pieces of finishing condition data are stored in the storing unit 83 (step S712). In cases where one or more pieces of finishing condition data are stored in the storing unit 85, the finishing condition data are transmitted to the real time processing unit 50 as one or more processing data sets, and a real time processing is performed for each of the processing data sets (step S713) as an urgent starting operation. After the urgent starting operation is performed, a normal starting operation is performed (step S714).

Accordingly, even though a large volume of processing data sets are stored in the storing unit 44, because the real time processing for the processing data sets is forcibly finished when a finishing request is received, there is no case that the user waits for the finish of the real time processing for all processing data sets for a long time. Therefore, the user can immediately perform another type of operation by using the information searching apparatus 81.

Also, even though the real time processing for all processing data sets is not finished, because one or more processing data sets not processed are stored in the finishing condition storing unit 83, the processing data sets not processed can be processed as an urgent starting operation. Therefore, the real time processing for all processing data sets can be correctly performed regardless of a volume of the processing data sets.

Next, a retrieving result outputting operation in which a revised retrieving result for a particular retrieval text is output with a piece of renewing information indicating a renewal of the particular retrieval text in cases where the particular retrieval text is renewed after the revised retrieving result is obtained is described according to a ninth embodiment.

Figure 46:
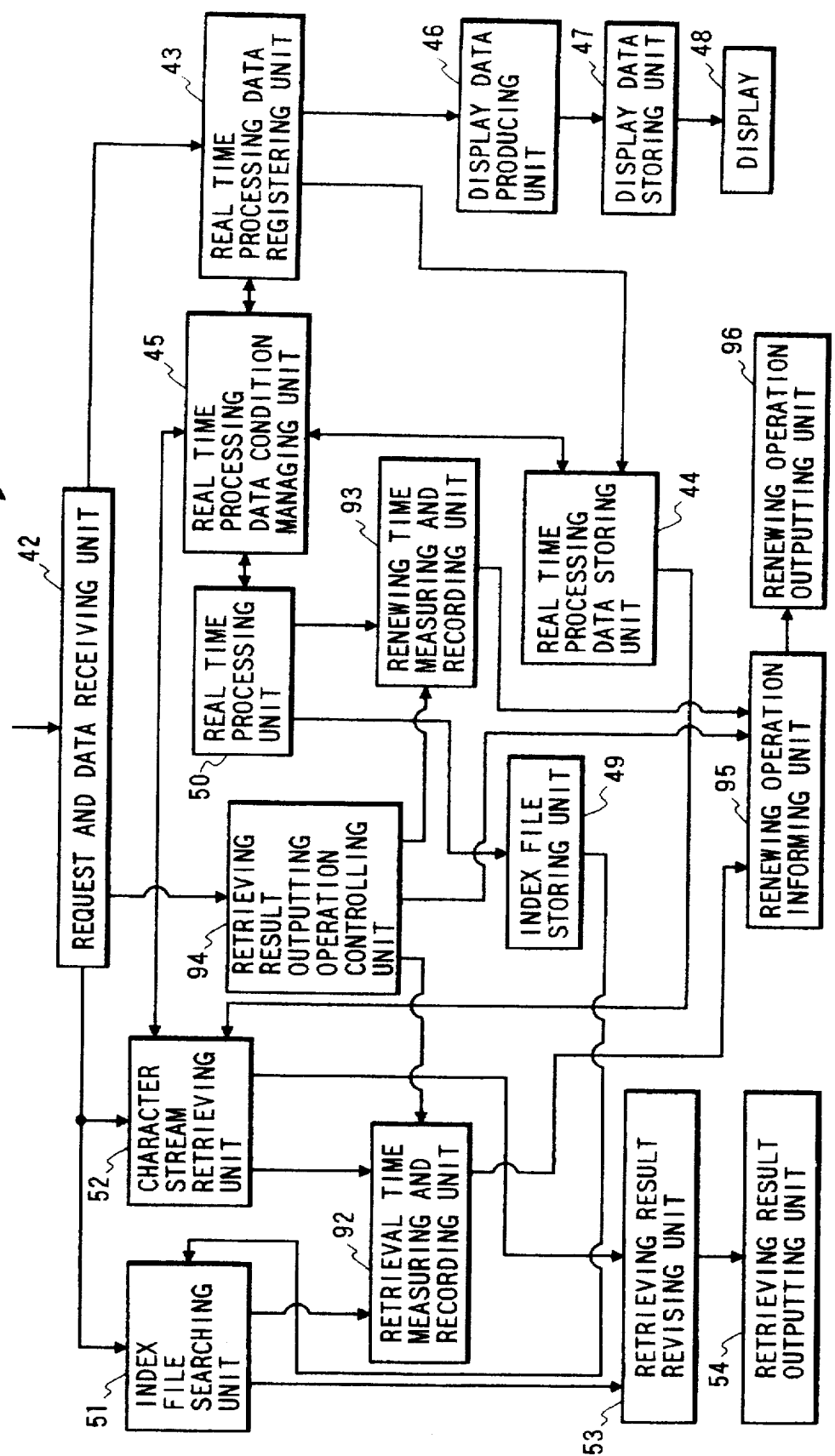
FIG. 46 is a block diagram of an information searching apparatus according to a ninth embodiment of the present invention.

FIG. 46 is a block diagram of an information searching apparatus according to a ninth embodiment of the present invention.

As shown in FIG. 46, an information searching apparatus 91 comprises the request and data receiving unit 42, the real time processing data registering unit 43, the real time processing data storing unit 44, the real time processing data condition managing unit 45, the display data producing unit 46, the display data storing unit 47, the display 48, the index file storing unit 49, the real time processing unit 50, the index file searching unit 51, the character stream retrieving unit 52, the retrieving result revising unit 53, the retrieving result outputting unit 54, a retrieval time measuring and recording unit 92 for measuring and recording a retrieval time, at which a retrieval text or a processing data set for a retrieval text is searched by the index file searching unit 51 or the character stream retrieving unit 52 and one or more character streams agreeing with the retrieval character stream are retrieved from the retrieval text by the character stream retrieving unit 52, for each of the retrieval texts, a renewing time measuring and recording unit 93 for measuring and recording a renewing time, at which a retrieval text stored in the index file storing unit 49 is renewed by the real time processing unit 50, for each of the retrieval texts, a retrieving result outputting operation controlling unit 94 for controlling the performance of a retrieving result outputting operation when a retrieving result outputting request is received by the request and data receiving unit 42, a renewing operation informing unit 95 for judging whether or not one retrieval time measured by the retrieval time measuring and recording unit 92 is later than one renewing time measured by the renewing time measuring and recording unit 93 for each of the retrieval texts and preparing a piece of renewing information indicating that a renewing operation for a retrieval text is performed after a retrieval text or a processing data set for a retrieval text is searched by the index file searching unit 51 or the character stream retrieving unit 52 for each of the retrieval texts in cases where the renewing time is later than the retrieval time, and a renewing information outputting unit 96 for outputting a data number, data of a retrieval text and the renewing or non-renewing information obtained by the renewing operation informing unit 95 for each of the retrieval texts.

In the above configuration, a retrieving result outputting operation performed by the information searching apparatus 91 is described.

FIG. 47 is a flow chart showing the recording of a retrieval time.

When a retrieval set of a retrieval character stream and a retrieval request for requesting a retrieval operation is received by the request and data receiving unit 41, the steps S531 to S538 are performed in the same manner as those shown in FIG. 29. Thereafter, the recording of a retrieval time is performed as shown in FIG. 47. That is, as shown in FIG. 48, a set of a data number and a retrieval time at which a retrieval text or a processing data set for a retrieval text is searched by the index file searching unit 51 or the character stream retrieving unit 52 and one or more character streams agreeing with the retrieval character stream are retrieved from the retrieval text by the character stream retrieving unit 52 is recorded in the retrieval time measuring and recording unit 92 for each of the retrieval texts (step S721). Thereafter, the steps S539 and S540 are performed in the same manner as those shown in FIG. 29. For example, in cases where a character stream agreeing with the retrieval character stream "AIU" is retrieved at ten o'clock from a retrieval text D1 by the index file searching unit 51, as shown in FIG. 49, a set of a data number D1 and a retrieval time 10:00 is obtained.

Figures 50, 51, 52:
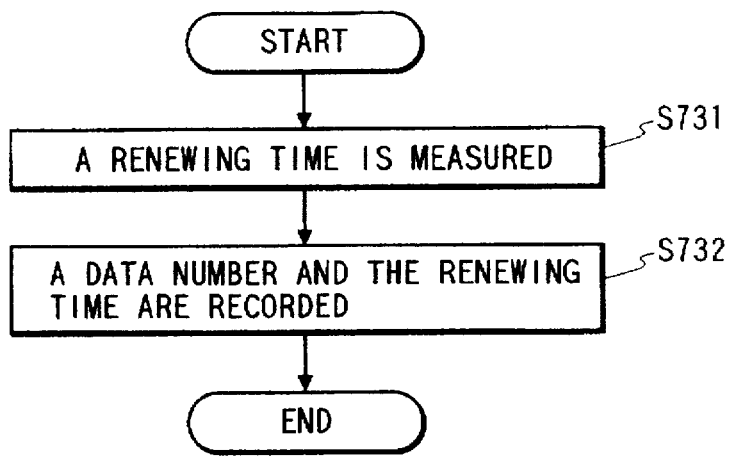
FIG. 50 is a flow chart showing the recording of a renewing time.
FIG. 51 shows a configuration of a set of a data number and a renewing time.
FIG. 52 shows an example of a set of a data number and a renewing time.

Thereafter, the recording of a renewing time is performed. In detail, when a processing data set of a piece of real time processing data and a real time processing request for requesting a real time processing for a particular retrieval text is received by the request and data receiving unit 42, the steps S501 to S509 are performed in the same manner as those shown in FIG. 20 to register and store the processing data set for the particular retrieval text. Thereafter, the steps S511 to S522 are performed by the real time processing unit 50 in the same manner as those shown in FIG. 26 to renew the particular retrieval text stored in the index file storing unit 49. Also, as shown in FIG. 50, a renewing time at which the particular retrieval text stored in the index file storing unit 49 is renewed by the real time processing unit 50 is measured (step S731), and a set of a data number for the particular retrieval text and the renewing time is recorded in the renewing time measuring and recording unit 93 as shown in FIG. 51 (step S732). For example, in cases where a retrieval text D1 is renewed to a character stream "IUE" at ten minutes past ten o'clock, as shown in FIG. 52, a set of a data number D1 and a retrieval time 10:10 is obtained.

Figure 53:
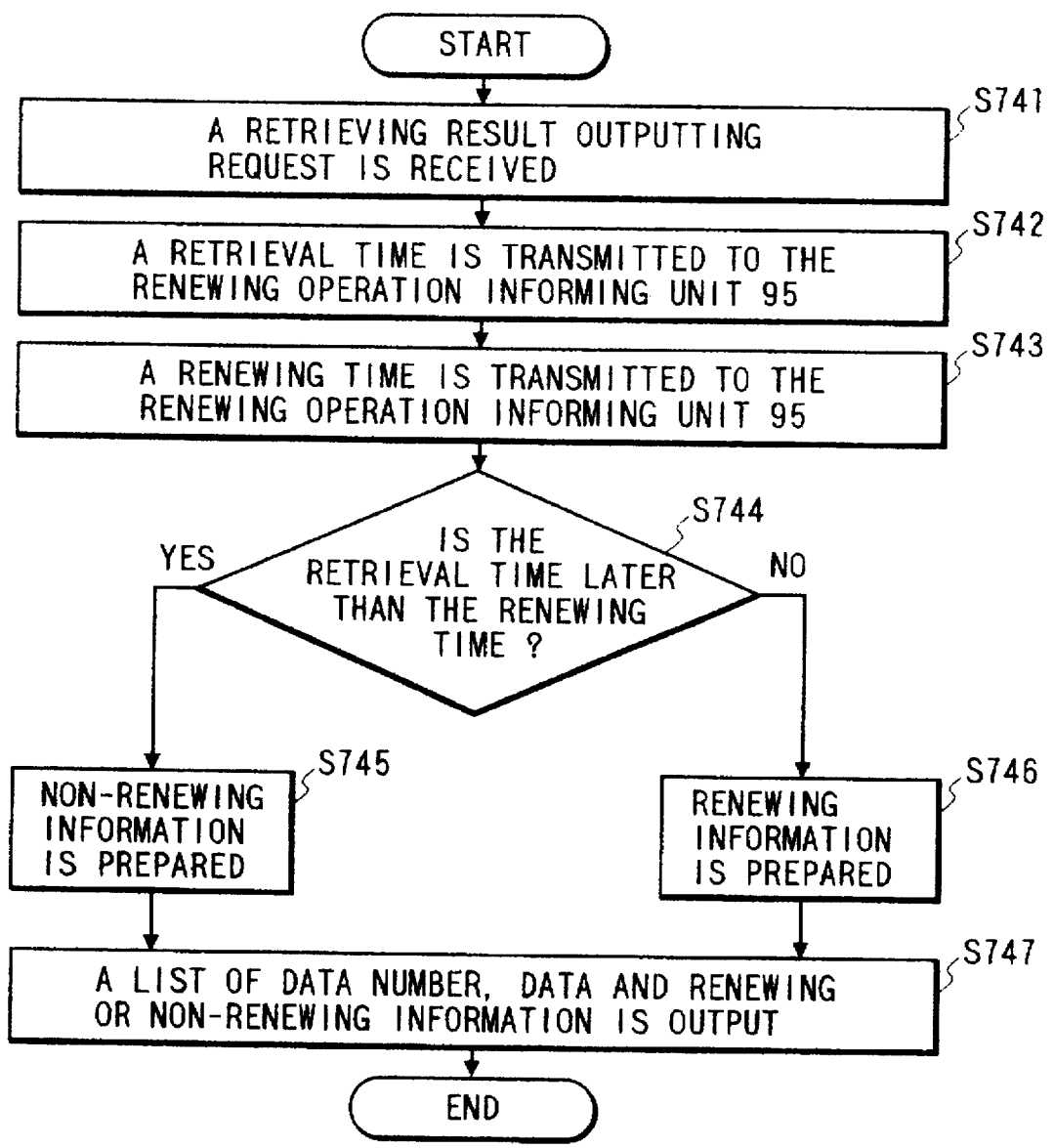
FIG. 53 is a flow chart showing a renewing or non-renewing information outputting operation according to the ninth embodiment.

Thereafter, a piece of renewing information indicating that a renewing operation for a retrieval text is performed after the retrieval text is searched by the index file searching unit 51 is output. In detail, as shown in FIG. 53, when a retrieving result outputting request for requesting to output a revised retrieving result of one or more retrieval texts is received by the request and data receiving unit 42 (step S741), a retrieval time for each of the retrieval texts is transmitted from the retrieval time measuring and recording unit 92 to the renewing operation informing unit 95 under the control of the retrieving result outputting operation controlling unit 94 (step S742), a renewing time for each of the retrieval texts is transmitted from the renewing time measuring and recording unit 93 to the renewing operation informing unit 95 under the control of the retrieving result outputting operation controlling unit 94 (step S743). Thereafter, the judgement whether or not the retrieval time is later than the renewing time is performed for each of the retrieval texts (step S744). In cases where the retrieval time is equal to or later than the renewing time, a piece of non-renewing information indicating that any renewing operation for a retrieval text is not performed after the retrieval text or a processing data set for the retrieval text is searched by the index file searching unit 51 or the character stream retrieving unit 52 is prepared by the renewing operation informing unit 95 (step S745). In contrast, in cases where the renewing time is later than the retrieval time, a piece of renewing information indicating that a renewing operation for a retrieval text is performed after the retrieval text or a processing data set for the retrieval text is searched by the index file searching unit 51 or the character stream retrieving unit 52 is prepared by the renewing operation informing unit 95 (step S746). Thereafter, a list of a data number, data of a retrieval text and the renewing or non-renewing information is output by the renewing information outputting unit 96 for each of the retrieval texts (step S747).

For example, in cases where one or more character streams "IUE" agreeing with the retrieval character stream are retrieved from each of the retrieval texts D1, D2 and D5 by the index file searching unit 51 or the character stream retrieving unit 52, a retrieval time 10:00 for the retrieval text D1 is transmitted to the renewing operation informing unit 95 in the step S742, and a renewing time 10:10 for the retrieval text D1, a renewing time 9:00 for the retrieval text D2 and a renewing time 9:40 for the retrieval text D5 are transmitted to the renewing operation informing unit 95 in the step S743. Thereafter, because the renewing time 10:10 for the retrieval text D1 (FIG. 52) is later than the retrieval time 10:00 for the retrieval text D1 (FIG. 49), as shown in FIG. 54, a piece of renewing information for the retrieval text D1 is prepared by the renewing operation informing unit 95 (step S746).

Accordingly, because it is judged whether or not a retrieving time is later than a renewing time, even though a retrieval text is renewed after a searching operation is performed for the retrieval text, a piece of renewing information can be informed a user.

Having illustrated and described the principles of the present invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. An information searching apparatus, comprising:
   occurrence number table preparing means for preparing an occurrence number table in which one or more occurrence numbers obtained by numbering one or more characters belonging to a character type in a retrieval text in order of occurrence are listed for each character type;
   index file preparing means for reconstituting the occurrence numbers listed in the occurrence number table prepared by the occurrence number table preparing means to a plurality of occurrence number patterns which each indicate a set of two occurrence numbers of two adjacent characters in the retrieval text, classifying the occurrence number patterns into a plurality of groups of occurrence number patterns which each corresponds to a character pattern indicating a set of two character types, and preparing an index file in which the groups of occurrence number patterns respectively corresponding to one character pattern are listed, particular types of two adjacent characters indicated by each of the occurrence number patterns agreeing with two character types indicated by a corresponding character pattern; and
   index file searching means for searching the index file and retrieving a particular character stream agreeing with a key word by producing a series of specified character patterns from a specified character stream indicated by the key word, and selecting a series of particular occurrence number patterns corresponding to the series of specified character patterns on condition that a series of particular characters indicated by the series of particular occurrence number patterns agrees with the particular character stream.

2. An information searching apparatus according to claim 1 in which a plurality of occurrence number patterns in each group of occurrence number patterns are arranged in the order of increasing or decreasing the occurrence numbers of the occurrence number patterns by the index file searching means.

3. An information searching apparatus according to claim 1, further comprising
   index file storing means for storing the groups of occurrence number patterns obtained by the index file preparing means as the index file, the index file storing means comprising:
   a plurality of recording regions for storing a plurality of occurrence number patterns from a top occurrence number pattern to a final occurrence number pattern for each group of occurrence number patterns; and
   an extended region following the recording regions for again storing the final occurrence number pattern in succession to the final occurrence number pattern stored in a final recording region, and
   a searching operation for each group of occurrence number patterns performed by the index file searching means being stopped in cases where the final occurrence number pattern recorded in the extended region is again checked by the index file searching means.

4. An information searching apparatus according to claim 1, further comprising
   index file storing means for storing the groups of occurrence number patterns obtained by the index file preparing means as the index file, the index file storing means comprising:
   a plurality of recording regions for storing a plurality of occurrence number patterns from a top occurrence number pattern to a final occurrence number pattern for each group of occurrence number patterns; and
   an extended region, arranged for each group of occurrence number patterns, for storing an additional occurrence number pattern obtained by the index file preparing means in a text revising operation.

5. An information searching apparatus according to claim 1, further comprising
   index file storing means for storing the groups of occurrence number patterns obtained by the index file preparing means as the index file, the index file storing means comprising:
   a plurality of recording regions for storing a plurality of occurrence number patterns from a top occurrence number pattern to a final occurrence number pattern for each group of occurrence number patterns;
   a first extended region following the recording regions for again storing the final occurrence number pattern in succession to the final occurrence number pattern stored in a final recording region; and
   a second extended region following the first extended region for storing an additional occurrence number pattern obtained by the index file preparing means in a text revising operation, and
   a searching operation for each group of occurrence number patterns performed by the index file searching means being stopped in cases Where the final occurrence number pattern recorded in the first extended region is again checked by the index file searching means.

6. An information searching apparatus, comprising:
   retrieval object storing means for storing one or more retrieval objects;
   real time processing data receiving means for receiving one or more pieces of real time processing data respectively corresponding to one of the retrieval objects stored in the retrieval object storing means;
   retrieval information receiving means for receiving a piece of retrieval information and a searching request;
   real time processing data storing means for storing the pieces of real time processing data received by the real time processing data receiving means;
   real time processing means for performing a real time processing for each of the pieces of real time processing data stored in the real time processing data storing means to renew the retrieval objects stored in the retrieval object storing means;

retrieval object searching means for searching each of the retrieval objects stored in the retrieval object storing means to retrieve one or more pieces of first information agreeing with the retrieval information received by the retrieval information receiving means from each of the retrieval objects and outputting a retrieval result indicating the first information;

real time processing data searching means for searching each of one or more pieces of particular real time processing data, which each are not processed by the real time processing means and are stored in the real time processing data storing means, to retrieve one or more pieces of second information agreeing with the retrieval information received by the retrieval information receiving means from each of the pieces of particular real time processing data;

retrieval result revising means for revising the retrieval result output from the retrieval object searching means according to the second information retrieved by the real time processing data searching means to reflect the pieces of particular real time processing data in the retrieval result; and retrieval result outputting means for outputting the retrieval result revised by the retrieval result revising means.

7. An information searching apparatus according to claim 6 in which each of the retrieval objects stored in the retrieval object storing means is a character stream which is expressed by one or more character patterns respectively indicated by a first character and a second character adjacent to each other and one or more character information patterns which each correspond to one of the character patterns and are indicated by a position of the first character in the character stream and a data number identifying the character stream.

8. An information searching apparatus according to claim 6, further comprising:

duplicate real time processing avoiding means for changing a piece of real time processing data, which corresponds to a particular retrieval object and is stored in the real time processing data storing means, to a piece of revised real time processing data corresponding to the same particular retrieval object in cases where a piece of duplicate real time processing data corresponding to the same particular retrieval object is received by the real time processing data receiving means and abandoning the duplicate real time processing data.

9. An information searching apparatus according to claim 6, further comprising:

existence judging table preparing means for preparing an existence judging table in which all components of a piece of specified real time processing data stored in the real time processing data storing means exist; and retrieving operation control means for judging whether or not all components of the retrieval information exist in the existence judging table prepared by the existence judging table preparing means and controlling the real time processing data searching means to stop searching the specified real time processing data in cases where all components of the retrieval information do not exist in the existence judging table.

10. An information searching apparatus according to claim 6, further comprising:

duplicate retrieving operation avoiding means for selecting a piece of latest real time processing data Corresponding to a particular retrieval object from a plurality of pieces of real time processing data corresponding to the same particular retrieval object stored in the real time processing data storing means, controlling the real time processing data searching means to retrieve the second information agreeing with the retrieval information from the latest real time processing data, and controlling the real time processing data searching means not to perform a searching operation for the other pieces of real time processing data corresponding to the same particular retrieval information.

11. An information searching apparatus according to claim 6, further comprising:

finishing request receiving means for receiving a finishing request;

forced finishing operation requesting means for requesting the real time processing means to forcibly finish a real time processing in cases where the finishing request is received by the finishing request receiving means to remain one or more pieces of specified real time processing data not processed by the real time processing means in the real time processing data storing means; and finishing condition storing means for storing the pieces of specified real time processing data remained by the forced finishing operation requesting means.

12. An information searching apparatus according to claim 11, further comprising:

starting request receiving means for receiving a starting request; and starting operation requesting means for requesting the real time processing means to restart the real time processing forcibly finished by the forced finishing operation requesting means in cases where the starting request is received by the starting request receiving means.

13. An information searching apparatus according to claim 6, further comprising:

retrieval time measuring means for measuring a retrieval time at which a particular retrieval object stored in the retrieval object storing means is searched by the retrieval object searching means or a pieces of particular real time processing data for a particular retrieval object stored in the real time processing data storing means is searched by the real time processing data searching means;

renewing time measuring means for measuring a renewing time at which the particular retrieval object stored in the retrieval object storing means is renewed by the real time processing means;

renewing operation informing means for judging whether or not the retrieval time measured by the retrieval time measuring means is later than the renewing time measured by the renewing time measuring means and preparing a piece of renewing information indicating that a renewing operation for the particular retrieval object is performed after the particular retrieval object is searched by the retrieval object searching means or the real time processing data searching means in cases where the renewing time is later than the retrieval time; and renewing information outputting means for outputting an identifying number of the particular retrieval object and the renewing information obtained by the renewing operation informing means in cases where the renewing time is later than the retrieval time.

* * * * *